(12) United States Patent
Weinberger

(10) Patent No.: US 6,499,027 B1
(45) Date of Patent: Dec. 24, 2002

(54) SYSTEM SOFTWARE ARCHITECTURE FOR A PASSENGER ENTERTAINMENT SYSTEM, METHOD AND ARTICLE OF MANUFACTURE

(75) Inventor: Alan J. Weinberger, Monrovia, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/085,249

(22) Filed: May 26, 1998

(51) Int. Cl.[7] .............................................. G06F 17/30
(52) U.S. Cl. ........................ 707/4; 707/10; 707/104.1; 709/217
(58) Field of Search ............................... 707/10, 104, 3, 707/104.1, 4; 701/33; 348/6; 463/43; 709/217

(56) References Cited

U.S. PATENT DOCUMENTS

| | | | |
|---|---|---|---|
| 3,602,891 A | 8/1971 | Clark et al. .................. | 709/219 |
| 3,811,127 A | 5/1974 | Griffee et al. ............... | 343/705 |
| 3,860,932 A | 1/1975 | Hochbrueckner ........... | 343/713 |
| 3,868,497 A | 2/1975 | Vietor ......................... | 701/121 |
| 3,972,045 A | 7/1976 | Perret ......................... | 552/310 |
| 3,997,718 A | 12/1976 | Ricketts et al. ............. | 343/705 |
| 4,047,175 A | 9/1977 | Taira et al. .................. | 342/359 |
| 4,058,837 A | 11/1977 | Muntz ......................... | 348/782 |
| 4,099,780 A | 7/1978 | Schmidhuber .......... | 297/411.26 |

(List continued on next page.)

FOREIGN PATENT DOCUMENTS

| | | |
|---|---|---|
| DE | 3426893 | 1/1986 |
| EP | 0230280 | 7/1987 |
| EP | 0277014 | 8/1988 |
| EP | 0457673 | 11/1991 |
| EP | 0569225 | 11/1993 |
| EP | 0647914 | 4/1995 |
| EP | 0671861 | 9/1995 |

(List continued on next page.)

OTHER PUBLICATIONS

Kelly et al., Connectorless Power Supply for an Aircraft–Passenger Entertainment System, Jul. 1989, IEEE electronic library, p. 348–354.*

Primary Examiner—Greta L. Robinson
(74) Attorney, Agent, or Firm—Nathan O. Jensen; Kyle Eppele

(57) ABSTRACT

System software that enable a passenger entertainment system on a vehicle. The passenger entertainment system is configured and operated using the system software to provide passenger entertainment services including audio and video on-demand, information dissemination, product and service order processing, video teleconferencing and data communication services between passengers on-board the vehicle using a local networks, and between passengers and people and computers off-board the vehicle using a communications link. The system software is used to route and process passenger transactions (requests for services) from requesting computer processors and dispatch appropriate resources to fulfill the transactions. To achieve this, a passenger transaction is transmitted from a passenger-controlled component to a message processor. The message processor decodes the passenger transaction and generating a request in a predetermined format. The request is transmitted to a transaction dispatcher for routing. A database query is then generated in response to the request. The database query is transmitted to a database server having a database containing data regarding resources of the system that allow communication with and/or control of the communications devices and information relating to products and services offered by the system. An appropriate response is generated in response to the query. Appropriate resources defined in the response are then dispatched to the query to service the passenger transaction.

18 Claims, 20 Drawing Sheets

U.S. PATENT DOCUMENTS

| | | | | |
|---|---|---|---|---|
| 4,118,733 | A | 10/1978 | Sarson et al. | 348/145 |
| 4,187,760 | A | 2/1980 | Holt | 89/1.56 |
| 4,281,352 | A | 7/1981 | Hoffman | 348/788 |
| 4,283,740 | A | 8/1981 | Okada | 380/221 |
| 4,290,083 | A | 9/1981 | Collender | 348/50 |
| 4,352,200 | A | 9/1982 | Oxman | 455/41 |
| 4,393,329 | A | 7/1983 | Lehnert | 313/477 R |
| 4,427,038 | A | 1/1984 | Oesterle et al. | 139/449 |
| 4,428,078 | A | 1/1984 | Kuo | 455/3.06 |
| 4,433,344 | A | 2/1984 | Gardin et al. | 348/706 |
| 4,465,907 | A | 8/1984 | Minear et al. | 381/81 |
| 4,472,607 | A | 9/1984 | Houng | 181/18 |
| 4,475,196 | A | 10/1984 | La Zor | 714/46 |
| 4,490,117 | A | 12/1984 | Parker | 434/35 |
| 4,513,315 | A | 4/1985 | Dekker et al. | 725/67 |
| 4,521,021 | A | 6/1985 | Dixon | 463/47 |
| 4,521,806 | A | 6/1985 | Abraham | 725/91 |
| 4,554,579 | A | 11/1985 | Citta | 725/131 |
| 4,554,993 | A | 11/1985 | Houng | 181/130 |
| 4,573,072 | A | 2/1986 | Freeman | 725/136 |
| 4,584,603 | A | 4/1986 | Harrison | 725/76 |
| 4,591,906 | A | 5/1986 | Morales-Garza et al. | 725/24 |
| 4,630,821 | A | 12/1986 | Greenwald | 463/1 |
| 4,647,980 | A | 3/1987 | Steventon et al. | 348/837 |
| 4,649,570 | A | 3/1987 | Terbrack et al. | |
| 4,684,981 | A | 8/1987 | Toyoshima et al. | |
| 4,692,569 | A | 9/1987 | Winner | 191/12 R |
| 4,765,481 | A | 8/1988 | Walsh et al. | 206/525 |
| 4,835,604 | A | 5/1989 | Konda et al. | 725/76 |
| 4,853,555 | A | 8/1989 | Wheat | 307/9.1 |
| 4,853,764 | A | 8/1989 | Sutter | 348/53 |
| 4,866,515 | A | 9/1989 | Tagawa et al. | 725/77 |
| 4,866,787 | A | 9/1989 | Olesen | 725/68 |
| 4,868,577 | A | 9/1989 | Wingard | 343/713 |
| 4,896,209 | A | 1/1990 | Matsuzaki et al. | 725/12 |
| 4,918,535 | A | 4/1990 | Grabis et al. | 348/782 |
| 4,945,563 | A | 7/1990 | Horton et al. | 380/203 |
| 4,975,696 | A | 12/1990 | Salter, Jr. et al. | |
| 4,997,233 | A | 3/1991 | Sharon | 297/216.17 |
| 4,999,729 | A | 3/1991 | Stifter | 361/56 |
| 5,001,555 | A | 3/1991 | Park | |
| 5,024,398 | A | 6/1991 | Riedinger et al. | 244/118.5 |
| 5,035,005 | A | 7/1991 | Hung | 2/209 |
| 5,051,822 | A | 9/1991 | Rhoades | 463/25 |
| 5,179,447 | A | 1/1993 | Lain | 348/837 |
| 5,181,107 | A | 1/1993 | Rhoades | 725/105 |
| 5,193,208 | A | 3/1993 | Yokota et al. | 725/80 |
| 5,208,590 | A | 5/1993 | Pitts | 340/973 |
| 5,214,505 | A | 5/1993 | Rabowsky et al. | 725/77 |
| 5,218,167 | A | 6/1993 | Gasque, Jr. | 174/37 |
| 5,220,419 | A | 6/1993 | Sklar et al. | 725/76 |
| 5,289,272 | A | 2/1994 | Rabowsky et al. | 725/76 |
| 5,301,245 | A | 4/1994 | Endoh | 380/242 |
| 5,319,452 | A | 6/1994 | Funahashi | 725/116 |
| 5,363,433 | A | 11/1994 | Isono | 370/390 |
| 5,370,306 | A | 12/1994 | Schulze et al. | |
| 5,373,324 | A | 12/1994 | Kuroda et al. | 348/468 |
| 5,374,104 | A | 12/1994 | Moore et al. | 297/188.16 |
| 5,404,567 | A | 4/1995 | DePietro et al. | 455/3.06 |
| 5,425,516 | A | 6/1995 | Daines | 244/118.6 |
| 5,430,492 | A | 7/1995 | Dambacher | 348/469 |
| 5,437,464 | A | 8/1995 | Terasima et al. | 463/43 |
| 5,440,337 | A | 8/1995 | Henderson et al. | 348/144 |
| 5,442,652 | A | 8/1995 | Jacobson | 375/130 |
| 5,463,656 | A | 10/1995 | Polivka et al. | 428/174 |
| 5,465,384 | A | 11/1995 | Bejan et al. | 455/2.01 |
| 5,480,158 | A | 1/1996 | Schulze et al. | 463/34 |
| 5,481,478 | A | 1/1996 | Palmieri et al. | 709/208 |
| 5,481,757 | A | 1/1996 | Mihara et al. | 725/119 |
| 5,510,900 | A | 4/1996 | Shirochi et al. | 386/94 |
| 5,524,272 | A | 6/1996 | Podowski et al. | 725/74 |
| 5,526,035 | A | 6/1996 | Lappington et al. | 725/136 |
| 5,532,753 | A | 7/1996 | Buchner et al. | 725/56 |
| 5,532,760 | A | 7/1996 | Inoue | 348/729 |
| 5,537,152 | A | 7/1996 | Ishikawa | 725/56 |
| 5,539,449 | A | 7/1996 | Blahut et al. | 725/106 |
| 5,539,657 | A | 7/1996 | Utsumi et al. | 725/75 |
| 5,546,050 | A | 8/1996 | Florian et al. | 330/282 |
| 5,547,248 | A | 8/1996 | Marcehal | 297/188.17 |
| 5,555,021 | A | 9/1996 | Igarashi | |
| 5,565,908 | A | 10/1996 | Ahmad | 725/93 |
| 5,568,484 | A | 10/1996 | Margis | 370/452 |
| 5,581,270 | A | 12/1996 | Smith et al. | 345/2.1 |
| 5,584,047 | A | 12/1996 | Tuck | 455/13.1 |
| 5,596,647 | A | 1/1997 | Wakai et al. | 381/77 |
| 5,600,717 | A | 2/1997 | Schneider et al. | 379/413.03 |
| 5,608,535 | A | 3/1997 | Yoshida et al. | 386/123 |
| 5,610,822 | A | 3/1997 | Murphy | 701/211 |
| 5,617,331 | A | 4/1997 | Wakai et al. | 725/76 |
| 5,641,319 | A | 6/1997 | Stoel et al. | 463/42 |
| 5,651,050 | A | 7/1997 | Bhagat et al. | 435/7.23 |
| 5,659,350 | A * | 8/1997 | Hendricks et al. | 348/6 |
| 5,790,787 | A * | 8/1998 | Scott et al. | 709/250 |
| 5,931,906 | A * | 8/1999 | Fidelibus, Jr. et al. | 709/217 |
| 5,956,716 | A * | 9/1999 | Kenner et al. | 707/10 |
| 6,009,363 | A * | 12/1999 | Becker et al. | 701/33 |

FOREIGN PATENT DOCUMENTS

| | | |
|---|---|---|
| EP | 0457673 | 11/1997 |
| FR | 2652701 | 4/1991 |
| FR | 2716764 | 9/1995 |
| JP | 1291281 | 5/1988 |
| JP | 63202194 | 8/1988 |
| JP | 63209333 | 8/1988 |
| JP | 63215287 | 9/1988 |
| JP | 1257640 | 10/1989 |
| JP | 1300719 | 12/1989 |
| JP | 1301430 | 12/1989 |
| JP | 1301431 | 12/1989 |
| JP | 2013490 | 1/1990 |
| JP | 2148927 | 6/1990 |
| JP | 2149196 | 6/1990 |
| JP | 2155853 | 6/1990 |
| JP | 2171399 | 7/1990 |
| JP | 2179567 | 7/1990 |
| JP | 2304791 | 12/1990 |
| JP | 6111124 | 4/1994 |
| JP | 7135500 | 5/1995 |
| JP | 7202918 | 8/1995 |
| JP | 9074551 | 3/1997 |
| WO | WO90/15508 | 12/1990 |
| WO | WO93/16558 | 8/1993 |
| WO | WO94/13105 | 6/1994 |
| WO | WO94/28679 | 8/1994 |
| WO | WO95/12853 | 5/1995 |
| WO | WO96/19897 | 6/1996 |

* cited by examiner

SYSTEM SOFTWARE ARCHITECTURE FOR A PASSENGER ENTERTAINMENT SYSTEM, METHOD AND ARTICLE OF MANUFACTURE

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

The present invention relates to providing entertainment to passengers in a vehicle, and more specifically, to systems, methods and articles of manufacture that provide for a networked passenger entertainment system that integrates audio, video, passenger information, product ordering and service processing, communications, and maintainability features, and permits passengers to selectively order or request products and services, receive video, audio and game data for entertainment purposes, and communicate with other passengers and computers on- and off-board the aircraft, and which thereby provides for passenger selected delivery of content over a communication network.

BACKGROUND OF THE INVENTION

The assignee of the present invention manufactures in-flight aircraft passenger entertainment systems. Such systems distribute audio and video material to passengers derived from a variety of sources. For example, such systems provide passengers with audio generated from audio tape players, movies derived from video tape players, and interactive services such as games, shopping and telecommunications. A variety of inventions have been patented by the assignee of the present invention and others relating to in-flight aircraft entertainment systems and their components. Certain of these prior art systems and components are summarized below.

U.S. Pat. No. 3,795,771 entitled "Passenger Entertainment/Passenger Service and Self-Test System" discloses a time multiplexed passenger entertainment and service combined system suitable for distribution throughout compartments of super aircraft. Common power supplies, cabling, and boxes, and hybrid microelectronics and/or medium or large scale MOSFET integrated circuit chips are employed. A main multiplexer receives passenger address or tape deck analog signals and converts them to a pulse code modulated digital bit stream which is time shared between channels. A coaxial cable transmits the bit stream to compartment submultiplexers. Each submultiplexer receives the digital bit stream, optionally inserts into the bit stream bits representing analog-to-digital converted movie audio or compartment introduced passenger address and distributes the data stream along four columns of seat group units on individual column coaxial cables. At each seat group unit a demultiplexer of a seat group demultiplexer/encoder converts the bit stream into the original analog signals, amplifiers the analog signals and drives individual seat transducers for passenger listening.

A passenger control unit provides channel and volume level selection. The passenger service system provides control functions comprising reading light, stewardess call (aisle and control panel lights and chimes). The service system comprises a section timer/decoder to generate binary logic pulses that are transmitted by cable sequentially down and up the seat columns from seat group unit to seat group unit. A similar cable connects the corresponding overhead unit containing the reading lights, etc. to the section timer/decoder. The seat encoder of each seat group demultiplexer/encoder receives digital interrogating signals, processes them relative to switch positions determined by the passenger and sends out results to the section timer/decoder. The overhead decoder of each seat group receives the retransmitted digital signals from the section timer/decoder and performs switching functions conforming to seat encoder commands. The system incorporates a self-test subsystem comprising a test signal generator and circuits operating in conjunction with the entertainment and service system circuits.

U.S. Pat. No. 5,289,272 entitled "Combined Data, Audio and Video Distribution System in Passenger Aircraft" discloses a passenger aircraft video distribution system that distributes modulated RF carrier signals from a central signal source to be used at each passenger seat. The carriers are modulated to contain audio, video also other digital data, such as graphics, and slide shows and the like. Analog video signals from the video source are modulated on individually discrete carriers in the range of 54 to 300 megahertz. Audio information, including audio sound channels and the video audio, are digitized and combined with digital data in a combined serial bit stream that is multiplexed, and then modulated on an RF carrier having a frequency sufficiently above the frequency band of the video signals so that the resulting spectrum of the modulated audio RF carrier does not interfere with the modulated video carriers. The RF carrier signals are combined and distributed to individual seats. The modulated audio carrier is separated from the video carriers at each seat or each group of seats and then demodulated and demultiplexed for selection at each individual seat of a chosen audio channel.

U.S. Pat. No. 4,866,515 entitled "Passenger Service and Entertainment System for Supplying Frequency-Multiplexed Video, Audio, and Television Game Software Signals to Passenger Seat Terminals" discloses a service and entertainment system for transmitting video signals, audio signals and television game software signals from a central transmitting apparatus to each of a plurality of terminals mounted at respective passenger seats in an aircraft, or at respective seats in a stadium, or theater, or the like. The video signals, audio signals and television game software signals are frequency-multiplexed and then transmitted to the terminals, so that desired ones of the frequency-multiplexed signals can be selected at each terminal unit.

U.S. Pat. No. 4,647,980 entitled "Aircraft Passenger Television System" discloses a television system that provides for individualized program selection and viewing by aircraft passengers. The system comprises a plurality of compact television receivers mounted in front of each airline passenger in a rearwardly facing position within the passenger seat immediately in front of each passenger. Each television receiver is provided as a lightweight module adapted for rapid, removable installation into a mounting bracket opening rearwardly on the rear side of a passenger seat, with a viewing screen set at a tilt angle accommodating an average reclined position of the seat. Exposed controls permit channel and volume selection by the individual passenger, and an audio headset is provided for plug-in connection to the module. A broadcast station on the aircraft provides prerecorded and/or locally received programs on different channels to each television module for individual passenger selection.

U.S. Pat. No. 4,630,821 entitled "Video Game Apparatus Integral with Aircraft Passenger Seat Tray" discloses a video game apparatus employed by a passenger of an aircraft. The apparatus includes a tray that is mounted on the rear of an aircraft seat. The tray has an internal hollow with a rectangular aperture on a top surface which surface faces the passenger when the tray is placed in a usable position. Located in the rectangular aperture is a TV display screen. Located in the internal hollow of the tray is a video game apparatus that operates to provide a video game display on the surface of said TV display screen. The surface of the tray containing the TV display screen also includes a plurality of control elements that are coupled to the video game apparatus to enable the passenger to operate the game. To energize the game, the tray contains a cable coupling assembly whereby when a cable is inserted into the assembly, the video game is energized to provide a display of a game selected by means of a selector switch also mounted on the top surface of the tray.

U.S. Pat. No. 4,352,200 entitled "Wireless Aircraft Passenger Audio Entertainment System" discloses that audio information in several audio channels is supplied via head sets to passengers seated aboard an aircraft in rows of seats including armrests and being distributed along an elongate passenger section inside a metallic fuselage. An antenna is run along the elongate passenger section of the aircraft for radio transmission inside such elongate passenger section. Individual antennas are provided for the passenger seats for receiving the latter radio transmission. These receiving antennas are distributed among predetermined armrests of the passenger seats. The audio information to be transmitted is provided in radio frequency channels in a band between 72 and 73 MHz. The distributed receiving antennas are coupled via seated passengers to the transmitting antenna. The radio frequency channels are transmitted in the mentioned band via the transmitting antenna, seated passengers and distributed receiving antennas to the predetermined armrests. Audio information is derived in the audio channels from the transmitted radio frequency channels also in the predetermined armrests. Passengers are individually enabled to select audio information from among the derived audio information in the audio channels. The selected audio information is applied individually to the headsets.

U.S. Pat. Nos. 5,965,647 and 5,617,331 entitled "Integrated Video and Audio Signal Distribution System and Method for use on Commercial Aircraft and Other Vehicles" disclose passenger entertainment systems employing an improved digital audio signal distribution system and method for use on commercial aircraft and other vehicles. A plurality of digital audio signal sources is provided for generating a plurality of compressed digital audio signals. The compressed digital audio signals are provided to a multiplexer that domain multiplexes the signals to produce a single composite digital audio data signal. The composite digital audio data signal is provided to a demultiplexer that is capable of selecting a desired channel from the composite digital audio data signal. The selected channel is provided to a decompression circuit, where it is expanded to produce a decompressed digital output signal. The decompressed digital output signal is then provided to a digital-to-analog converter and converted to an analog audio signal. The analog audio signal is provided to an audio transducer.

While the above patents disclose various aspects of passenger entertainment systems and components used therein, none of these prior art references disclose a fully integrated networked passenger entertainment system that integrates audio, video, product ordering and service processing, networked communications, and maintainability features. Accordingly, it is an objective of the present invention to provide for systems and methods that implement an integrated networked passenger entertainment and communication system that provides for passenger selected delivery of content over a communication network. It is a further objective of the present invention to provide for systems and methods that permit passengers to selectively order or request products or services, receive audio, video and game data, that permits communication of information to passengers from aircraft personnel, and that permits passengers to communicate with other passengers and computers located on- and off-board an aircraft.

SUMMARY OF THE INVENTION

The foregoing problems are overcome in an illustrative embodiment of the invention in which system software is used to enable a passenger entertainment system on a vehicle. The passenger entertainment system is configured and operated using the system software to provide passenger entertainment services including audio and video on-demand, information dissemination, product and service order processing, video teleconferencing and data communication services between passengers on-board the vehicle using a local networks, and between passengers and people and computers off-board the vehicle using a communications link.

The passenger entertainment system includes a system server such as a cabin file server having a plurality of interfaces and a network for supporting a plurality of computer processors that are each coupled to a video camera, a microphone, a video display, an audio reproducing device, and an input device located proximal to a plurality of seats. The computer processors and the system server comprise application software that selectively controls network applications and services. The system server has a plurality of interfaces to communications devices of the passenger entertainment system.

The system software is used to route and process passenger transactions from requesting computer processors and dispatch appropriate resources to fulfill the transactions. To achieve this, a passenger transaction is transmitted from a passenger-controlled component to a message processor in the system server. The message processor decodes the passenger transaction and generating a request in a predetermined format. The request is transmitted to a transaction dispatcher in the system server for routing. A database query is then generated in response to the request. The database query is transmitted to a database server in the system server having a database containing data regarding resources of the system that allow communication with and/or control of the communications devices and information relating to products and services offered by the system. An appropriate response is generated in response to the query. Appropriate resource defined in the response are then dispatched to the query to service the passenger transaction.

In the system server a plurality of network addressable units and pipe processors are preferably coupled between the message processor and transaction dispatcher to route requests and dispatch resources. An input/output handler and a plurality of device drivers in the system server are used to support video, audio, and network transmissions using the plurality of interfaces.

A graphical user interface is used by an operator to configure and operate the system. Responses to requests from the operator are obtained using application programming interface calls in response to request. Queries are generated in response to the application programming interface calls, which are routed to a database server coupled to the database. Responses to the queries are generated by outputting data from the database.

In the system server, a standard query language (SQL) database server is preferably coupled to a relational database. The database includes files containing information relating to each of the communications devices of the system. The information in the files contain data that allows communication with and/or control of these communicatiosn devices and contain information relating to products and services offered by the system.

BRIEF DESCRIPTION OF THE DRAWINGS

The various features and advantages of the present invention may be more readily understood with reference to the following detailed description taken in conjunction with the accompanying drawings, and in which.

DETAILED DESCRIPTION

System Overview

Figure 1:
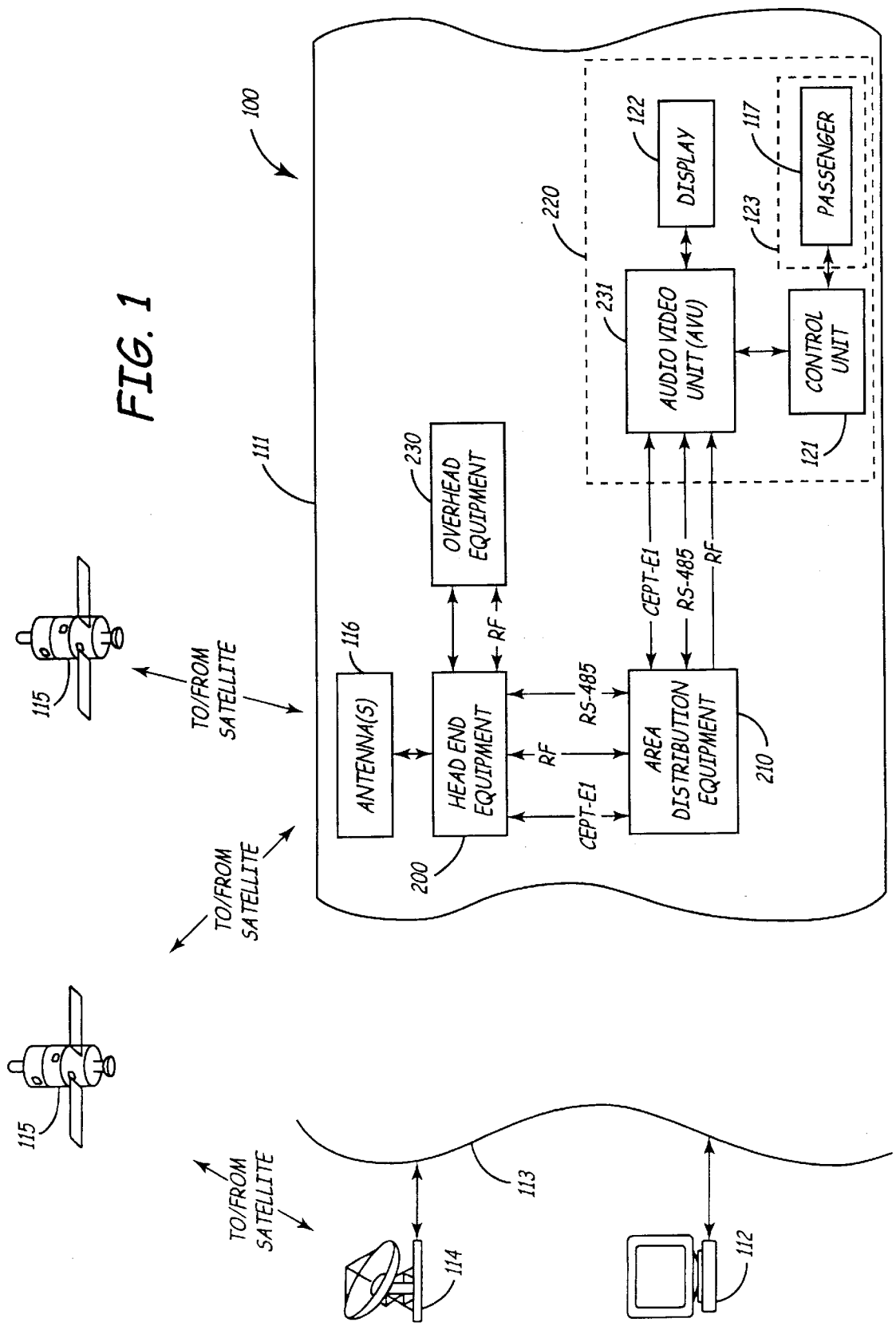
FIG. 1 illustrates an operational environment depicting a total entertainment system in accordance with a preferred embodiment.

FIG. 1 illustrates an operational environment depicting an exemplary total entertainment system 100 in accordance with a preferred embodiment. The operational environment shown in FIG. 1 depicts a flight of an aircraft 111 employing the total entertainment system 100. The total entertainment system 100 comprises an integrated networked passenger entertainment and communication system 100 that provides for in-flight passenger entertainment and information dissemination, service and product order processing, video teleconferencing and data communication between passengers on-board the aircraft 111, and video teleconferencing, voice and data communication between passengers 117 on-board the aircraft 111 and people and computers on the ground using local networks and the Internet 113. The present invention thus provides for a level of capabilities and services heretofore unavailable in any airborne passenger entertainment system.

The system 100 is comprises of four main functional areas including head end equipment 200, area distribution equipment 210, seat group equipment 220, and overhead equipment 230. The head end equipment 200 provides an interface to external hardware and operators. The area distribution equipment 210 routes signals to and/or from the head end equipment 200, the seat group equipment 220, and the overhead equipment 230, depending upon the type of service provided to or requested by the passengers. The seat group equipment 220 contains passenger control units (PCU) 121 and screen displays 122 for use by the passengers 117. The overhead equipment 230 includes video monitors and/or projectors and bulkhead screens or displays for displaying movies and other information. The system 100 thus routes or otherwise displays information to the passengers either under control of the flight attendants or passengers 117.

Video conferencing data and computer data derived from ground based computers 112 connected to the Internet 113 are transferred over the Internet 113 to a satellite ground station 114 and are uplinked to a communications satellite 115 orbiting the Earth. The communications satellite 115 downlinks the video conferencing and/or computer data to the aircraft 111 which is received by way of an antenna 116 that is part of a satellite communications system employed in the head end equipment 200 of the system 100. In a similar manner, video conferencing data and/or computer data derived from passengers 117 on-board the aircraft 111 is uplinked to the satellite 115 by way of the satellite communications system and antenna 116 to the satellite 115, and from there is downlinked by way of the satellite ground station 114 and Internet 113 to the ground based computer 112.

One or more satellites 115, which may be the same as or different from the satellites 115 used for Internet communication, transmit television signals to the aircraft 111. One currently deployed satellite television broadcast system is the DIRECTV system that has orbiting satellites 115 that may be used to transmit television programs to the aircraft 111, in a manner similar to ground-based systems used in homes and businesses. In the present system 100, however, a steerable antenna 116 is used to track the position of the satellite 115 that transmits the signals so that the antenna 116 remains locked onto the transmitted signal.

Handheld or fixed passenger control units 121 and seatback screen displays 122 (seat displays 122) are provided at each passenger seat 123 that permit the passengers 117 to interface to the system 100. The passenger control units 121 are used to control downloading of movies for viewing, select audio channels for listening, initiate service calls to flight attendants, order products and services, and control lighting. The passenger control units 121 are also used to control game programs that are downloaded and played at the passenger seat 123. In addition, the passenger control units 121 are also used to initiate video conferencing and computer data transfer sessions either within the aircraft or with ground based computers 112.

The present system 100 thus provides for an integrated and networked passenger entertainment and communication system 100 that in essence functions as an airborne intranet that provides a level of passenger selected and controlled entertainment and communications services, passenger services and product ordering services that has heretofore not been provided to aircraft passengers.

Figure 2:
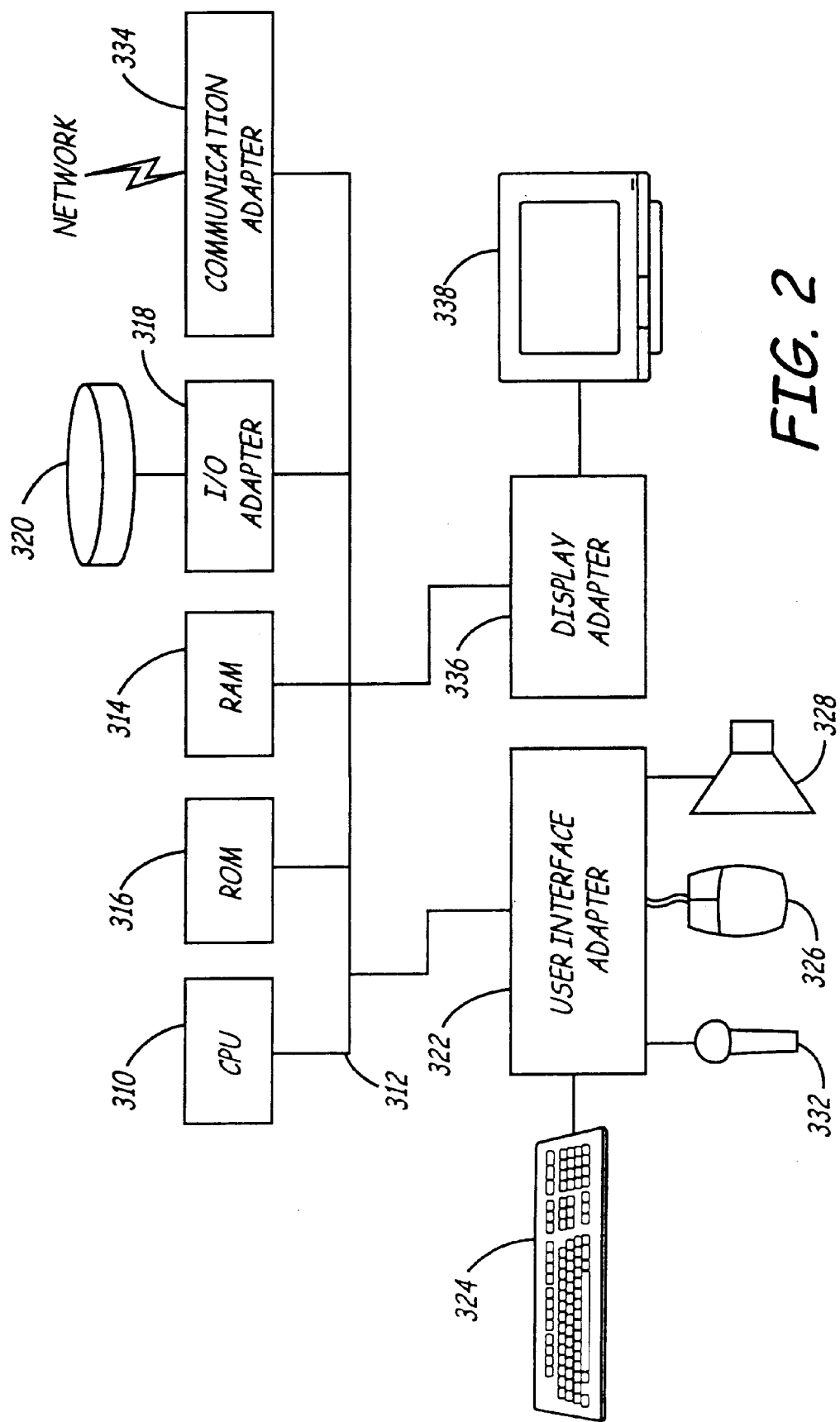
FIG. 2 shows a diagram illustrating a typical hardware configuration of a workstation employed in accordance with a preferred embodiment.

An embodiment of the system 100 is practiced in the context of a personal computer such as the IBM PS/2, Apple Macintosh computer or UNIX based workstation. A representative hardware environment is depicted in FIG. 2, which illustrates a typical hardware configuration of a workstation in accordance with an embodiment having a central processing unit 310, such as a microprocessor, and a number of other units interconnected via a system bus 312. The workstation shown in FIG. 2 includes a random access memory (RAM) 314, read only memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network (e.g., a data processing network) and a display adapter 336 for connecting the bus 312 to a display device 338. The workstation typically has resident thereon an operating system such as the Microsoft Windows NT or Windows/95 operating system (OS), the IBM OS/2 operating system, the MAC OS, or UNIX operating system. Those skilled in the art will appreciate that the present invention may also be implemented on platforms and operating systems other than those mentioned for example such as a PC-450 manufactured by Octagon Systems.

Detailed System Description

The in-flight entertainment system 100 in accordance with a preferred embodiment is a complex system with many components and that forms a total entertainment system (TES) 100. To assist the reader in making and utilizing the invention without undue experimentation, the following is a detailed description that discusses some of the components and a typical system configuration. The system 100 in accordance with a preferred embodiment is a configurable and scaleable in-flight entertainment system 100 that provides a wide range of passenger entertainment, communications, passenger service, and cabin management services. A fully capable system 100 provides passengers with audio entertainment, video entertainment, video games, and other interactive and communications services.

Figure 3:
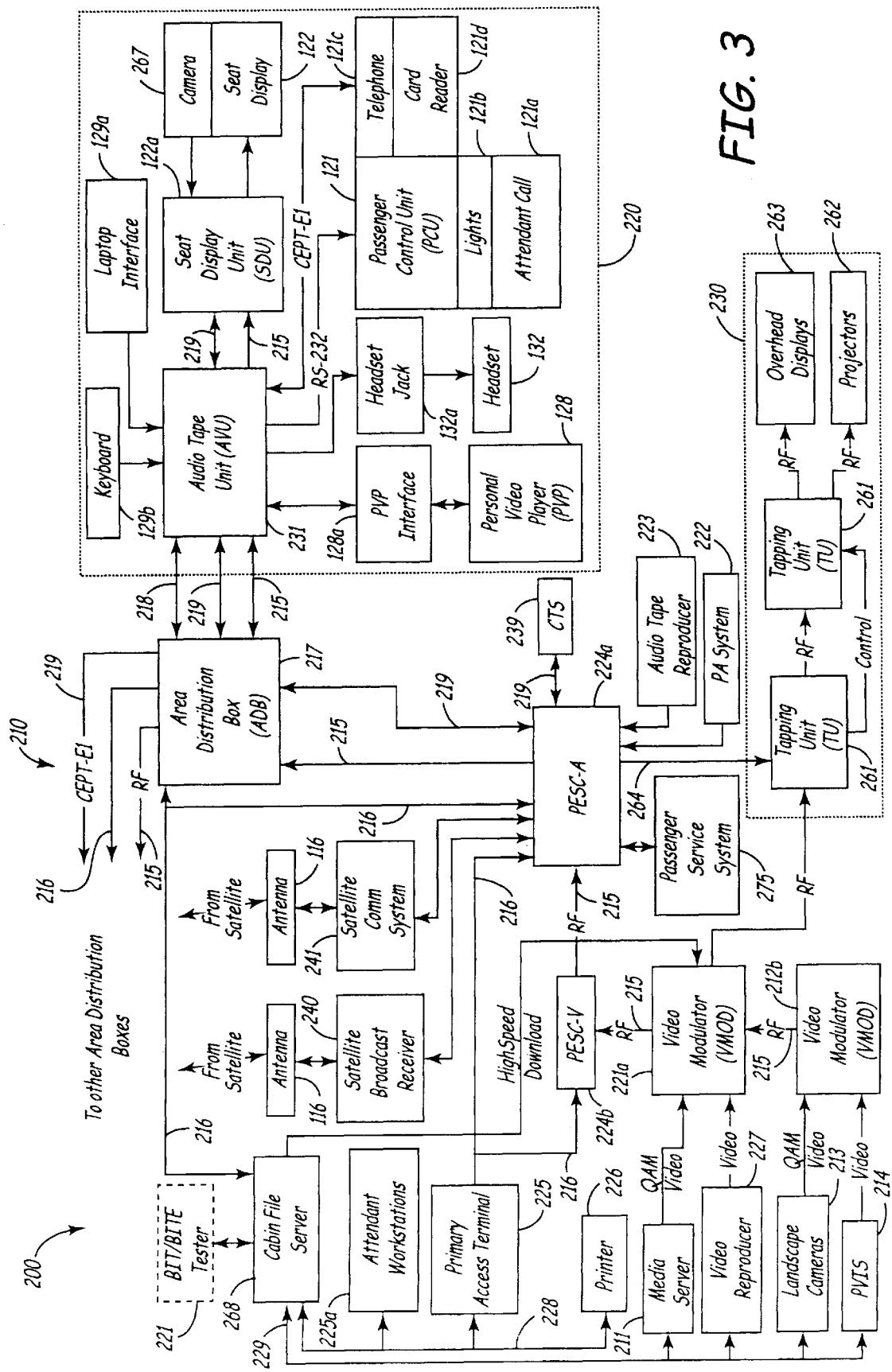
FIG. 3 shows a detailed block diagram of the total entertainment system.

The system 100 shown in FIG. 1 has four main functional areas comprising: 1) head end equipment 200, 2) area distribution equipment 210, 3) seat group equipment 220, and 4) overhead equipment 230. FIG. 3 shows the four functional areas and the line replaceable units (LRU) that comprise a typical passenger entertainment system 100. An overview of the LRUs in each of the functional areas is described in the following paragraphs.

Headend Equipment

The head end equipment 200 is the prime interface between external hardware and operators (purser and flight attendants). The head end equipment 200 includes an operator interface, an aircraft interface, a maintenance interface, an interface for downloading configuration data to the system 100 and for downloading reports from the system.

The head end equipment 200 shown in FIG. 3 comprises a primary access terminal (PAT) 225 and a cabin file server (CFS) 268 that are used to control the system 100. The cabin file server 268 is the system controller that controls many of the system functions, such as interactive functions, and stores the system configuration database and the applications software. The cabin file server 268 communicates with other components within the head end equipment 200 via an ARCNET interface 216. The cabin file server may be a computer terminal as shown in FIG. 2 that includes a hard disk drive and a database that stores the system 100 configuration and other system 100 information.

The cabin file server 268 is coupled to the primary access terminal 225 and to a printer 226 by way of an Ethernet network 228, such as a 100 Base-T Ethernet network, for example. Flight attendant workstations 225a are also coupled to the cabin file server 268 by way of the Ethernet network 228. A media file server 211 is controlled from the cabin file server 268 by way of an ARINC 485 (RS-485) network 229 coupled therebetween. The cabin file server 268 is optionally coupled to a BIT/BITE tester 221 that is used to perform built in testing operations on the system 100.

The cabin file server 268 provides the following functions: processes and stores transaction information from passengers; stores passenger usage statistics for movies, games, and shipping; stores passenger survey responses; stores flight attendant usage statistics for login/logout; provides flight attendant access control; controls the video reproducers; controls the landscape camera; controls the PVIS line replaceable unit; stores seat application software and game software; distributes seat application and game software via the RF distribution system; provides power backup sufficient to allow orderly automatic shutdown of the cabin file server 268 operating system when primary power is removed; provides indicators representing power, operational status, and communication status; downloads databases via the RF distribution system; provides the ability to print reports; and provides connectors for a keyboard, monitor, and mouse.

The primary access terminal 225 shown in FIG. 3 provides the operator interface to the system 100, enabling the operator to centrally control a video reproducer 227 and a media server 211, start BITE, control the landscape cameras 213, and other functions provided in the system 100. The primary access terminal 225 may also be a computer terminal as shown in FIG. 2 that may include a hard disk drive and a display 338 for graphical user interface (GUI) by a flight attendant to the system 100. The display may be a touch screen display to access the system 100. A keyboard (not shown) may also be provided to access the system 100. The primary access terminal 225 is used to configure the system 100 to set up the entertainment options that are available to passengers 117. The flight attendant workstations 225a are distributed throughout the aircraft 111 and allow flight attendants to respond to passenger service requests and to process orders and monetary transactions.

The primary access terminal 225 provides the following functions: a flight attendant interface to the cabin sales capability, a flight attendant interface to the video entertainment capability, a flight attendant interface to the report and receipt printing capability, monitoring of video and audio output from the video reproducer, maintenance personnel interface to system diagnostics and status reports, power backup sufficient to allow an orderly shutdown of the primary access terminal operating system when primary power is removed, indicators representing power, operational status, and communication status, single and dual plug stereo audio jack, magnetic card reader, and floppy disk drive.

The head end equipment 200 comprises the media server 211 that is coupled to a first video modulator 212a. The media server 211 may be one manufactured by Formation, for example. The media server 211 supplies 30 independent streams of video, and stores about 54 hour of video. The first video modulator 212a may be one manufactured by Olsen Technologies, for example. The video reproducer 227 (or video cassette player 227), such as a triple deck player manufactured by TEAC, for example, is also coupled to the first video modulator 212a. The video cassette player 227 may be three 8-mm Hi-8 video cassette players that output three video programs on three video channels under control of a flight attendant.

The video reproducer 227 (or video cassette player 227) outputs an NTSC video (and audio) streams corresponding to a first plurality of prerecorded video channels. The media server 211 stores and outputs a plurality of quadrature amplitude modulated MPEG-compressed video transport streams corresponding to a second plurality of prerecorded video channels. The first video modulator 212a modulates both the NTSC video streams from the video reproducer 227 and the quadrature amplitude modulated MPEG-compressed video streams from the media server 211 to produce modulated RF signals that are distributed to passenger seats 123 of the aircraft 111.

The head end equipment 200 also comprises one or more landscape cameras 213 and a passenger video information system (PVIS) 214 that are coupled to a second video modulator 212b. The landscape cameras 213 may be cameras manufactured by Sexton, or Puritan Bennett, for example. The second video modulator 212b may also be one manufactured by Olsen Technologies, for example. The passenger video information system 214 may be a unit manufactured by Airshow, for example.

The head end equipment 200 comprises first and second passenger entertainment system controllers (PESC-A, PESC-V) 224a, 224b, that comprise video, audio and telephone processors. Although only one unit is shown in FIG. 3, in certain configurations, primary and secondary PESC-A controllers 224a may be used. The second video modulator 212b routes RF signals through the first video modulator 212a, and the outputs of both video modulators 212a, 212b are routed through the second passenger entertainment system controller (PESC-V) 224b to the first passenger entertainment system controller (PESC-A) 224a. The first passenger entertainment system controller (PESC-A) 224a is used to distribute video and data by way of an RF cable 215 and an ARCNET network 216, to area distribution equipment 210 that routes the video and data to the passenger seats 123. The PESC-A 224a also provides an interface to the overhead equipment 230.

The first passenger entertainment system controller (PESC-A) 224a is coupled to the cabin file server 268 by way of the ARCNET network 216, and is coupled to the primary access terminal (PAT) 225 and the second passenger entertainment system controller (PESC-V) 224b by way of the ARCNET network 216. The first passenger entertainment system controller (PESC-A) 224a is also coupled to a public address (PA) system 222, to an audio tape reproducer (ATR) 223, and to a cabin telephone system (CTS) 239. The audio tape reproducer 223 may be one manufactured by Sony or Matsushita, for example. The cabin telephone system 239 may be systems manufactured by AT&T or GTE, for example. Signals associated with the cabin telephone system 239 are routed through the system 100 by means of a CEPT-E1 network 219.

The passenger entertainment system audio controller (PESC-A) 224a and the passenger entertainment system video controller (PESC-V) 224b are similarly designed and have similar capabilities. However, some features are implemented only in the PESC-A 224a or only in the PESC-V 224b. The passenger entertainment system controller software implements specific features particular to the PESC-A 224a or PESC-V 224b.

The passenger entertainment system controller performs the following functions: digitizes up to 32 audio inputs from entertainment and video audio sources, RF modulates the digital data, mixes the RF digital audio data with the RF input from a VMOD or another passenger entertainment system controller, outputs the combined RF video carrier and RF digital audio information to the RF distribution system, inputs up to five analog inputs, and multiplex in any combination to a maximum of five analog outputs, provides programmable volume control of the five analog outputs, provides RS-232, RS-485, ARINC-429, and ARCNET communications interfaces, provides input discretes for the control and distribution of PA audio to the seats, provides input and output discretes for the control and distribution of video announcement audio to the overhead PA system of the aircraft 111, provides input discretes for passenger entertainment system controller type and address information, provides input discrete for aircraft status (in air/on ground), amplifies output RF, software monitorable and controllable, provides an external test/diagnostic communication port, provides indicators representing power, operation status, and communication status, provides telephone control and distribution (PESC-A 224a only), and provides a fault depository for BIT data (PESC-A primary 224a only).

The first passenger entertainment system controller (PESC-A) 224a is coupled to a plurality of area distribution boxes 217 by way of the RF cable 215 and the ARCNET network 216. The area distribution boxes 217 are used to distribute digital and analog video streams to the audio-video distribution units 231 at the passenger seats 123.

Figure 4:
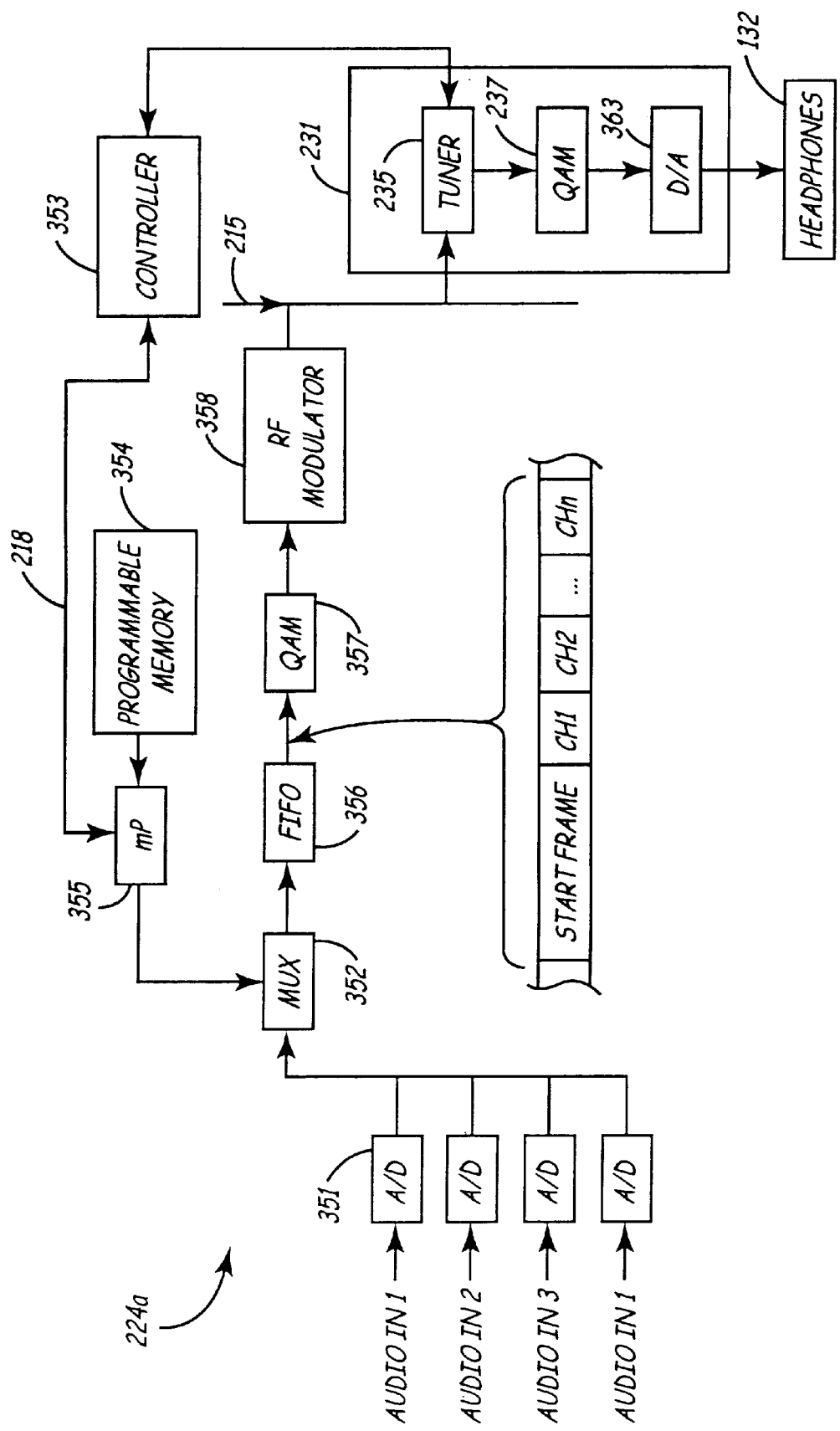
FIG. 4 is a diagram illustrating a passenger entertainment system controller.

FIG. 4 is a diagram illustrating the passenger entertainment system controller (PESC-A) 224a and a cooperative audio-video unit 231 that provide for distribution of quadrature amplitude modulated (QAM) digital audio signals to passenger seats 123 throughout the aircraft 111. The passenger entertainment system controller 224a comprises a plurality of analog to digital converters (A/D) 351 that digitize audio input signals from input sources, such as one or more audio tape reproducers 223, the public address system 222 and a passenger service system 275. The digitized signals from these sources are multiplexed in a multiplexer (MUX) 352 that is controlled by a controller 353 and microprocessor ($\mu$P) 355 having a programmable memory 354. The programmable memory 354 stores code for use by the microprocessor 355 in multiplexing the signals.

The output of the multiplexer 352 is input to a first-in first-out (FIFO) buffer 356 and output signals therefrom are quadrature amplitude modulated using a quadrature amplitude modulator (QAM) 357. The format of the output signals from the FIFO buffer 356 is shown and includes a start frame set of bits (header) followed by each of the respective audio channels (CH1. . . CHn). The output of the quadrature amplitude modulator 357 is modulated onto a carrier by an RF modulator 358 that transmits the QAM and RF modulated signal over the RF cable 215 to the audio-video units 231 at each of the passenger seats 123.

The audio-video units 231 each comprise a RF tuner 235 that demodulates the RF modulated signal transmitted over the RF cable 215 that is coupled to a QAM demodulator 237 that demodulates the quadrature amplitude modulated signals. The output of the QAM demodulator 237 is converted to an analog signal by a digital to analog converter (D/A) 363 and sent to the headphones 132. Selection of a particular channel to be listened to by a passenger 117 is made using the tuner 361 that demodulates the signal associated with the selected channel.

The quadrature amplitude modulated (QAM) digital audio distribution provides for a greater number of audio channels to be communicated over the RF cable 215. This is similar to the quadrature amplitude modulation of the video streams discussed above with reference to FIG. 3. The quadrature amplitude modulation provides for a plurality of states (not compression) that increases the usage of the bandwidth of the RF cable 215. Any type of analog input signal may be processed, including signals from the audio tape reproducers 223, passenger address system 222, passenger service system 275 or other analog audio source.

Area Distribution Equipment

Figure 5:
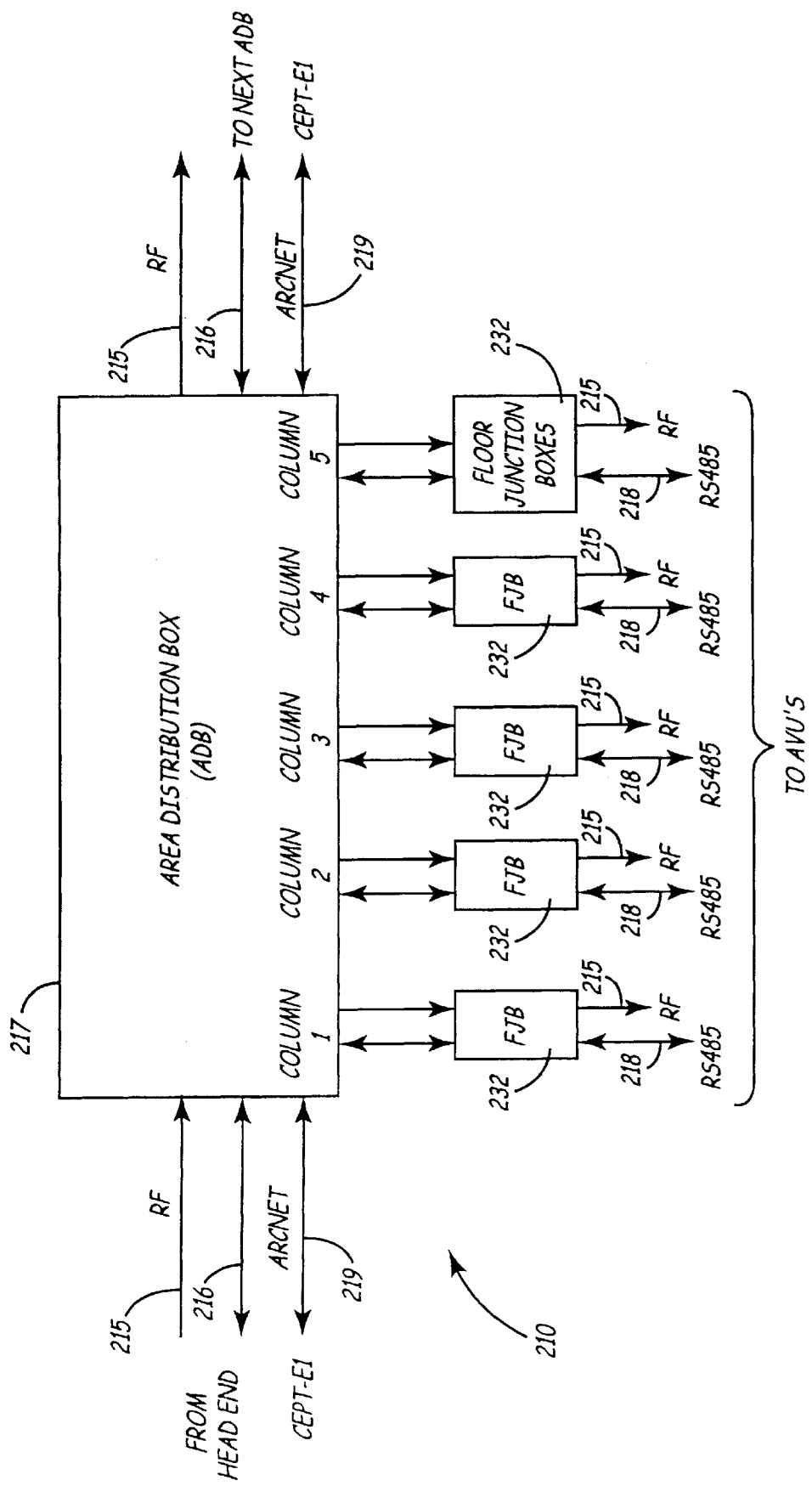
FIG. 5 is a block diagram of area distribution equipment in accordance with a preferred embodiment.

The area distribution equipment 210 shown in FIG. 3 distributes information from the head end equipment 200 to the seat group equipment 220. The area distribution equipment 210 also provides power to the seat group equipment 220. FIG. 5 is a block diagram showing the area distribution equipment 210 in accordance with a preferred embodiment.

The area distribution equipment 210 distributes data throughout the communications network formed between the head end equipment 200 and the seat group equipment 220. The area distribution equipment 210 comprises the plurality of area distribution boxes 217 that are each coupled to a plurality of floor junction boxes 232 that are individually coupled to respective audio-video seat distribution units 231 in the seat group equipment 220 of respective columns of passenger seats 123. The area distribution boxes 217 interface to the audio-video seat distribution units 231 by way of the junction boxes 232 using full-duplex RS-485 interfaces 218 and RF cables 215. The RS-485 interfaces provide control and data links between the seat group equipment 220 and the area distribution boxes 217. The RF cables 215 couple audio and video data to headphones 132 and seat displays 122 for listening and viewing by the passengers 117. In a basic system, the area distribution box (ADB) 217 provides for interfacing the primary passenger entertainment system controller (PESC-A) 224a to audio-video units 231, either directly or via floor junction boxes 232. The area distribution box 217 acts as a connection box for up to five columns of audio-video units 231, and relay of service data and combined audio/video signals to the next area distribution box 217. The area distribution box 217 receives combined audio/video via a RF coaxial input 215 from the primary passenger entertainment system controller (PESC-A) 224a or a previous area distribution box 217.

The area distribution box 217 provides for interfacing voice data, originating at passenger telephones 121c, to the passenger entertainment system controller 224a. The telephone interface provides for input data from each AVU column to be combined with input data from another area distribution box 217 and retransmitted to the passenger entertainment system controller 224a or the next area distribution box 217.

Seat Group Equipment

Figure 6:
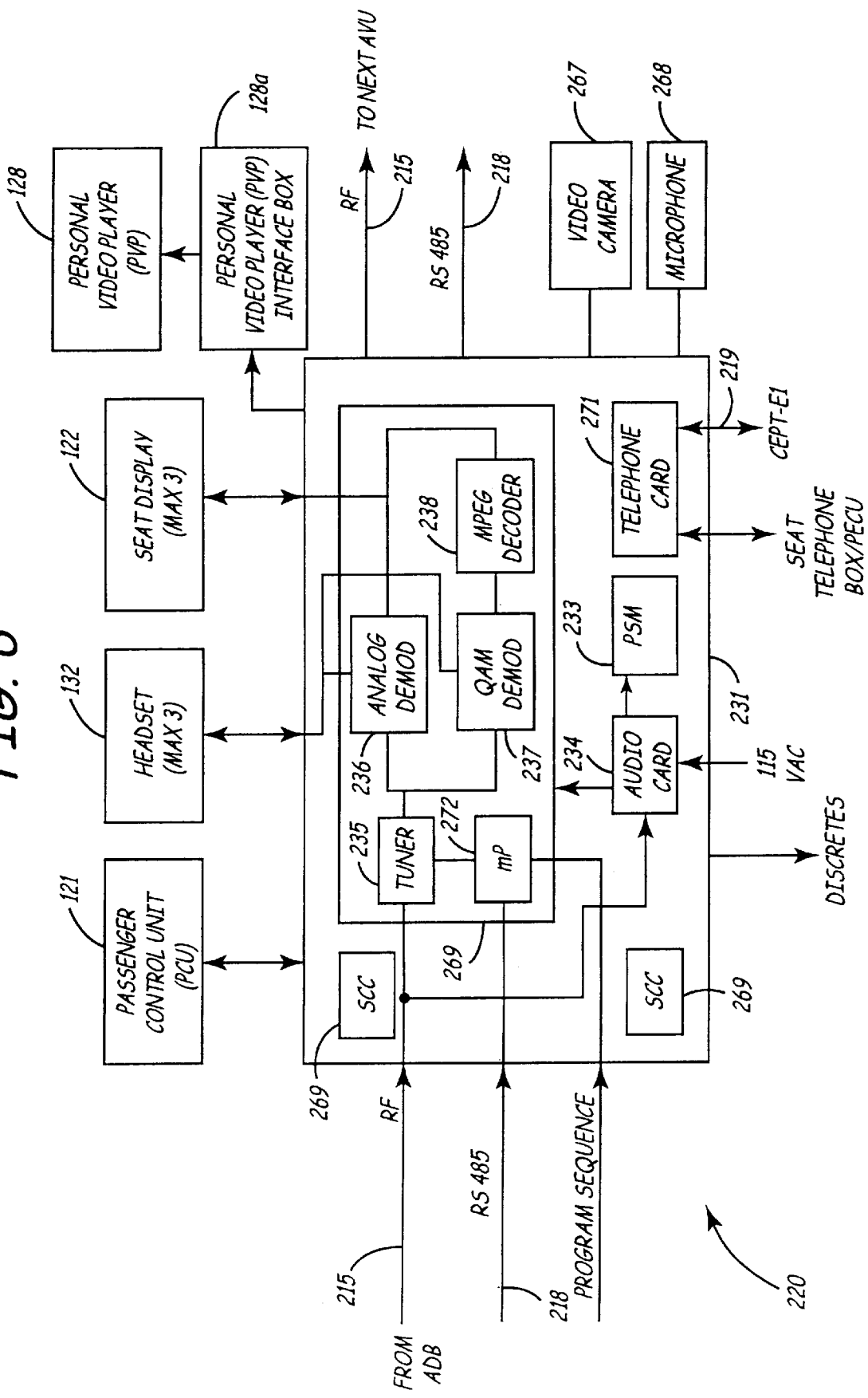
FIG. 6 is a block diagram of seat group equipment in accordance with a preferred embodiment.

FIG. 6 is a block diagram of exemplary seat group equipment 220 in accordance with a preferred embodiment. The seat group equipment 220 provides an interface for individual passengers 117. The seat group equipment 220 allows passengers 117 to interact with the system 100 to view movies, listen to audio, select languages, play games, video conference with others on and off the aircraft 111, and interface with other interactive services. The seat group equipment 220 includes a passenger control unit 121, a seat display 122, headphones 132, interface 128a for the personal video player 128 (in certain zones), an audio-video unit 231 with a plurality of seat controller cards (SCC) 269 one for each seat 123 in a row to interface with the area distribution equipment 210, a video camera 267 and a microphone 268 for use in video conferencing, and a telephone card 271 that interfaces to the passenger control unit 121 when it includes the telephone 121c and/or credit card reader 121d.

The major functional requirements of the audio-video unit 231 are that it drives one to three seat display units 122 with or without touch screens, provides touch screen and display controls, provides two audio jacks per seat, provides two passenger control unit interfaces per seat 123, interfaces to a parallel telephone system, provides discrete signal interface, a parallel laptop power supply system, demodulates and tunes NTSC and QAM from the RF signal, provides PC type video games, provides an RS-485 interface for ADB-AVU or AVU-AVU communications, provides an interface for personal video players, and provides a PSS interface to an external parallel passenger service system (PSS), provides hardware and software interfaces that provide for video teleconferencing and Internet communications.

Referring to FIG. 6, one seat controller card 269 is dedicated to a passenger seat. Therefore, three seat controller cards 269 are required for a three-wide audio-video unit. Two seat controller cards 269 are required for a two-wide audio-video unit 231. A power supply module (PSM) 233 supplies power for the three seat controller cards 269, an audio card 234, the displays, and PCUs 121. The audio card 234 electrical circuits comprise RF demodulators to supply audio outputs. An interconnect card (not shown) connects the three seat controller cards 269, the audio card, the power supply module, and external connectors within the AVU 231.

The seat controller card (SCC) 269 provides many functions for a single passenger. Some of the functions that the seat controller card 269 provides include analog video and audio demodulation, graphics overlay capability, and Motion Picture Experts Group (MPEG) video and audio decompression. The seat controller card 269 provides the ability to demodulate the existing analog video signals as well as MPEG encoded signals delivered by the media server 211 that comprises a video-on-demand (VOD) server.

Figure 7:
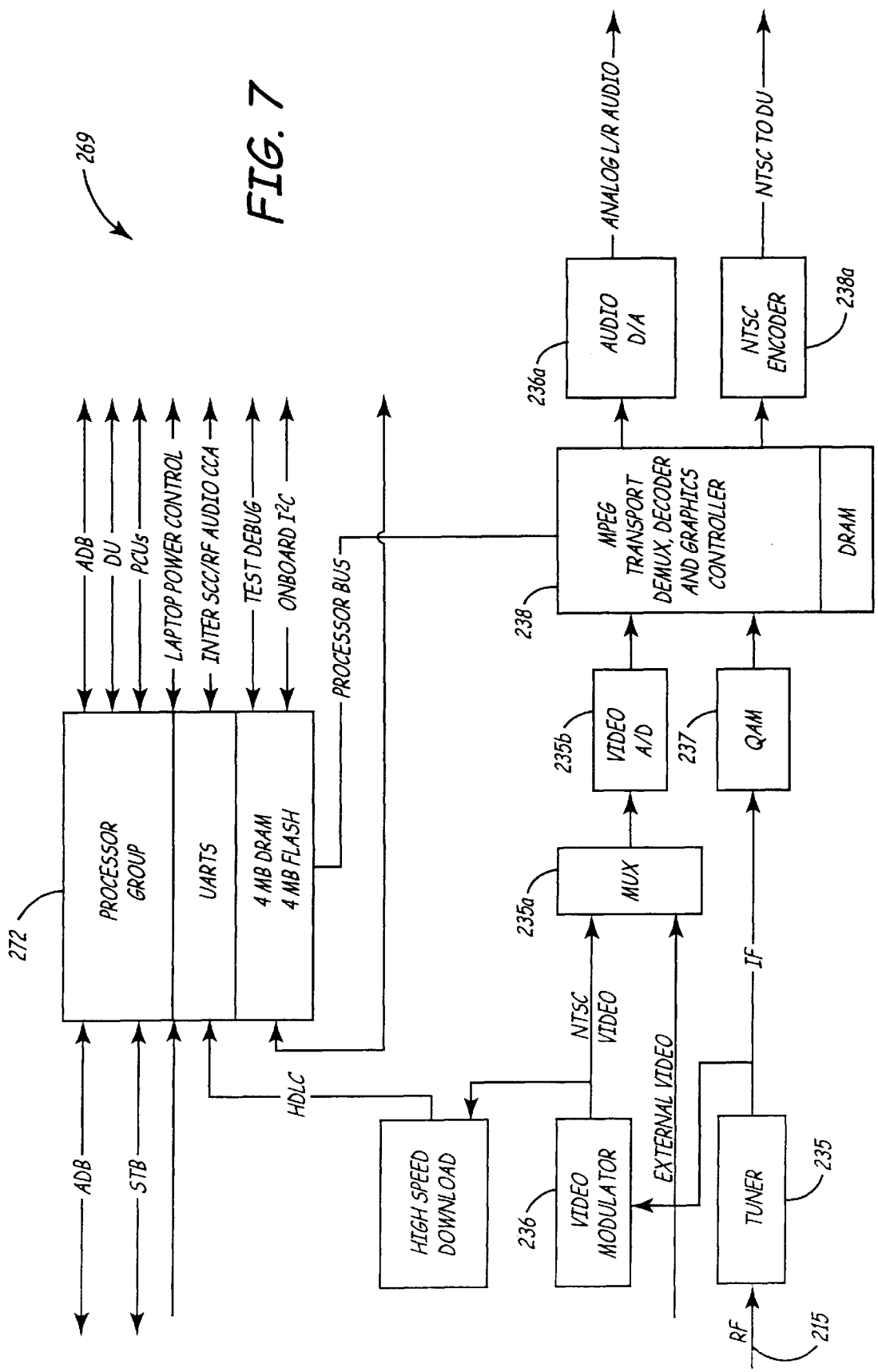
FIG. 7 is a block diagram of the seat controller card of the seat group equipment in accordance with a preferred embodiment.

The seat controller cards 269 in FIG. 7 is each audio-video seat distribution unit 231 contain a tuner 235 that demodulates the modulated RF signals to produce intermediate frequency signals containing the NTSC video streams and the quadrature amplitude modulated (QAM) MPEG compressed video streams. A QAM demodulator 237 and an MPEG decoder 238 are used to demodulate and decompress the quadrature amplitude modulated and compressed MPEG compressed video streams to produce MPEG NTSC video and audio signals for display.

An analog demodulator 236 demodulates the NTSC video signals that are then passed to a video multiplexer 235a where an external NTSC video signal may be added. The NTSC signals are then digitized in a video A/D converter 235b and are passed to the MPEG decoder 238. The format of the digital channels after QAM demodulation is MPEG-2 transport streams. The MPEG-2 transport streams may contain many streams of video, audio and data information. The MPEG decoder 238 (demultiplexer) may also receive data information to be sent to the SCC processor group 272. In the MPEG transport group, the capability exists to add text overlay with the digital video data. The digital data is converted to analog NTSC format using an NTSC encoder 238a for the display 122.

Each of the seat controller cards 269 includes a microprocessor (mP) 272 that controls the tuner. The microprocessor 272 is used to address the seat controller card 269 as a node on the network. A database is set up in the cabin file server 268 that includes entries for each of the microprocessors (i.e., each seat 123). The addressability feature permits programming of each seat to receive certain types of data. Thus, each audio-video unit 231 may be programmed to selectively receive certain videos or groups of video selections, or audio selections from selected audio reproducers. The addressability aspect of the present system 100 allows the airline to put together entertainment "packages" for distribution to different zones or groups of seats. Also, each seat (or seats in different zones) may be programmed to be able to play games, use the telephones 121c and credit card reader 121d, use a personal video player or computer, have the ability to engage in video teleconferencing and computer data interchange, or gain access to the Internet. Furthermore, the addressability associated with each seat permits order processing and tracking, and control over menus that are available to passengers at respective seats, for example. The addressability feature also permits dynamic reconfiguration of the total entertainment system 100.

The audio card 234 in FIG. 6 provides several functions. It demodulates the RF signal to provide audio. It has a multiplexer with audio inputs from the seat controller card 269, demodulated RF signal audio, and external audio. It routes the 115 VAC power to the power supply module and routes the DC power from the power supply module to the interconnect card.

Figure 8:
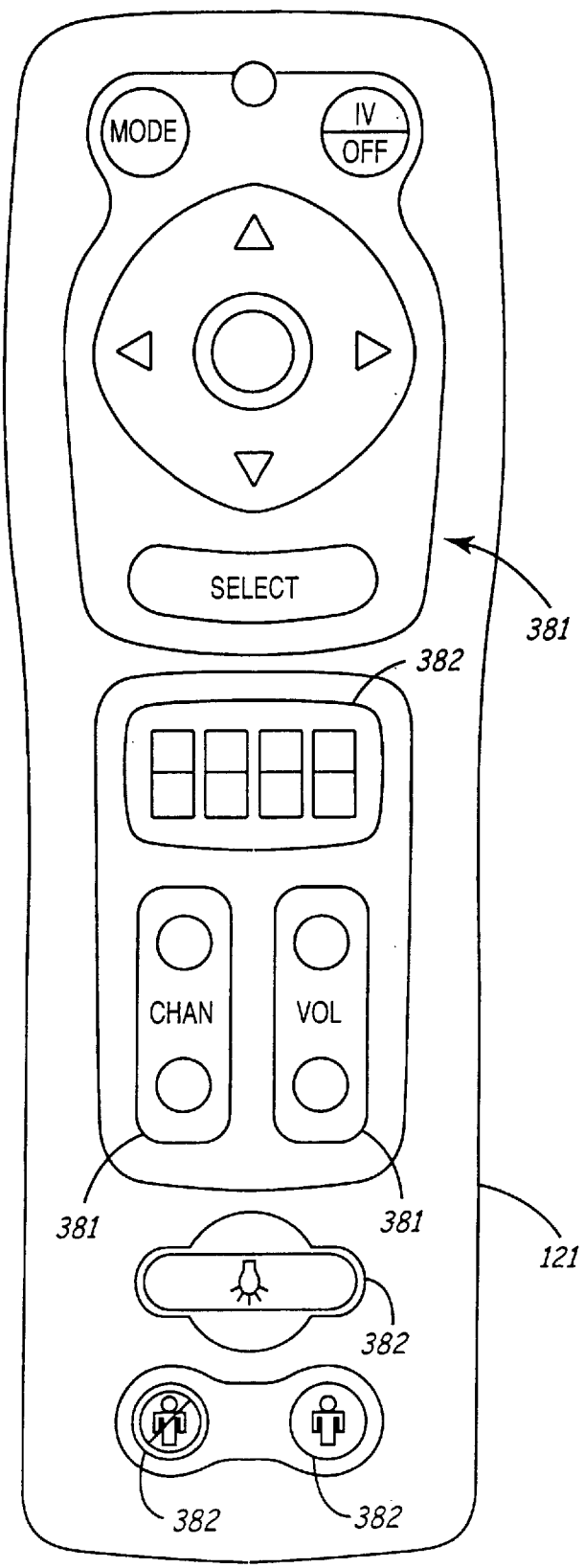
FIG. 8 illustrates a typical fixed passenger control unit.

FIG. 8 illustrates a typical fixed passenger control unit 121. The passenger control unit (PCU) 121 interfaces with the system via the audio-video unit (AVU) 231 and provides a passenger interface having input controls 381 and indicators 382. The passenger control unit 121 communicates with the audio-video unit 231 for PCU/AVU data, AVU/PCU data, and power.

The passenger control unit 121 also comprises depressible buttons that permit selection of items displayed on the seat display 122 and turn on call lights and overhead lights, and electronics. The passengers thus control reading lights and flight attendant call enunciators via the passenger control unit 121 for making selections. In designated sections or seats, the passengers also control selection of movies and games that are to be played, control the landscape cameras, and activate video conferencing and data communications. In selected sections (business and first class) of the aircraft 111, the telephone 121c and credit reader 121d are integrated into the passenger control unit 121, while in other sections (such as coach class) these components are not provided.

Overheat Equipment

Figure 9:
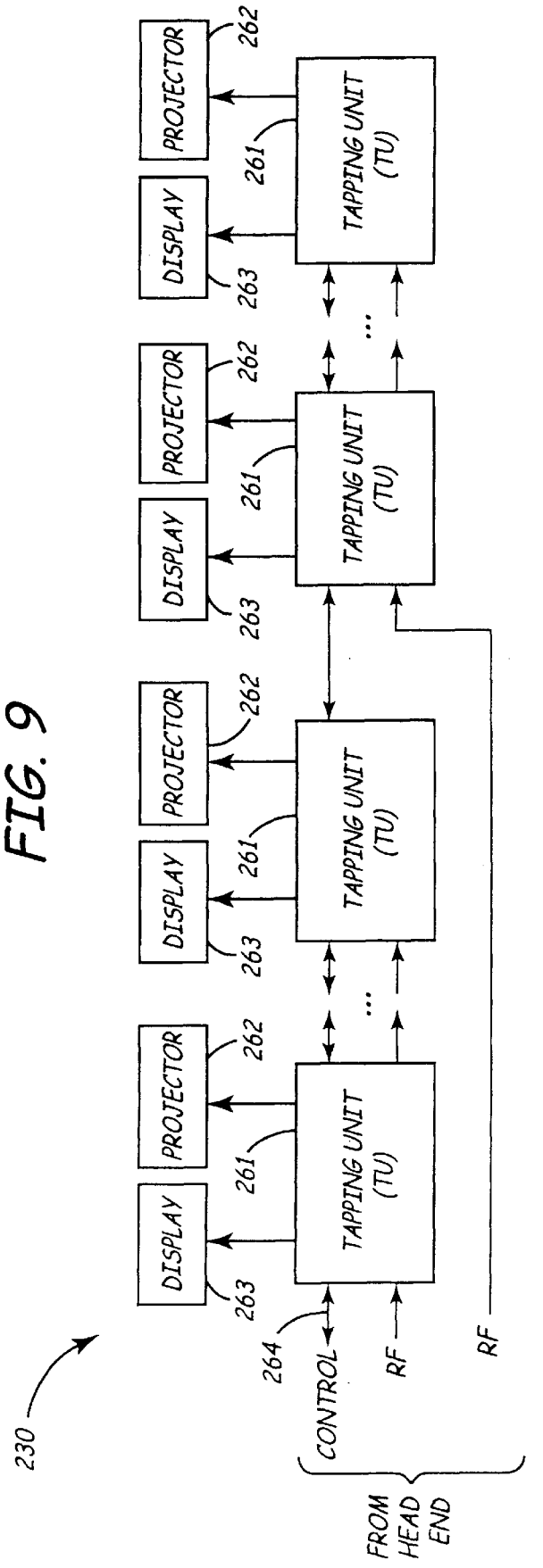
FIG. 9 is a block diagram of overhead equipment in accordance with a preferred embodiment.

FIG. 9 is a block diagram of exemplary overhead equipment 230 in accordance with a preferred embodiment. The overhead equipment 230 comprises a plurality of tapping units 261 coupled to the overhead and bulkhead displays 263 and video projectors 262. The overhead equipment 230 uses RF video distribution, wherein the RF signal is distributed from the head end equipment 200 to the overhead equipment 230 via the plurality of tapping units 261 which are connected in series. The tapping units 261 contain tuners 235 to select and demodulate the RF signal providing video for the monitors 263 and projectors 262 coupled thereof. Control is provided to the overhead equipment 230 using an RS-485 interface 264 coupled to the first passenger entertainment system controller (PESC-A) 224a. The information on the RS-485 interface 264 between the first passenger entertainment system controller (PESC-A) 224a and the tapping units 261 is controlled via operator input and protocol software running on the cabin file server 268.

System Operation

A preferred embodiment of the in-flight entertainment system 100 operates in three possible states. These states include a configuration state, a ground maintenance state, and an entertainment state. In the configuration state, aircraft-installation-unique parameters are initialized and modified. The configuration state is initiated by an operator. The configuration state is entered and excited without the use of additional or modified system hardware. In the ground maintenance state, the system 100 performs self-diagnostics to determine system failures. The ground maintenance state is initiated by an operator. The ground maintenance state is entered and exited without the use of additional or modified system hardware. The entertainment state is the primary state of the system 100 and is initiated by the operator. The system 100 provides several entertainment modes as defined below. The system 100 has modular in design so any one or all modes may exist simultaneously depending on the configuration of the system 100. The system 100 is configurable so that each zone (first class, business class, coach class, for example) of the aircraft 111 can operate in a different entertainment mode. In the entertainment state, the passenger address functions and passenger service functions are independent of the mode of operation.

The entertainment modes include an overhead video mode, a distributed video mode, and an interactive video mode. In the overhead video mode, video is displayed in the aircraft on the overhead monitors 163. Different video entertainment is possible for different sections of the aircraft. In the distributed video mode, multiple video programs are distributed to the individual passengers of the aircraft at their seat. The passenger selects the video program to view. The quantity of programs available depends upon system configuration. In the interactive video mode, the system 100 provides a selection of features in a graphical user interface (GUI) presentation to the passenger. Depending on the system configuration, the features may include language selection, audio selection, movie selection, video game selection, surveys, and display settings.

Presented below are additional details and summaries regarding specific novel features of the total entertainment system 100, as they relate to in-flight entertainment systems.

As a primary novel feature, the total entertainment system 100 functions as an airborne radio frequency (RF) integrated network environment that integrates, manages and distributes video data, audio data, telecommunications data, voice data, video game data, satellite broadcast television data, provides video conferencing within and without the aircraft 111, passenger service ordering and processing. The satellite broadcast television data may be distributed to passengers when the aircraft 111 is in out of range of signals transmitted by the satellites. An in-flight gaming or gambling system may be integrated into the system 100. The system 100 can be dynamically configured to provide video and audio on demand by individual passengers, to groups of passengers, or to sections of the aircraft 111. The system 100 provides for video conferencing and communication of data between passengers on-board the aircraft 111, as well as people and computers at remote locations by way of the satellite link and Internet.

Another feature of the system provides for the use of a watchdog timer in the processors that provide for a "glitchless" restart of the processor in the event of a failure caused by an electrostatic discharge even or an software "failure", or the like. The watchdog timer operates in a manner wherein, when an event causes the watchdog timer to trigger, the processor is rebooted and brought back on-line using the automatic sequencing feature provided by the present invention.

System Software

The system 100 employs a software architecture that integrates processing performed by each of the subsystems. The software and firmware comprising the software architecture controls the system, manages the flow of analog and digital audio and video data to passenger consoles and displays, manages the flow of communications data, and manages service and order processing. Various subsystems also have their own software architectures that are integrated into the overall system software architecture.

The system software is designed in a layered fashion, and an application programming interface (API) layer is defined and documented for the primary access terminal 225 and seat display 122. These application programming interfaces are used as the foundation upon which to implement the graphical user interfaces (GUIs). The GUIs are thus implemented in a manner that facilitates rapid prototyping and GUI modification within the constraints of the services provided by the application programming interfaces. The system 100 has a flight attendant GUI at the primary access terminal 225 and passenger GUIs at the seat 123 (seat display unit 122a). Each of these GUIs have the following properties: graphic orientation, clear and directly selectable functions (no "hidden" functions), consistency in screen layout and flow (look and feel), and "lexical" feedback (i.e., visible change on the display) for every user action.

Software and firmware employed in the present invention permits credit cart processing, data collection processing, Internet processing for each passenger, gambling for each passenger, duty free ordering, intra-cabin audio communication between passengers, and display of flight information. The system software includes parallel telephone system software, landscape camera management software, PESC system software, passenger address override software, passenger address emergency software, monetary transaction processing software, language support software, built-in-test software, user request processing software, database management software using a distributed configuration database, software for implementing interactive access, software for processing passenger orders, software for updating inventories, application software, media file encryption software, area distribution box software, audio-video unit programming software, telephone operation software, gatelink node and software, product service pricing software, passenger survey software, transaction reporting software, automatic seat availability reporting software, and video conferencing and data communications software.

Software Architecture

Figure 10:
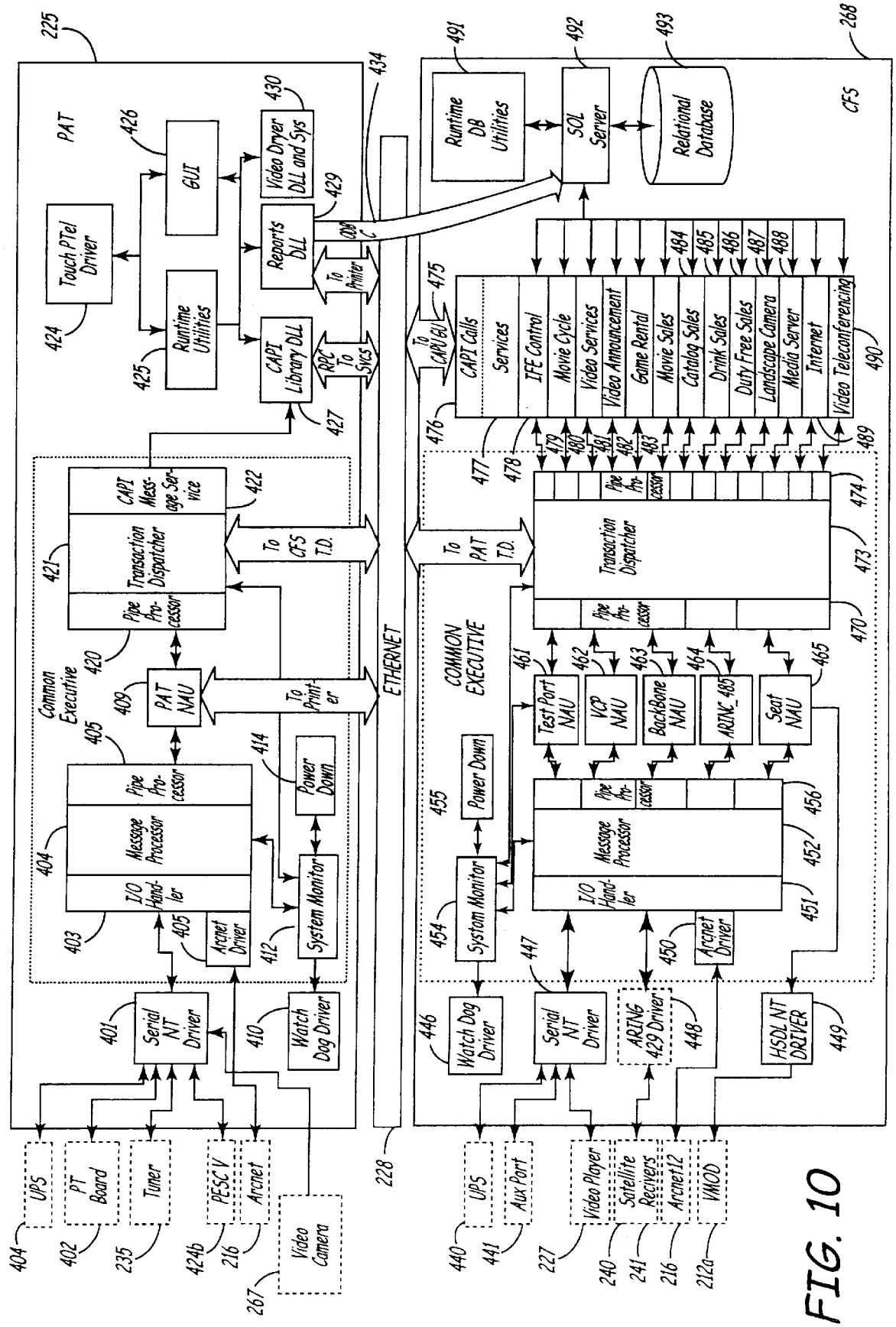
FIG. 10 is a block diagram of the software architecture in accordance with a preferred embodiment.

Presented below is software design information for a set of programs common to the cabin file server 268 and primary access terminal 225 LRUs of the system 100. The software forms the fundamental mechanism of moving application information through the system 100. The following description will be readily understood to those familiar with C++ and the Windows NT development environment. Reference is made to FIG. 10, which illustrates a block diagram of the software architecture in accordance with a preferred embodiment. The architecture facilitates a control center runtime that is implemented in C++ for the primary access terminal 225 and the cabin file server 268 of an in-flight entertainment system 100.

As for the primary access terminal 225, an uninterruptable power supply 400 is used to provide power to the primary access terminal 225 and is in communication with the programs in the software architecture using a serial NT driver 401. A PI board 402 provides a communication port for the magnetic card reader and video tuner and interfaces to the serial NT driver 401. The tuner 235 in the audio-video unit 231 also interfaces to the serial NT driver 401. The video camera 267 coupled to the audio-video unit 231 is also coupled to the serial NT driver 401. The serial NT driver 401 also interfaces with the PESC-V 224b. An ARCNET driver 408 interfaces to the ARCNET network 216.

The serial NT driver 401 and ARCNET driver 408 interface to an I/O handler 403 to provide selective communications between a message processor 404 and the various communications devices (400, 402, 235, 267). The message processor 404 is responsible for processing messages and putting them into a common format for use by a transaction dispatcher 421. A pipe processor 405 is utilized to move common format messages from the message processor 404 through a primary access terminal network addressing unit (NAU) program 409 and through another pipe processor 420 into a transaction dispatcher 421. The message processor 404 also interfaces to a system monitor 412 that is coupled to a watch dog driver 410 that is used to automatically reset the primary access terminal 225 if no activity is detected in a given time interval, and a power down module 414 that performs graceful power down of the primary access terminal 225. The transaction dispatcher 421 interfaces with a cabin application programming interface (CAPI) library DLL 427 by means of a CAPI message service handler 422.

A touch panel NT driver 424 interfaces with runtime utilities 425 and a graphical user interface (GUI) 426 to provide operator control over the software. The runtime utilities 425 and graphical user interface 426 interface to the CAPI library DLL 427, a Reports DLL 429 and a video driver DLL and system (SYS) 430.

The Ethernet network 228 is used for messaging between the primary access terminal 225 and the cabin file server 268. The Ethernet network 228 interfaces to the primary access terminal network addressing unit 409, the transaction dispatcher 421, the CAPI Library DLL 427, the Reports DLL 429.

As for the cabin file server 268, an uninterruptable power supply 440 is used to provide power to the cabin file server 268 and is in communication with the programs in the software architecture using a serial NT driver 447. The serial NT driver 447 is also coupled to an auxiliary port 441 and the video reproducers 227. An ARINC-429 NT driver 448 is coupled to the satellite broadcast receiver 240 and the satellite communication system 241. An ARCNET driver 450 interfaces to the ARCNET network 216. A high-speed data link (HSDL) NT driver 449 interfaces to the video modulator 212b.

The serial NT driver 447, ARCNET driver 450 and ARINC-429 NT driver 448 interface to an I/O handler 451 to provide selective communications between a message processor 452 and the various communications devices (440, 441, 227, 216, 212b). The message processor 452 is responsible for processing messages and putting them into a common format for use by a transaction dispatcher 473. A pipe processor 456 is utilized to move common format messages from the message processor 452 through various network addressing units 461–465 and through another pipe processor 470 into the transaction dispatcher 473. The network addressing units 461–465 include a test port NAU program 461, a VCP NAU program 462, a backbone NAU program 463, an ARINC-485 NAU program 464 and a seat NAU program 465.

The message processor 452 also interfaces to a system monitor 454 that is coupled to a watch dog driver 446 that is used to automatically reset the cabin file server 268 if no activity is detected in a given time interval, and a power down module 455 that performs graceful power down of the cabin file server 268. Each of the network addressing units 461–465 is coupled to the system monitor 454. The system monitor 454 is also coupled to the transaction dispatcher 473. The transaction dispatcher 473 interfaces with CAPI services 477 that are called from the CAPI message service handler 422 in the primary access terminal 225. The transaction dispatcher 473 also interfaces to the primary access terminal 225 by way of the Ethernet network 228.

Cabin Application Programming Interface (CAPI) calls 476 are used to communicate information (as shown by arrow 475) between various cabin services 477 and the primary access terminal 225 via the Ethernet network 228 and various service interfaces. The separate communication link for the Reports DLL 429 is enabled through object oriented data base calls 434 to the Standard Query Language (SQL) server 492. The cabin services 477 include CAPI calls 476 with predefined formats for various services. The services include in-flight entertainment (IFE) control 478, movie cycle 479, video services 480, video announcement 481, game rental 482, movie sales 483, catalog sales 484, drink sales 485, duty-free sales 486, landscape camera 487, media server 488, Internet 489 and teleconferencing 490. Each of these services are controlled by way of the SQL server 492 which is coupled to a relational database 493 and are configured by means of runtime database utilities 491. The various services 478–490 are routed by way of the pipe processor 474 to the transaction dispatcher 473, through the associated NAU program 461–465, the message processor 452, and the relevant driver 447, 448, 449, 450, to the appropriate device 440, 441, 227, 240, 241, 216, 212b.

More specifically, the cabin file server 268 and primary access terminal 225 software comprises a control center common executive that includes the message processors 404 and 452, transaction dispatcher 421 and 473, and network addressable unit (NAU) programs 409, 461–465 that together manage communications flow among line replaceable units and applications, and record or log system irregularities for subsequent analysis. The control center common executive efficiently moves information from source to destination with a minimum of system resources, provides real-time expense or over-handling, provides a means to allow communications to originate at any source, including periodic status messages such as those to the primary access terminal 225 from the video players 227, and provides a consistent method of handling existing line replaceable units while allowing for additional line replaceable units. In addition, the common executive stores drivers that are not already part of the operating system. The system monitors 412 and 454 are provided to launch all application programs and shut them down as needed.

Each line replaceable unit type that communicates with the control center common executive has a corresponding network addressable unit (NAU) program 461–465. For example, any seat 123 that must communicate routes to the seat NAU program 465, any video cassette player 227 routes to the VCP NAU program 461, etc. Each time a line replaceable unit communicates with an NAU program 461–465, a virtual LRU is used to maintain cohesion between the application (service) and the device (driver). The virtual LRU is a state machine, one for each physical device associated to this NAU type. For example, if two seats "001A" and "021J" are communicating with the control center common executive, two virtual seat LRUs exist within the seat NAU program 465. It is within this state machine that the actual conversion between IFE-message and native messages takes place. Status and other information regarding each line replaceable unit are maintained in the VLRU.

In addition to the device-initiated VLRUs, several VLRUs are provided whose function is to maintain the status of related device. For example, the primary access terminal 255 must constantly monitor the status of the primary, so a VLRU for the printer is used in primary access terminal NAU program 409. Similarly, the seats must be kept apprised of changes in the states of the system, so a VLRU for broadcasting this information is created in the seat NAU program 465.

Detailed Software Description

Primary Access Terminal

The primary access terminal executive extension set of routines that, together with the common executive software, forms the generic application for the primary access terminal 225.

Message Processor

Figure 11:
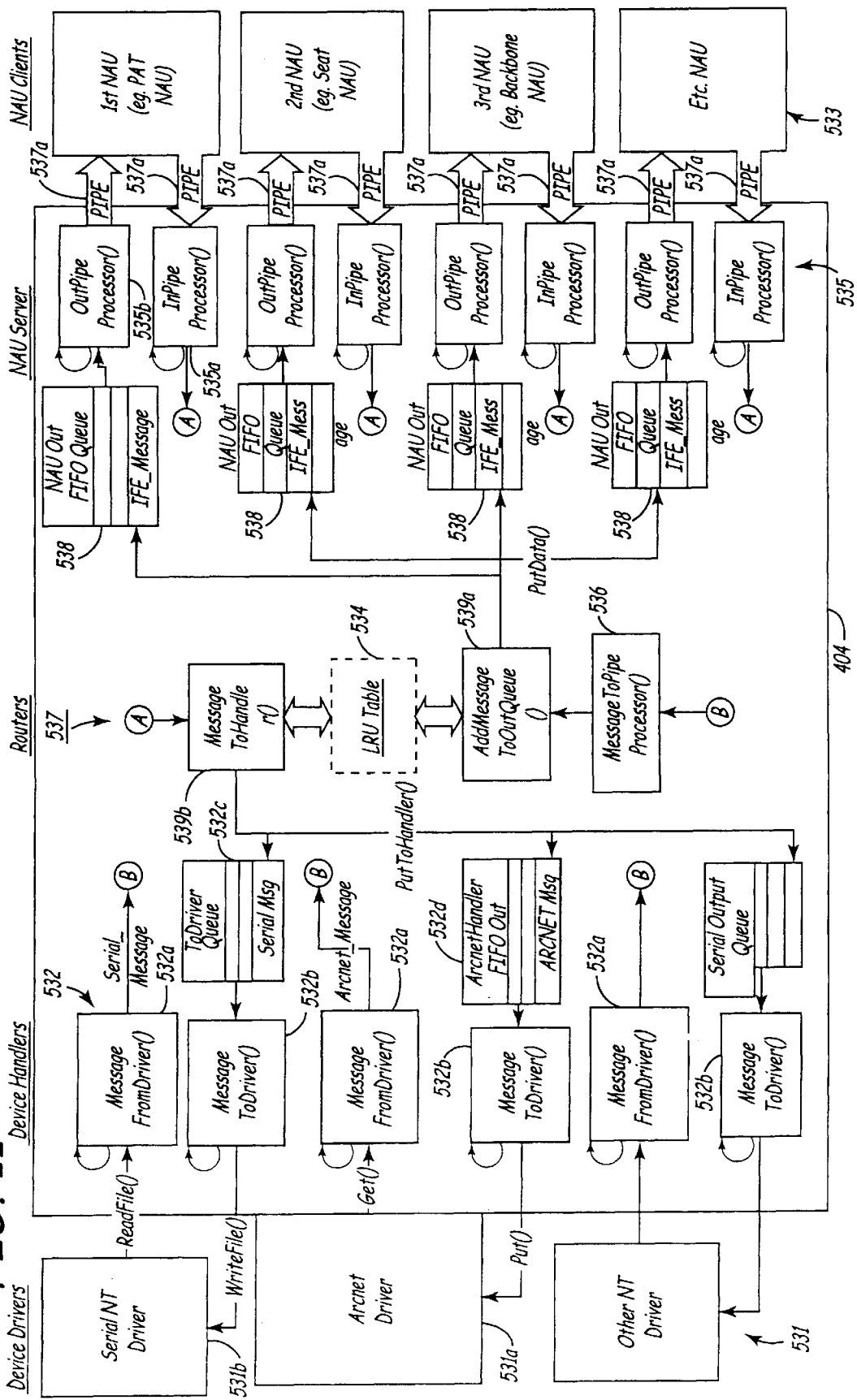
FIG. 11 illustrates message processor function and data paths.

The message processor 404 is shown in FIG. 11, which illustrates the message processor function and data paths. The message processor 404 interfaces a plurality of device drivers 531, including an ARCNET driver 531a and a serial NT driver 531b. The device drivers 531 are coupled to a plurality of device handlers 532. The device handlers 532 include MessageFromDrivers(Δ) 532a and MessageToDrivers(Δ) 532b. The MessageToDrivers(Δ) 532b associated with the serial NT driver 531b is coupled to a ToDriverQueue 532c, and the MessageToDrivers(Δ) 532b associated with the serial NT driver 531a is coupled to an ArcnetHandler FIFO 532d.

A NAU server 535 is provided that includes two named pipes (or communication lines) having a plurality of InPipeProcessors(Δ) 535a and OutPipeProcessors(Δ) 535b. The InPipeProcessors(Δ) 535a and OutPipeProcessors(Δ) 535b are coupled by way of a plurality of pipes 537a to NAU clients 533. The respective InPipeProcessors(Δ) 535a are coupled to a corresponding plurality of NAU out FIFO queues 538.

A plurality of routers 537 coupled to device handlers 532 to the NAU server 535. The plurality of routers 537 include the AddMessageToPipeProcessor(Δ) 536, an AddMessageToOutQueue(Δ) 539a, and a MessageToHander(Δ) 539b. The MessageFromDrivers(Δ) 532a of the device handlers 532 are coupled to the MessageToPipeProcessor(Δ) 536. The InPipeProcessors(Δ) 535a are coupled to the MessageToHander(Δ) 539b. The AddMessageToPipeProcessor(Δ) 536 and the MessageToHander(Δ) 539b are coupled to the LRU table 534.

The primary duty of the message processor 404 is to move communications between various I/O devices and their appropriate logical devices, the network addressable unit (NAU) 533. This duty is assigned to the message processor 404 instead of residing with the NAUs 533 because there is no one-to-one correspondence between the NAUs 533 and the device drivers 531. For example, several devices' communications may arrive via an ARCNET driver 531a (i.e., passenger entertainment system controller 224, seat 123, area distribution box 217, and AVU/SEB 231).

To support this duty, the message processor 404 includes the following sub-functions. Using an I/O handler 532, the message processor 404 receives messages from the device drivers 531. Each message, regardless of original format must contain a destination or network address for routing purposes. Using this network address coupled with the device type (i.e., ARCNET, RS-232, etc.) the network address determines the appropriate NAU via a look-up table 534 and routes the message to that NAU. Since communications from the devices employ a variety of protocols, they are bundled into an IFE-message upon receipt from the physical device, and unbundled after receipt from the application services (via the NAUs). In this way, the message processor 404 acts as a system translator. Using named pipes 535a and 535b, the message processor 404 receives messages from the NAUs. The message processor 404 determines the appropriate device driver 531 and network address and routes the message to the device. As NAUs demand, the message processor 404 creates two named pipes 535a (input) and 535b (output) for each NAU, maintaining the table 534 of pipe names (or handles) and their corresponding NAU IDs. The message processor 404 logs invalid destination address errors. The message processor 404 registers with the system monitor 412 for coordinated system operation.

A message library provides the means of moving data from one place and format to another without needing detailed understanding of the protocols involved. In general, all messages transmitted within the control center are of the type IFE__Message. Therefore, a class called IFE__Message is used to translate information into and out of this message type. Similarly, many messages enter the control center from the ARCNET devices, so to support them the ARCNET__ Message Class is made. Instead of requiring the user to start with an ARCNET__Message and convert it to an IFE__ Message, the ARCNET__Message is a superset of IFE__ Message. In this way, the ARCNET__Message contains the additional functions to manage the translations, and the migration from one form to another is nearly transparent.

For example, when raw data is read into MP.EXE from ARCNET, it is put into a new ARCNET__Message object and passed to MessageToPipeProcessor(Δ) 536 that treats this message as an IFE__Message to send it to the appropriate NAU. The NAU uses its own flavor of IFE__Message (Seat__Message, for example) to read the data (via its own NAUGetMP(Δ) and from the point forward, the IFE__ message is treated more specifically. No special handling is needed to affect this change. By the time the message finally reaches its ultimate destination process, the message class functions are used to deal with the actual bytes of the messages. These functions are described below.

The IFE__Message class is the base class for all IFE message processing. A hierarchy exists such that each derived class implements specifies for its data processing. This makes translating data formats transparent to application programmers.

The ARCNET__Message class is a derived class from IFE__Message. It is used to carry and process ARCNET data from the message processor to an appropriate network addressable unit (e.g., seat NAU, backbone NAU in the cabin file server). It is used as a base class to any ARCNET devices, such as the Seat__Message, PESCA__Message, and PESCV__Message classes. Some of the virtual functions defined in IFE__Message are overridden within ARCNET__ Message.

The Seat__Message class is derived from the ARCNET__ Message class to process seat data between the seat NAU and the services. Methods and data relating to all seat sessioning and sales services, along with some cabin services, are provided.

The detailed design of the message processor 404, MP.EXE, will now be discussed. MP.EXE is the message processor and comprises the following files:

| | |
|---|---|
| ARCNTCLS.CPP | The ARCNET interface Class |
| ARCSMCLS.CPP | The ARCNET Simulator Class for testing |
| DVCHNDLR.CPP | The Device Handler Class |
| MSSGPRCS.CPP | The Message Processor Class and Main( ) |
| PPPRCSSR.CPP | The Pipe Processor Class |
| SRLCLASS.CPP | The Serial Driver Class |
| WNRTTLCL.CPP | The WinRTUtil Class |
| ARCNTDRV.RT | The ARCNET User-side Driver |

A Main(Δ) function used in the message processor 404 initializes its processing threads using StartHandlers(Δ) and PipeProcessorClass::StartNAUThread(Δ) functions. These threads operate continuously to move data from source to destination. Main(Δ) also registers its existence with the system monitor 412 program (using MessageProcessorClass:Register(Δ) and waits for a shutdown signal from the system monitor 412, after which it performs an orderly shutdown of all its threads.

For each device driver 531 in FIG. 11, a device handler class member is created. ArcnetClass defines device handler routines for the ARCNET driver 531a. The ARCNET driver 531a is a user side driver that performs the actual I/O with the ARCNET hardware. Because it is loaded along with the rest of the message processor 404, its interface is via Queue::Put(Δ) and Queue::Get(Δ) functions. SerialIOClass defines the device handler routines 532 for a serial device driver 531b. The serial driver 531b is a standard Windows NT Serial Device Driver. ReadFile(Δ) and WriteFile(Δ) are the functions used to communicate with it. All device handlers in the message processor 404 provide two input-driven threads to control I/O. The thread names vary from handler to handler, but these functions launch the infinitely looping threads that constantly wait for data to move between the device (or queue) and the message processor 404.

To receive data from the driver 531 MessageFromDriver (Δ) 532a reads a message from its associated driver 531 using Get(Δ) or ReadFile(Δ) functions. It converts the input to a valid IFE message using functions from the IFE_Message or ARCNET_Message Classes. It then calls MessageProcessorClass::MessageToPipeProcessor(Δ) to add the message to an NAU output queue 538. To put data to an output queue 538 PutToHandler(Δ) puts a valid message at the end of the output queue 538 of its associated driver. It does not perform any data conversion. To output queued data to the driver 531, MessageToDriver(Δ) 532b reads the output FIFO queue 538 and issues the appropriate driver output command. It does not perform any data conversion.

To start the handler to open communications to I/O ports, StartHandler(Δ) performs the necessary initialization to get queues, pointers and driver connections ready. It then starts-up the two I/O threads InPipeProcessor(Δ) 535a and OutPipeProcessor(Δ) 535b.

The term NAU server means the set of routines that comprise a "server" for the network addressable unit processes. The routines are kept in a PipeProcessorClass. Two threads, NAUInThread(Δ) and NAUOutThread(Δ) are used to launch a set of I/O threads (InPipeProcessor(Δ) 535a and OutPipeProcessor(Δ) 535b) for a yet unknown NAU process. The first message received from any NAU registers it to this set of threads, causing NAUInThread(Δ) and NAUOutThread(Δ) to launch another set, getting ready for the next NAU to speak. In this way, the message processor 404 is dynamic and can support different numbers of NAUs as needed.

For incoming messages, NAUInThread(Δ) launches the InPipeProcessor(Δ) thread 535a that continuously receives a message from its input pipe 537a. If the message is meant to be routed to a driver 531, it is sent to MessageToHandler(Δ) 539b that places it on the appropriate driver's output queue 532c. If the message is meant to be routed back to an NAU, it is sent instead to AddMessageToOutQueue(Δ) 539a that performs this routing.

For outgoing messages, NAUOutThread(Δ) launches the OutPipeProcessor(Δ) thread 535b that continuously reads a message from the NAU Out Queue 538 and sends it to its associated NAU process via its named pipe 537a.

Routers 537 are routines that use the LRU table 534 to determine which processing thread needs to process the message. One router 537 is a from-NAU router. Upon demand, MessageProcessorClass::MessageToHandler(Δ) 539b moves the message to the appropriate handler. If necessary, it converts the message to the appropriate 'native' syntax using functions from IFE_Message Class or ARCNET_Message Class. It calls appropriate PutToHandler(Δ) function to move the converted message to the handler's output queue 532c. Another router is a from-device router 537. Upon demand, PipeProcessorClass::AddMessageToOutQueue(Δ) 539a calls the appropriate PutData(Δ) function to move the message to the NAU's output queue 538.

The LRU table 534 is an internal memory structure that contains an entry for each device in the system 100. It contains sufficient information to translate message addresses from NAU-to-driver and driver-to-NAU. For example it contains a physical name, which is the name of each device (e.g., 001A for seat 1A); NAU type, which is the NAU that processes messages (e.g., 7 corresponds to SeatNAU); network address (e.g., 4F040552 for seat 1A's seat display unit 122); and device handler that indicates which device driver 431 to use (e.g., 0 for ARCNET). This information is kept in a SQL database table that is read during the message processor Main(Δ) initialization via CreateLRUTable(Δ).

As NAU processes register with the message processor 404, their identities are updated in this table via PipeProcessorClass::AddQueueInfoToLookUpTable(Δ), PipeProcessorClass::AddThreadPointerToLookUpTable(Δ) and PipeProcessorClass::AddPipeHandleToLookUpTable(Δ) functions, which include Pipe Handle, Thread Class, Registeree, Queue Class, and Queue Semaphore.

ARCNET Driver

ARCNET is the token-passing network that provides the primary communication link between the control center and the backbone of the system 100. The ARCNET driver (408 and 450) is software that provides the interface between the message processors 404 and 452 and the physical ARCNET device interface in the primary access terminal 225 and the cabin file server 268. The description below is for the primary access terminal 225.

For development efficiency, the ARCNET driver 408 is attached to the message processor 404. The ARCNET driver 408 obtains a network address of this line replaceable unit. The ARCNET driver 408 understands network addresses for up to eight cabin file servers 268 and up to eight primary access terminals 225, to provide for future growth. The ARCNET driver 408 initializes the ARCNET device to proper configuration. The ARCNET driver 408 signs-on to the network. The ARCNET driver 408 handles network reconfiguration and builds up a network map to obtain information for routing messages across multiple ARCNET networks. The ARCNET driver 408 deals with transmit handshaking exceptions that may occur.

The ARCNET device may be an SMC COM20020 Universal Local Area Network Controller, the same device as used in all backbone line replaceable units. The network speed is 1.25 Mbps. The 256-byte ARCNET packet (short packet formula) is employed. A 2KB internal device RAM is divided into two 256-byte pages: one receive buffer and one transmit buffer. The line replaceable units are arranged in two ARCNET networks 216, one each supported by the primary access terminal 225 and the cabin file servers 268. The ARCNET driver 408 supports this variability.

Figure 12:
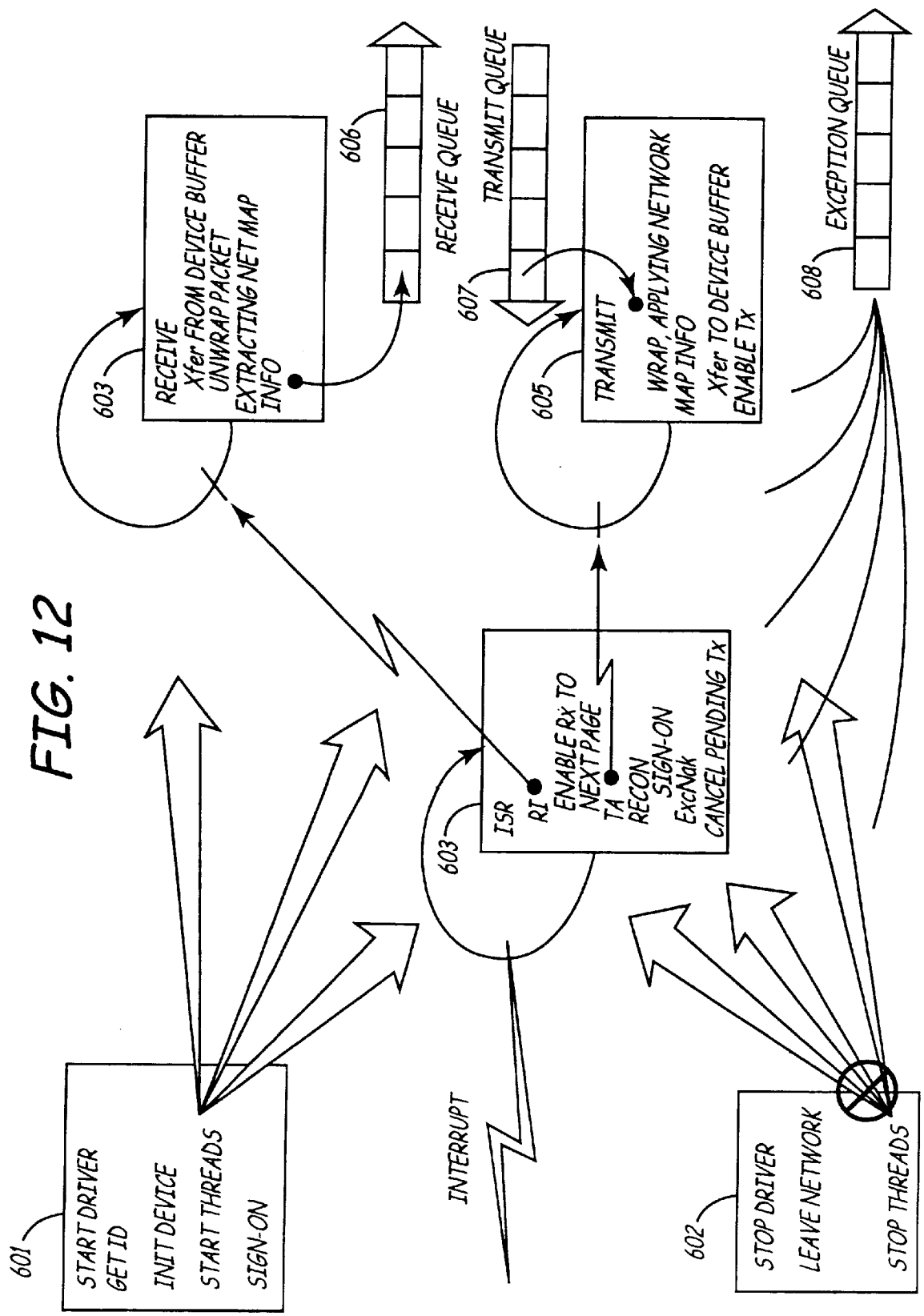
FIG. 12 illustrates operational flow of an ARCNET driver.

FIG. 12 illustrates the operational flow of the ARCNET driver 408. The ARCNET driver 408 is part of MP.EXE and comprises an ARCNET driver source file that is pre-processed using WinRT to incorporate the necessary additional functionality. To use the ARCNET driver 408, a user first calls ArcnetDriverClass::StartDriver(Δ) to initialize this driver and its device and establish queues 607, 606 to be used to transmit and receive data. FIG. 12 illustrates the operational flow of the ARCNET Driver 408, where StartDriver(Δ) 601 launches I/O (receive, transmit) threads 604,605 and an interrupt handler 603, and StopDriver(Δ) 602 shuts them all down.

Network Addressable Units

Figure 13:
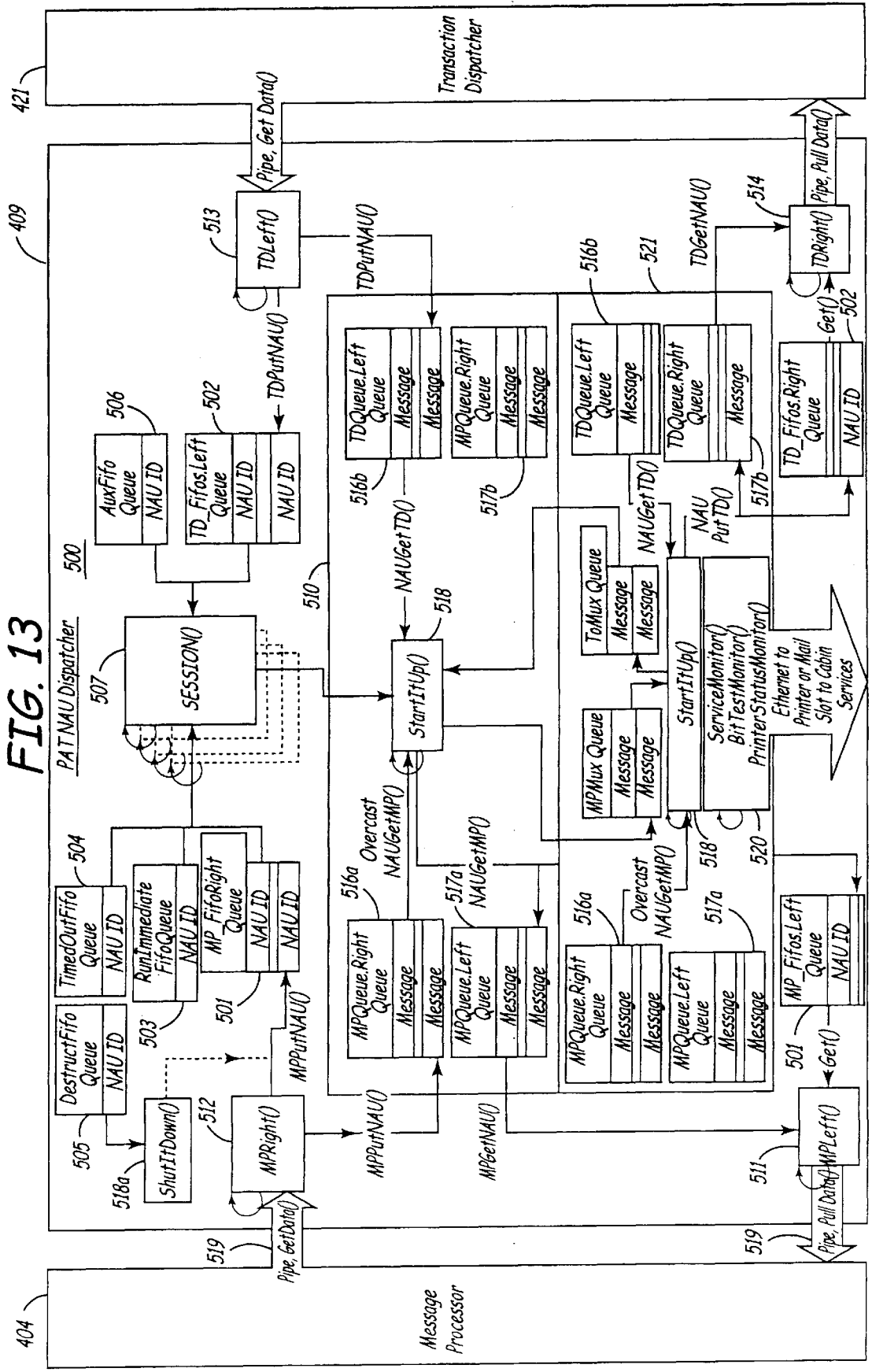
FIG. 13 illustrates network addressable unit function and data paths.

Discussion follows regarding the network addressable units (NAU) that reside on the primary access terminal 225. The primary access terminal 225 network addressable unit 409 program function and data paths are shown in FIG. 13.

PAT.EXE contains the primary access terminal NAU program 409. In general, a network addressable unit program unit first construct a NAUDispatch object and then construct one or more NAU objects, one for each virtual LRU (VLRU) that it supports. Certain VLRU-specific functions (such as NAU::StartItUp(Δ)) must be created for each VLRU type. The primary access terminal NAU program 409 includes the following primary components:

| | |
|---|---|
| PAT.CPP | The Main( ) Program |
| PDSPATCH.CPP | The NAU Dispatcher |
| GUMNITOR.CPP | The GUI Monitor VLRU Class |
| CRDRDRVL.CPP | The Card Reader VLRU Class |
| TUNRVLRU.CPP | The Audio Tuner VLRU Class |
| PATVLRU.CPP | The PAT main VLRU Class |
| PRNTRVLR.CPP | The Printer VLRU Class |
| PRNTRSTT.CPP | The Printer VLRU Status Sub-Class |
| PIMUX.CPP | The PI MUX VLRU Class |
| PINTRFCE.CPP | The base class for the Tuner VLRU, Card Reader VLRU and PAT VLRUs |

The main program Main($\Delta$) registers with the system monitor 412 and launches a PIDispatch object to open up communications between the message processor 404 and the transaction dispatcher 421. Main($\Delta$) calls PIDispatch::startItUp($\Delta$) 518 to initialize each VLRU and launches the Session($\Delta$) threads 507. Main($\Delta$) waits to die, either by receiving a ProcessStop command from system monitor 412, or else it sleeps forever until interrupted. Main($\Delta$) calls shutItDown($\Delta$) 518a to close all the VLRUs down with a SubProcessStop command and exits gracefully.

Referring to FIG. 13, the message processor (MP) 404 and the transaction dispatcher (TD) 421 communicate by way of a network addressable unit (NAU) dispatcher 500 the comprises NAUDispatch. NAUDispatch is a base class that contains the code necessary to open a framework for a new network addressable unit. NAUDispatch contains the following global objects:

| | |
|---|---|
| Qpair MP_Fifos | Qpair MP_Fifos keep track of traffic between the NAU and the Message Processor. The NAU Object IDs are stored in these two queues. |
| Qpair TD_Fifos | Qpair TD_Fifos keep track of traffic between the NAU and the Transaction Dispatcher. The NAU Object IDs are stored in these two queues. |
| Queue RunImmediateFifo | The Queue RunImmediateFifo keeps track of NAUs that require immediate attention, regardless of outside messages. |
| Queue TimedOutFifo | The Queue TimedOutFifo allows an NAU VLRU to time out, thus giving processing over to others until the time out occurs. |
| Queue DestructFifo | The Queue DestructFifo is used by shutItDown( ) to cause each VLRU to shut down. |
| Queue AuxFifo | The Queue AuxFifo is used in Session.cpp of Seat.exe only. |

Only the first constructor call per program uses InitNAUDispatch($\Delta$) to start all session threads 507 (one for each VLRU plus two up to a maximum of 14) for the NAU. The main program Main($\Delta$) opens named pipes 519 between the message processor 404 and the transaction dispatcher 421 Fifos 501, 502 and the session threads 507 to manage I/O between them. It then initiates threads 511–514 that manage input and output between the message processor 404 and the transaction dispatcher 421 MPLeft($\Delta$) 511, MPRight($\Delta$) 512, TDLeft($\Delta$) 513 and TDRight($\Delta$) 514). Once these initialization steps have been accomplished, the main program constructs NAU state machine objects 510 (also called VLRUs). In addition, this class contains the following utility functions:

| | |
|---|---|
| AddNAU( ) | This routine adds a VLRU object ID to an array for later lookup (to send it a message or shut it down, for example). |
| AddNAUMap( ) | This routine adds a VLRU object ID and its text name to an array for later lookup. |
| FindNAU( ) | Returns the VLRU object ID based on the text name passed to it. |
| GetNthNAU( ) | Returns the VLRU object ID in the 'nth' position in the array. |
| GetNumberOfNAUs( ) | Returns the number of VLRU object Ids in the array. |
| RemoveNAUFromMap( ) | This routine removes a VLRU object ID and its text name from the array. |
| SendToAllVLRUs( ) | This routine sends the same message to all VLRUs via their MPRight.queue, as if it was sent via the MP. It uses MP logic as a short cut, rather than developing more routines for intra-process communication. |
| SendToOneVLRU( ) | This routine sends a message to a single VLRU via its MPRight.queue, as if it was sent via the MP. It uses MP logic as a short cut, rather than developing more routines for intra-process communication. |
| ShutItDown( ) | This routine is used to turn off all VLRUs, typically called because a message was sent by the System Monitor to the main( ) routine to do so. |
| startItUp( ) | ThestartItUp( ) routine is used to start up all VLRUs. |

The MPRight($\Delta$) Thread routine 512 continuously waits for incoming messages from the message processor 404 via the named pipe 519. The term 'right' indicates that the data moves from left-to-right in FIG. 13. The MPRight($\Delta$) Thread 512 uses the IFE message class routines to deal with the data received. Once a message is received using IFE_Message::GetData($\Delta$), it looks up the appropriate VLRU name (IFE_Message::GetAddress($\Delta$)) and uses it to look up the appropriate NAU object ID (FindNAU($\Delta$)). Then it stores the incoming message in that NAU's MPQueue.Right queue 516a and places the NAU's ID into the dispatcher's MP_Fifos.Right queue (MPPutNAU($\Delta$)) 501. This ID is then used by the Session threads 507 that are constantly running to decide which VLRU needs to be processed. A "hook" function pointer is provided with this thread to allow applications to pre-process the message prior to MPRight ($\Delta$)'s storage. If no hook function is defined, this is ignored.

The MPLeft($\Delta$) Thread routine 511 continuously waits for outgoing messages for the message processor 404. The term "left" indicates that the data moves from right-to-left in FIG. 13. It uses the IFE message class routines to deal with received data. Using Queue::Get($\Delta$) it reads the NAU ID from the MP_Fifos.Left queue 501 then uses that NAU's MPGetNAU($\Delta$) function to read the data from its MPQueue.Left 517a, and uses IFE_message::PutData($\Delta$) to output the message via the named pipe 519.

The TDLeft($\Delta$) Thread 513 behaves like MPRight($\Delta$), except that the input comes from the transaction dispatcher 421. The TDRight($\Delta$) Thread 514 behaves like MPLeft($\Delta$), except that the output goes to the transaction dispatcher 421.

It is sometimes impractical for all VLRUs to be running at once (for example, the seat NAU can contain more than 500 VLRUs), so a maximum number of processing threads has been established as 14. These threads 511–514 each execute a Session($\Delta$) function 507 which waits for an event such as input from any source (message processor 404, transaction dispatcher 421, TimeOut, etc.), then determines which VLRU state machine needs to be run to process the message and executes it via the VLRU StartItUp($\Delta$) function

518 called by NAU::EntryPt(Δ). When EntryPt(Δ) returns, the message is fully processed, and Session(Δ) 507 loops to get another one.

The NAU class contains foundation routines and data for any VLRU. It is derived from the timed callback class and Cobject class (from a C++ Foundation Class Library). The NAU constructor makes an object that has TDQueue and MPQueue, two Qpair objects. These queues are used to store the actual data or IFE_Message needed by the VLRU state machine. The NAU constructor also creates three event semaphores, including a RunImmediateEvent semaphore, a TimeOutEvent semaphore and an AuxEvent semaphore, which allow it to control processing via the related queues in the NAU dispatcher 500. Finally, the NAU constructor creates one Mutex, DispatchMutex that coordinates which session thread can access the data for a given VLRU (in case two threads try to handle messages for the same VLRU).

The StartItUp(Δ) function 518 (not the same as NAUDispatch::startItUp(Δ)) is called by NAUDispatch::Session(Δ) when a message is ready to be processed by the VLRU. The StartItUp(Δ) function 518 typically varies per VLRU, but it's job is to fully process one message received from any source. That may simply mean passing the message on from message processor 404 to transaction dispatcher 421 or vice-versa.

The NAU class contains the following members used to move data to and from the message processor 404 and the transaction dispatcher 421:

| | |
|---|---|
| MPGetNAU( ) | Moves data from MPQueue.Left for output to the MP. |
| MPPutNAU( ) | Moves data from input from MP to MPQueue.Right. |
| NAUGetMP( ) | Moves data from MPQueue.Right into StartItUp( ) for processing. |
| NAUGetTD( ) | Moves data from TDQueue.Left into StartItUp( ) for processing. |
| NAUPutMP( ) | Moves data from StartItUp( ) into MPQueue.Left for later output. |
| NAUPutTD( ) | Moves data from StartItUp( ) into TDQueue.Right for later output. |
| TDGetNAU( ) | Moves data from TDQueue.Right for output to the TD. |
| TDPutNAU( ) | Moves data from input from the TD to TDQueue.Left. |

As discussed above, each of the devices (402, 235, 224, 216) attached to the primary access terminal 225 is controlled via its own virtual LRU (VLRU) or NAU state machine objects 510 functions discussed in conjunction with FIG. 13. Most of these devices communicate via the same I/O channel, a PI Mux.

The audio tuner VLRU allows control of audio channel selections for flight attendant previewing via the PAT GUI. The TunerVLRU class is also a PIInterface class child. Its StartItUp(Δ) 518 routine handles the SubProcessStart and SubProcessStop commands the same as the others, and then waits for I/O from either the PI Mux or the transaction dispatcher 421. If a message is received from the PI Mux, it forwards it to the transaction dispatcher 421 using NAU::NAUPutTD(Δ). If a message is received from the message processor 404, it forwards it to the PI Mux using ToMuxPut(Δ).

The card reader VLRU collects and forwards data from the card reader 121d, to be used by the access functions and sales services' functions. Based on the PIInterface class, the CardReaderVLRU class is the first actual VLRU created for this NAU. It creates an event called StartEvent that is used by PIMux to coordinate all the other PIInterface VLRUs. Its StartItUp(Δ) 518 routine loops forever retaining its Session (Δ) thread. It looks for a SubProcessStart command from the message processor 404 (which is issued by NAUDispatch::startItUp(Δ)) and then waits for StartEvent to trigger before processing any other messages. Once StartEvent has occurred, it can continue processing. If it receives a SubProcessStop message, it terminates. It reads and ignores all other messages from the message processor 404 and the transaction dispatcher 421. Instead, it looks for input via its FromMux semaphore event, which tells when it has received data from the PI Mux. If the PI Mux sends a CardRead command, this VLRU calls MagCardData(Δ) to process this message. All other messages are returned to the Mux via the ToMux queue. MagCardData(Δ) converts the data into ASCII and forwards it to the primary access terminal application via the transaction dispatcher 421. Optionally for testing, the register can be set with the value "DisplayMagCardData" to cause all the card data to be printed to a window at the primary access terminal 225 via stdout.

The GUI Monitor VLRU starts the GUI and ends the GUI as appropriate. No LRU is actually associated with this VLRU. When the GUI_Monitor object is created, it creates an extra event called ServiceAlive. This event is set via ServiceMonitor(Δ) and tested in StartItUp(Δ) 518 to know whether cabin service is communicating to this NAU. The StartItUp(Δ) routine is called as soon as all the VLRUs are created via the PIDispatch::startItUp(Δ) is launches another thread called ServiceMonitor(Δ) which continuously tries to receive messages from the cabin services program via a mail slot. It then uses this as a 'heart beat' to know if the application is still alive. If this heart beat fails to occur after having been established, the GUI Monitor terminates the GUI Process. If this heartbeat in never established ServiceMonitor(Δ) simulates one, for test purposes. StartItUp(Δ) 518 continuously loops and waits for the SubProcessStart command from the message processor 404 (from the PIDispatch::startItUp(Δ) routine), and then it waits for PIDispatch(Δ) to tell whether it connected to the database successfully by triggering the ConnectedToService event. Then it attempts to start the CGUI.EXE program. If StartItUp(Δ) 518 detects that the GUI terminated it attempts to restart it. StartItUp(Δ) 518 ignores messages from the transaction dispatcher 421, and only processes the SubProcessStart and Stop commands from the message processor 404.

The card reader, tuner, PI Mux, primary access terminal and printer VLRUs are all based on the PIInterface class. Essentially, this provides support for one more source of I/O, from the PI Mux (or multiplexed I/O port) via the PIMux VLRU. The PIMux VLRU provides the following member routines;

| | |
|---|---|
| ToMuxPut( ) | Converts a PAT_Message into appropriate syntax for either Audio Tuner or PI 'Board' message and then sends the data to the ToMux queue. |
| FromMuxPut( ) | Places a message on the FromMux queue. and converts it to a PAT_Message. |
| FromMuxGet( ) | Reads a PI_Message from the FromMux queue and converts it to a PAT_Message. |
| ToMuxGet( ) | Reads and encodes for transmission a PI_Message from the ToMux queue. |
| FromMuxSemaphoreHandle( ) | Returns the handle for this queue |
| FromMuxSemaphoreHandle( ) | Returns the handle for this queue. |

The PIMux class is the VLRU that communicates via the message processor 404 and the transaction dispatcher 421 for all I/O with the PI board, for card reader, tuning, etc. The PIMux class points to each of these VLRU classes for data transfers through their FromMux and ToMux queues. A StartItUp(Δ) 518 routine loops forever retaining its Session (Δ) thread 507. It looks for a SubProcessStart command from the message processor 404 (which is issued by the NAUDispatch::startItUp(Δ) routine) and triggers the StartEvent to activate its associated VLRUs (Card Reader, etc.). Once StartEvent has occurred, it proceeds to receive I/O from the message processor 404 and the transaction dispatcher 421. It determines which sub-VLRU should process the message and forwards it to their FromMux queue for handling, and then it responds an Ack or Nak to the PI board, as applicable to satisfy its communications protocol needs. Messages from the VLRUs intended for the PI Mux are sent to this VLRU as well via their ToMux queues. It encodes the messages as needed, forwards them and handles the Ack/Nak protocol. It has its own version of NAUGetMP(Δ) in order to use the PI_Message data handling routines.

The primary access terminal VLRU responds to loopback messages from the CFS TestPort NAU via Ethernet for BIT functionality. It logs communication failures between the primary access terminal (PAT) and the cabin file server (CFS). It controls the BITE and COMM LEDs on the front of the PAT, lighting them to indicate failures. The PatVLRU class is also a PIInterface class child only so it can synchronize operation via the StartEvent trigger. Its constructor reads the registry "VerbosePATVLRU" settings (for test purposes) and the "BITTestInterval" value for BIT testing timeouts. StartItUp(Δ) launches a thread called BitTestMonitor(Δ) and then loops continuously to process messages. First, it waits to receive a SubProcessStart message, then it waits for the StartEvent to know that PIMux is alive and ready to go. SubProcessStop causes it to kill the BitTestMonitor(Δ) thread and then die. All other messages from the message processor 404 are ignored. If an Ethernet loopback message is received from test port NAU via the transaction dispatcher 421, it uses EthernetLoopback(Δ) to return a message via NAU::NAUPutTD(Δ), and then tell the BitTestMonitor that the loopback occurred. All messages from the PI Mux are returned to it via PIInterface::ToMuxPut(Δ) and otherwise ignored as an error. The BitTestMonitor(Δ) turns both BITE and COMM LEDs on at the primary access terminal 225 to show that they are both working (similar to the oil light on a car dash board). Then it turns off the BITE light and waits. If it receives notification from StartItUp(Δ) that a loopback occurred, it turns off the BITE LED. If it times out waiting for a loopback, it turns the LED back on. If it gets several successive failures (timeouts), it logs it to the event log. If it is told to exit by StartItUp(Δ), it turns the BITE LED on and dies.

The Printer VLRU periodically queries the control center printer for its status and provides this status as an unsolicited message to the PAT GUI. The PrinterVLRU object is a PIInterface class child only so that it can synchronize with PI Mux to start processing. Its constructor retrieves "PointerPollInterval" and "PrinterStatusTimeout" from the registry and then creates hEventPrinterStatusChange and hEventStop to communicate to the monitor thread that is created in StartItUp(Δ). This class also has a PrinterStatus class object called Printer that does all the actual communication with the printer over the Ethernet network 228. StartItUp(Δ) launches the PrinterStatusMonitor(Δ) thread, and then loops forever. The only message processor messages it processes are SubProcessStart that after receipt waits for the StartEvent signal to continue and SubProcessStop that kills the Monitor thread and dies.

StartItUp(Δ) ignores all messages from the transaction dispatcher 421. It echoes any messages back to the PI Mux and otherwise ignores them. If StartItUp(Δ) receives a PrinterStatus event (from the monitor), it calls SendPrinterStatus(Δ) to build the status message and then sends it to the CAPI Message Service via NAU::NAUPutTD (Δ). PrinterStatusMonitor(Δ) uses the PrinterStatus object of this VLRU to talk to the printer. If it cannot talk to the printer via PrinterStatus::InitializePrinterSNMP(Δ), it logs the error to the even log. If changes in the printer status occur, it tells StartItUp(Δ) via hEventPrinterStatusChange. It logs the following other events to the event log: Out of Paper, Has Paper Again, any other errors, and first Status after any error. SendPrinterStatus(Δ) uses PAT_Message routines to convert the PrinterStatus info to ASCII. It then sends it on to the CAPI Message Service via NAU::NAUPutTD(Δ). The PrinterStatus class constructor connects to the printer via the Ethernet network 228 using InitializePrinterSNMP(Δ), requests the status via RequestRawPrinterStatus(Δ), Interprets (with StatusDescription(Δ)) and displays the printer status info using DisplayPrinterStatus(Δ), among other private routines.

Transaction Dispatcher

Figure 14:
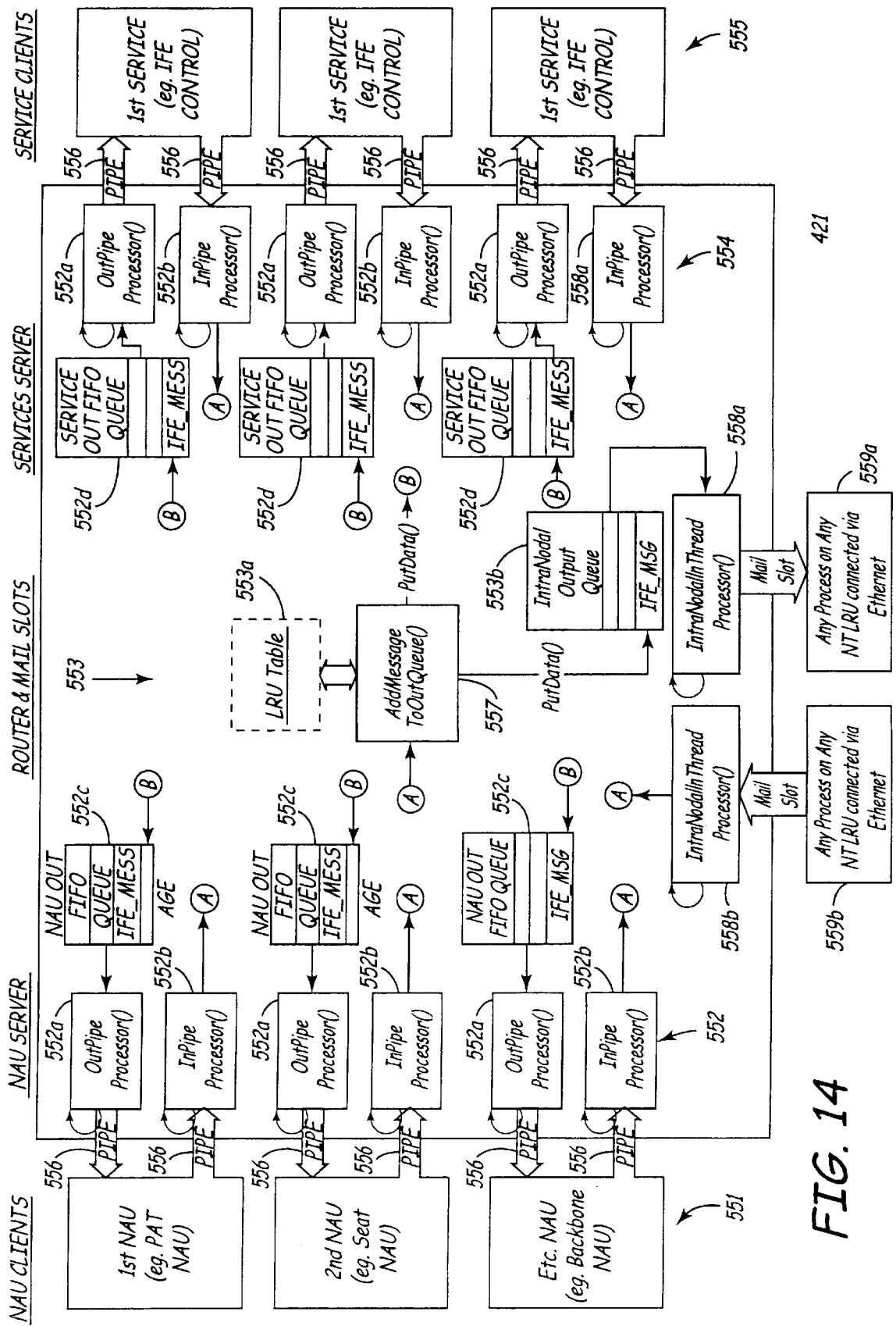
FIG. 14 illustrates transaction dispatcher function and data paths.

The transaction dispatcher 421 will now be discussed with reference to FIG. 14. The transaction dispatcher 421 comprises a NAU server 552, a router and mail slots 553, and a services server 554 connected to NAU clients 551 and service clients 555. The NAU server 552 comprises a plurality of OutPipeProcessors(Δ) 552a, a plurality of InPipeProcessors(Δ) 552b, and a plurality of NAU Out FIFO queues 552c. A plurality of name pipes 556 couple the NAU clients 551 to the OutPipeProcessors(Δ) 552a and InPipeProcessors(Δ) 552b. The NAU out FIFO queues 552c are respectively coupled to the OutPipeProcessors(Δ) 552a. The services server 554 comprises a plurality of OutPipeProcessors(Δ) 552a, a plurality of InPipeProcessors (Δ) 552b, and a plurality of service out FIFO queues 552d. The service out FIFO queues 552d are respectively coupled to the to the OutPipeProcessors(Δ) 552a. A plurality of name pipes 556 couple the service clients 555 to the OutPipeProcessors(Δ) 552a and InPipeProcessors(Δ) 552b.

The router and mail slots 553 comprises the LRU table 553a, which is coupled to an AddMessageToOutQueue(Δ) 557. The InPipeProcessors(Δ) 552b of the NAU server 552 are coupled to the AddMessageToOutQueue(Δ) 557. Also, the InPipeProcessors(Δ) 552b of the services server 554 are coupled to the AddMessageToOutQueue(Δ) 557. The AddMessageToOutQueue(Δ) 557 is coupled by way of a IntraNodalOutputQueue 553b to an IntraNodalOutThreadProcessor(Δ) 558a. The IntraNodalOutThreadProcessor(Δ) 558a is coupled to any process on any NT line replaceable unit connected by way of the Ethernet network 228. Similarly any process on any NT line replaceable unit connected by way of the Ethernet network 228 to an IntraNodalInThreadProcessor(Δ) 558b is coupled to the AddMessageToOutQueue(Δ) 557.

The primary duty of the transaction dispatcher 421 is to move information between the logical devices (or NAU clients 551) and the application services (or service clients 555). By using a transaction dispatcher 421, the NAUs and the services do not control I/O traffic. In addition, the number of named pipes (or communication lines) between processes is greatly reduced because each service and NAU need only communicate with one process, rather than each other. This simplifies the software design and efficiently uses a finite number of available named pipes.

Upon demand, the transaction dispatcher 421 creates two named pipes (input and output) for each NAU and service, maintaining the lookup table 553a of pipe names (or handles) and their corresponding NAU or service IDs.

The transaction dispatcher 421 uses blocking I/O to await a message from any incoming named pipe. Once it receives an IFE-structured message, it examines only the message destination (NAU or service ID) portion of the message to identify the appropriate named pipe to use by cross-referencing the lookup table 553a. It then routes the complete message to an output queue 552c and 552d for that named pipe.

The transaction dispatcher 421 uses mail slots to send and receive messages from processes that are resident on remote Windows NT line replaceable units, routing them to the appropriate destination. Using this technique, any service or NAU can communicate with any other service, NAU or program on this line replaceable unit or any line replaceable unit that also runs a transaction dispatcher 421.

The detailed design of the transaction dispatcher 421 will now be discussed. FIG. 14 illustrates the transaction dispatcher function and data paths. TD.EXE is the transaction dispatcher 421 and is comprised of the file TRNSCTND-.CPP that is the main program and TransactionDispatcherClass.

The Main($\Delta$) function of the transaction dispatcher 421 is responsible for initializing all its processing threads using CreateMainServiceThreads($\Delta$), CreateMainNAUThreads($\Delta$) and CreateMainIntraNodalThreads($\Delta$) functions. These threads operate continuously to move data from source to destination. Main($\Delta$) also registers its existence with the system monitor program 412 (using Register($\Delta$)) and waits for a shutdown signal from the system monitor 412, after which it performs an orderly shutdown of all its threads via its destructor.

The term NAU server means a set of routines that comprise a server for the network addressable unit processes. Two threads, NAUInThreadProcessor($\Delta$) and NAUOutThreadProcessor($\Delta$) are used to launch a set of I/O threads (InPipeProcessor($\Delta$) 522b and OutPipeProcessor($\Delta$) 552a) for a yet unknown NAU process. The first message received from any NAU registers it to this set of threads, causing NAUInThreadProcessor($\Delta$) and NAUOutThreadProcessor($\Delta$) to launch another set, getting ready for the next NAU to speak. In this way, the transaction dispatcher 421 is dynamic and can support different NAUs as needed.

With regard to incoming messages, InPipeProcessor($\Delta$) 552b continuously receives an IFE message from its input pipe and sends it to AddMessageToOutQueue($\Delta$) 557 that routes it to the appropriate output queue. With regard to outgoing messages, OutPipeProcessor($\Delta$) 552a continuously reads an IFE message from the NAU out queue and sends it to its associated NAU process via its named pipe 556.

The term services server 554 means the set of routines that comprise a server for cabin and sales services. Two threads, ServiceInThread($\Delta$) and ServiceOutThread($\Delta$) are used to launch a set of I/O threads (InPipeProcessor($\Delta$) 552b and OutPipeProcessor($\Delta$) 552a) for a yet unknown service process. The first message received from any service registers it to this set of threads, causing ServiceInThread($\Delta$) and ServiceOutThread($\Delta$) to launch another set, getting ready for the next service to speak. In this way, the transaction dispatcher 421 is dynamic and can support different services as needed.

The router comprises routines that use the lookup table 553a to determine which processing thread needs to process the message. With regard to the from any source router, upon demand, AddMessageToOutQueue($\Delta$) 557 calls the appropriate PutData($\Delta$) function to move the message to the NAU or Service output queue.

The LRU lookup table 553a is an internal memory structure that contains an entry for each device in the system 100. It contains sufficient information to translate message addresses for any piped destination. Specifically, it contains pipe handle, registeree, queue pointer, queue semaphore, and thread pointer. This information is kept in an SQL database table that is read during the Main($\Delta$) initialization via CreateLRUTable($\Delta$). Then as piped processes register with the transaction dispatcher 421, their identities are updated in this table 553a via AddQueueInfoToLookUpTable($\Delta$), AddThreadPointerToLookUpTable($\Delta$) and AddPipeHandleToLookUpTable($\Delta$) functions.

The term intra nodal server means the set of routines that permit communications between two Windows NT line replaceable units connected via the Ethernet network 228. This differs from the named pipe communications in that a set of communication pipes is not created and maintained for each process. Instead, a single mail slot is maintained for incoming messages, and an appropriate outgoing mail slot is created for each outgoing message as needed.

With regard to incoming messages, IntraNodalInThreadProcessor($\Delta$) 558b continuously receives a message from its mail slot and sends it to AddMessageToOutQueue($\Delta$) 557, which routes the message to the appropriate destination. The destination may be an NAU, a service or even back out to another process via a mail slot. With regard to outgoing messages, IntraNodalOutThreadProcessor($\Delta$) 558a continuously reads a message from its out queue and sends it to its associated process via the mail slot. This mail slot is created for just this message, and then is closed after the message is sent.

System Monitor

The system monitor program 412 is automatically invoked by the operating system when the line replaceable unit boots. The system monitor function and data paths are shown in FIG. 13. The system monitor program 412 comprises a service_main($\Delta$) 561 that is coupled to a StopServices($\Delta$) 565. The system monitor program 412 is coupled to console services 562 (such as a display monitor) by way of a ConsoleInput($\Delta$) 562a. Other outside testing processes 562b are coupled to a service_cntrl($\Delta$) 563. A WatchDogDrive 591 along with the service_cntrl($\Delta$) 563 and the ConsoleInput($\Delta$) 562a are coupled to a MainQueue 564.

A process/event lookup table 567 is coupled to a GetSystemFullActionItemn($\Delta$) 568 that interact with a serv_server_main($\Delta$) and server_main($\Delta$) 566. The MainQueue 564 is coupled to the server_main($\Delta$) 566. The MainQueue 564 is coupled to a ProcessEventList($\Delta$) 569. The ProcessEventList($\Delta$) 569 is driven by a plurality of Sysmon class and process class state machine functions 570a, 570b. Output of the process class state machine functions 570b are coupled to OutputQueues 571 of various process and process I/O functions 572, 572a. The process and process I/O functions 572, 572a are coupled by way of OutputLoop($\Delta$) 573 and name pipes 574 to the transaction dispatcher 421 and message processor 404. The transaction dispatcher 421 and message processor 404 are coupled by way of name pipes 574 to respective InputLoop($\Delta$) 575. The respective InputLoop($\Delta$) 575 are coupled to the MainQueue 564.

Sorted functions of the process class state machine functions 570b are coupled by way of a QueueSorted queue 576 and a StatPutQueueThread($\Delta$) 577 to the MainQueue 564. Additional runtime processes 578 are also coupled by way of name pipes 574 to SysmonConnectThreads($\Delta$) 579. The SysmonConnectThreads($\Delta$) 579 are coupled by way of a Register::RegisterInput($\Delta$) 580 to the process functions 572.

A WatchDogDrive 591 is provided that comprises a WatchStaticThread 592, a DogQueue 593 and a StatQueueThread 594. The WatchStaticThread 592 and a PExternalKillProcess($\Delta$) from the process class state machine functions 570b are coupled to the DogQueue 593. The DogQueue 593 outputs to the StatQueueThread 594 that in turn drives the WatchDog driver 410.-

The system monitor program 412 operates in the background during the life of the control center applications and has the following four basic duties:

| | |
|---|---|
| Start-Up | The start-up function starts the executive and application programs after any system boot. |
| Shutdown | The shutdown function provides an orderly shutdown, flushing working data from memory to hard disk as appropriate. Then it terminates the execution of the executive and application programs. |
| Power Down | The power down function works in conjunction with the uninterruptable power supply (UPS) 400 that is connected via one of the serial ports on each of the control center LRUs. The operating system is notified by the UPS when power has been lost, causing it to start this function (POWERDWN.EXE, POWERDWN.CPP). The power down program notifies the system monitor that power has been lost to invoke an orderly shutdown using a ProcessStop IFE message. POWERDWN.EXE is listed in the NT Register as the program to start when power failure is detected. |
| Restart | The restart function scans for failed executive and application programs, and restarts them. |

The detailed design of the system monitor 412 will now be discussed. SYSMON.EXE includes the following primary components:

| | |
|---|---|
| SYSMON.CPP | The Main( ) Program and Sysmon Class |
| DLYSCHDL.CPP | The DelayScheduler Class |
| PROCESS.CPP | The Process Class to manage the external programs |
| QUEESORT.CPP | The QueueSort Class - Used to manage sorted queues |
| RGSTRBJC.CPP | The Register Class used to register external processes |
| SMSCRIPT.CPP | The SysmonScript Class to manage the state tables |
| SYSGLOBA.CPP | Global routines to map to state-machine functions |
| SYSMNCNN.CPP | The SysmonConnect Class used to communicate externally |
| SYSMNSPC.CPP | SysmonSpecial Class |
| UTL150.CPP | RandomPack and Liner Classes plus other utilities |
| WTCHDGDR.CPP | The WatchDogDrive Class |

Figure 15:
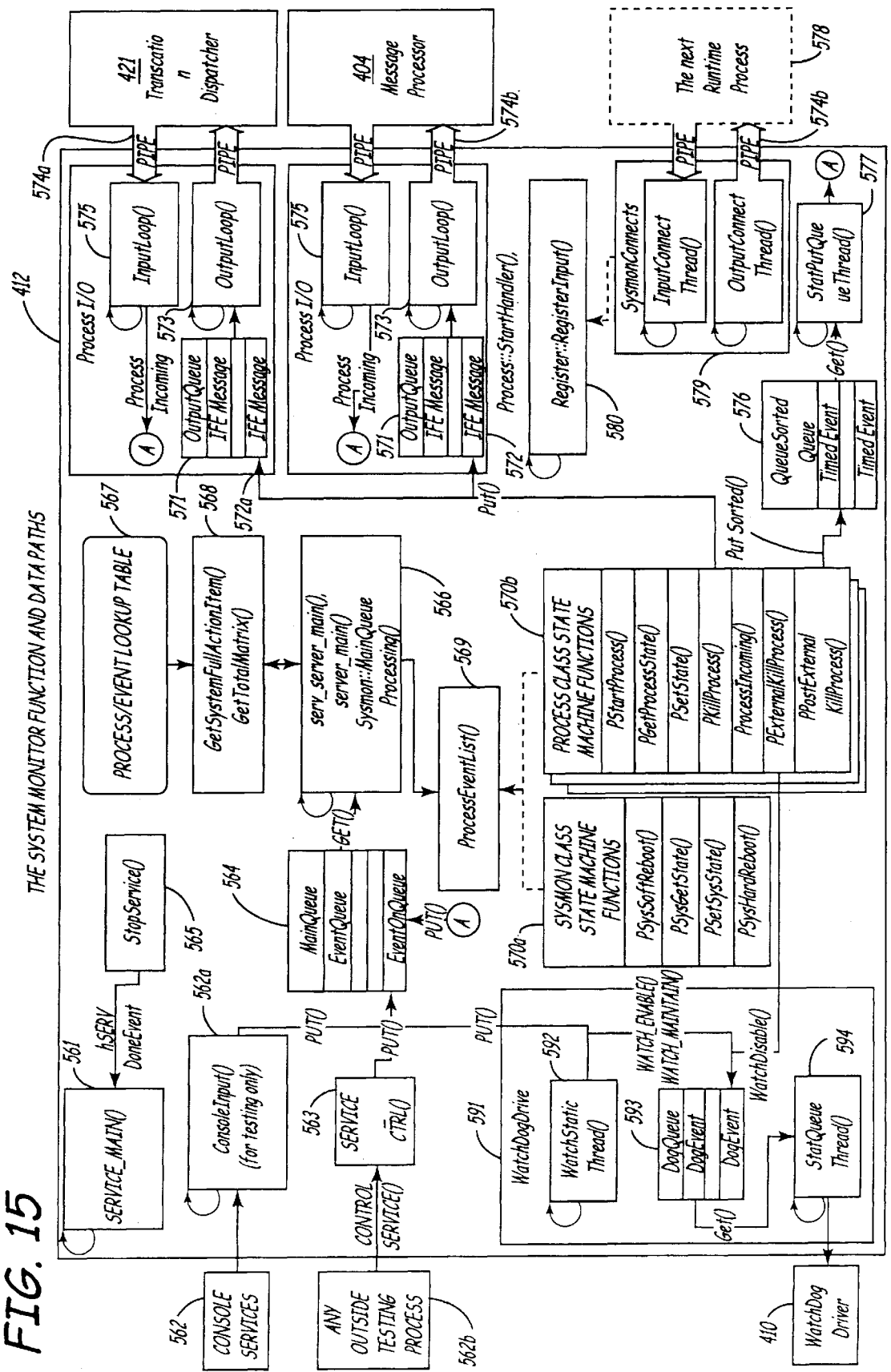
FIG. 15 illustrates system monitor function and data paths.

Referring to FIG. 15, the System Monitor 412 is a Windows NT Service Process, which means it runs in the background and is controlled by the following functions in the Win32 SDK Library: StartServiceCtrlDispatcher($\Delta$), ControlService($\Delta$), Handler($\Delta$), RegisterSreviceCtrlHandler ($\Delta$), and ServiceMain($\Delta$). The system monitor 412 is designed as a state machine, but its actual code is more of an in-line design with state flags used to keep track of processing. For example, a single function calls another function that calls yet another function, and all three are only used once. For clarity, these are grouped together herein.

The main($\Delta$) function updates its revision history information in the Windows NT Register, determines where to find the other programs to be started, launches itself as a Windows Service by connecting to the Windows Service Control Manager via StartServiceCtrlDispatcher($\Delta$), identifying service_main($\Delta$) 561 as the main function for this service. The main($\Delta$) function is identified in advance of runtime during software installation, which calls the NT CreateService($\Delta$) to set up the system monitor 412 as a Windows NT Service. Main($\Delta$) also alters its behavior depending on whether a console device 562 (i.e., a display monitor) is available for testing. Main($\Delta$) uses SetConsoleCtrlHandler($\Delta$) to allow someone to abort the programs by pressing Ctrl-C at any time.

Service_main 561 is the main program that continually runs when the system monitor service is running. It calls RegisterServiceCtrlHandler($\Delta$) to identify service_ctrl($\Delta$) 563 to NT as the function to execute when other outside programs want to alter the execution of this service. It maintains a combination state-checkpoint to identify to the outside world (i.e., test programs) what it is doing:

| State | Check-point(s) | Service Control Code to get there |
|---|---|---|
| SERVICE_START_PENDING | 1, 2 | (none) |
| SERVICE_RUNNING | 0 | Service_Control_Continue |
| SERVICE_PAUSED | 0 | Service_Control_Pause |
| SERVICE_STOP_PENDING | 0, 1 | Service_Control_Stop |
| SERVICE_STOPPED | 0 | (none) |

When service_main($\Delta$) 561 starts, it is in SERVICE_START_PENDING state, checkpoint #1. If it successfully creates all its event handles, it moves to checkpoint #2. It then sets up a security descriptor and launches a serv_server_main($\Delta$)thread, moving its state to SERVICE_RUNNING.

The outside world can alter the service_main($\Delta$) 561 state by calling service_ctrl($\Delta$) 563 and providing a service control code. The table above shows which state service_main($\Delta$) 561 moves to based on the control code received. If the SERVICE_STOPPED state is reached, an hServDoneEvent is triggered, causing this function to exit, terminating the system monitor 412.

The service_ctrl($\Delta$) 563 routine is called via an NT Service utility ControlService($\Delta$) by any outside program that wishes to control the system monitor service in some way. service_ctrl($\Delta$) uses a MainQueue 564 to issue commands to various process class objects that are running.

The server_main($\Delta$) routine creates the Sysmon object MainSysmon and executes its Sysmon::StartHandler($\Delta$) to get the other processes running. If running in test mode, server_main($\Delta$) is called directly by main($\Delta$). If running in runtime mode, server_main($\Delta$) is called by serv_server_mail($\Delta$) 566 which is a thread launched by service_main($\Delta$) 561 (the main program initiated by the Windows NT Service Manager). Finally, server_main($\Delta$) calls Sysmon::MainQueueProcessing($\Delta$) which loops until it is time to shutdown. Once MainQueueProcessing($\Delta$) returns, this thread ends.

The StopService($\Delta$) function 565 can be used by any thread to report an error and stop the Sysmon service. It logs the reason that it was called via ReportEvent($\Delta$), and tells service_main($\Delta$) to abort via hServDoneEvent. Derived from process, the Sysmon class contains all the software needed to drive all the process class state machines. It uses MainQueue 564 as its primary input.

Sysmon::StartHandler($\Delta$) is responsible for launching all the external programs and providing a means to monitor them. First, it compiles the file SYSMON.ASC. Then, it queries the NT Registry to determine which type of line replaceable unit it is running on (primary access terminal, cabin file server or test unit) to know which processes to initiate. It creates a SmScript object to establish system-level state machine tables using SmScript::InitiateTables($\Delta$). It sets up communications with the UPS 400 via a communication port, and determines whether the UPS 400 is working, whether the line replaceable unit has power and whether it should continue processing as a result. Finally, it creates the following objects and runs a starter function for each of them:

| Object | Class | Starter Function |
| --- | --- | --- |
| ConnectTask | SysmonConnects | StartHandlerConn( ) |
| MyWatchDog | WatchDogDriver | StartHandler( ) |
| ProcessItem[i] (one for each process for this LRU) | Process | Initialize( ) (StartHandler( ) is called later, after Process Registration) |
| SelfHeartBeatTask | SysmonSpecial | StartHandlerSpecial( ) |
| SelfMonitorTask | SysmonSpecial | StartHandlerSpecial( ) |
| DelayTask | DelayScheduler | StartHandlerDelay( ) |
| QueueSorted | QueueSort | None, used to schedule events (i.e., Process::PPostExternalKillProcess( )) |

Sysmon::StartHandler($\Delta$) creates an EventOnQueue object with an UpSystem event in it and places it in the MainQueue queue 564 to start the external processes (beginning with the transaction dispatcher 421). Finally, it calls Sysmon::MainQueueProcessing($\Delta$) which loops forever, using Sysmon::MainProcess($\Delta$) to handle all processing requests that is placed on the MainQueue queue by this and the other classes' threads. The basic flow of startup events is:

| | |
| --- | --- |
| UpSystem Event from Sysmon::StartHandler | start Transaction Dispatcher |
| Registration received from Transaction Dispatcher | start Message Processor |
| Registration received from Message Processor | start Service |
| Registration received from Service | start NAUs |

In this way, the system comes up in a sequential, orderly fashion.

MainQueueProcessing($\Delta$) loops forever waiting for Events to appear on the MainQueue queue. Once found, it calls MainProcess($\Delta$) that uses the information from the EventOnQueue object to lookup the 'real' action(s) to perform using the SmScript::GetSystemFullActionItem($\Delta$) and Process::GetTotalMatrix($\Delta$) functions. It processes these actions using Sysmon::ProcessEventList($\Delta$). ProcessEventList($\Delta$) 569 is only called by MainProcess($\Delta$) to look up and process the desired actions from a table of actions, which are maintained in the SmScript Class.

The above processes loosely form a state machine. A series of flags denoting the state of the Sysmon system is used to decide what to do next. The following routines are used to support this state machine. Currently, there is only one system level Action List to do: UpSystem[] or UpPAT[]. They each have several actions that point to SYSGLOBAL functions. These functions in turn determine whether they should call a process class function or a Sysmon class function. The Sysmon class functions are:

| | |
| --- | --- |
| PSysSoftReboot( ) | Calls softboot( ) which uses the ExitWindowsEx( ) command to reboot the LRU. Called via the global PSoftReboot( ) function. |
| PSysHardReboot( ) | Reboot via WatchDogDriver::Watch_Reboot( ) which causes the hardware to reset. Called via the global PHardReboot( ) function. |
| PSysGetState( ) | Retrieves the state of the system state machine. Called via the global PGetProcessState( ) function. This is not used: The variable 'selfstate' is used directly. |
| PSetSysState( ) | Sets the state of the system state machine, which is used in GetSystemFullActionItem( ) along with the current event to know what action to do to the system. Generally called via the global PSetState( ) function. |

The SysmonConnects class contains code necessary to communicate to the other processes in the line replaceable unit, for example the transaction dispatcher 421 by establishing a named pipe set to communicate with each of them. It works very closely with the RegisterObject Class to provide pipes to each of the process class handlers. This method of creating a generic named pipe set and assigning it to the first process to register is taken from the transaction dispatcher 421, however, because this program directs which external process is executed, and therefore which one is registered.

The StartHandlerConn($\Delta$) routine simply launches two threads, one for named pipe input and one for named pipe output. InputConnectThread($\Delta$) is launched by StartHandlerConn($\Delta$). It calls DynInput($\Delta$) which loops forever, opening a named pipe 574a for input, then waiting for an outside process to connect to it. It then creates a temporary RegisterObject class object to tie this named pipe to the connecting outside process, and loops to create another named pipe. OutputConnectThread($\Delta$) is launched by StartHandlerConn($\Delta$). It calls DynOutput($\Delta$) which loops forever, opening a named pipe 574b for output, then waiting for an outside process to connect to it. It then creates a temporary RegisterObject class object to tie this named pipe to the connecting outside process, and loops to create another named pipe.

When the DynInput($\Delta$) and DynOutput($\Delta$) routines of SysmonConnect receive input from an outside process to claim a named pipe, they create a temporary RegisterObject class object to receive registration information from the calling process and tie the current named pipe to the Sysmon process object associated with that process. In this way, each process object has its own set of I/O to its corresponding external process. This process launches RegisterInput($\Delta$) as a new thread. It is called by both SysmonConnects::DynInput($\Delta$) and DynOutput($\Delta$). The RegisterInput($\Delta$) code calls DynRegisterInput($\Delta$) and kills itself and its SELF (its own object) when DynRegisterInput ($\Delta$) is done. The DynRegisterInput($\Delta$) routine tries to read from the Named Pipe to get a Registration message from the outside process. It attempts this 100 times before it gives up and exits. If successful, it calls Process::StartHandler($\Delta$) to get its input or output thread started with this named pipe.

The SmScript class contains the tables of events and actions that are used to move each process object state machine from one state to the next. FullActionItem arrays read like pseudo code, each entry containing the following set of information: function name, process ID, additional data for the named function. Thus, for example, "{PHardReboot,systemflag,150}" means to run global function PHardReboot(150), which in turn runs the system function Sysmon::PSysHardReboot(150).

The InitiateTables(Δ) routine is called once per power-up to prepare the event/action table SysMatrix as appropriate for the runtime LRU system monitor. It fills this array with a pointer to the UpSystem or UpPAT FullActionList array.

The InitProcess(Δ) routine is called by Process::Initialize (Δ) for each process object created to complete the tables for the process to use. It moves the appropriate event/actions into this process object's TotalMatrix array. This permits the use of only one system monitor executable program, although its specific duties vary from line replaceable unit to line replaceable unit. For example, the primary access terminal LRU does not have the service process and the cabin file server LRU does not have the primary access terminal NAU process.

The GetSystemFullActionItem(Δ) routine returns the appropriate value from the SysMatrix table. The is used only in Sysmon::MainProcess(Δ). The Process Class Initialize(Δ) initializes the TotalMatrix table via SmScript::InitProcess (Δ). The Process Class StartHandler(Δ) is called by RegisterObject::DynRegisterInput(Δ) after an external process has successfully registered with Sysmon. It calls StartInputThread(Δ) or StartOutputThread(Δ) depending on the named pipe that was registered.

StartInputThread(Δ) is called by StartHandler(Δ) and simply launches a new thread, InputLoop(Δ). InputLoop(Δ) in turn simply calls DynInputLoop(Δ) for this process. DynInputLoop(Δ) continuously loops, collecting any IFE message from its named pipe (using the IFE_Message::GetData(Δ) function), and processing it using ProcessIncoming(Δ). Errors are reported using ProblemReport(Δ) and the MainQueue is updated to control either a shutdown or retry, depending on the severity of the error. If it's error is severe enough, it exits the loop and the thread dies.

StartOutputThread(Δ) is called by StartHandler(Δ) and simply launches a new thread, OutputLoop(Δ). OutputLoop (Δ) in turn calls DynOutputLoop(Δ) for this process. DynOutputLoop(Δ) continuously loops, collecting any IFE message from its OutputQueue and sending it out its named pipe (using the IFE_Message::PutData(Δ) function). Errors are reported using ProblemReport(Δ) and the MainQueue is updated to control either a shutdown or retry, depending on the severity of the error. If it's error is severe enough, it exits the loop and the thread dies.

GetTotalMatrix(Δ) returns the corresponding action list from TotalMatrix for the current event and state of this process. It is called only by Sysmon::MainProcess(Δ).

The following state machine routines are stored in the SmScript state machine tables (called FullActionItems) and are activated as a result of certain event/state combinations via ProcessEventList(Δ):

| | |
|---|---|
| PexternalKillProcess( ) | Kills its associated external process with the TerminateProcess( ) function. Called from the global PExternalKillProcess( ) function. |
| PgetProcessState( ) | Returns the current state of this state-machine. Called from global PGetProcessState( ). |

-continued

| | |
|---|---|
| PkillProcess( ) | Issues IFE message to external process to commit suicide. Currently not supported by most external processes. Called from global PKillProcess( ). |
| PpostExternalKillProcess( ) | Uses the QueueSorted::PutSorted( ) function to schedule a Kill command to go into the MainQueue later. Called from global PPostExternalKillProcess( ). |
| PSetState( ) | Updates the current state of this state-machine. Called from global PSetState( ). |
| PstartProcess( ) | Gets the full pathname of the associated external process and starts executing it. Called from global PStartProcess( ). |

The WatchDogDriver class contains code necessary to manage watchdog driver messages. The watchdog is a hardware component that is responsible for re-starting the line replaceable unit if it fails to receive input in regular intervals. Using this class ensures that the watchdog receives that input from the system monitor 412 regularly, unless some system or software error prevents it. Commands available for use by Sysmon and Process objects are: Watch_Enable(Δ), Watch_Disable(Δ), Watch_Maintain (Δ) and Watch_Reboot(Δ). These functions all put the corresponding watchdog action command onto a DogQueue 593 for processing by DynQueueThread(Δ), which is the only function allowed to actually talk to the driver directly.

The watchdog driver 410 controls a watchdog hardware device on the computer supplied by Octagon Systems (called the Octagon PC-450) which, when activated by the system monitor 412, reboots the system unless it is accessed no less than every 1.6 seconds by the watchdog driver 410. The driver 410 can receive a command to force a reboot of the system, which stops the system from updating the watchdog driver 410. The watchdog driver 410 then times-out and a reboot occurs. Use of the watchdog driver 410 helps improve system availability in case of a software or hardware anomaly that causes unpredictable results in system operation.

Sysmon::StartHandler(Δ) creates the WatchDogDriver object and calls its StartHandler(Δ) routine, which is responsible for launching two threads. One thread manages the I/O with the watchdog hardware, and the other thread maintains the regular output commands to it.

WatchStaticThread(Δ) calls WatchDynamicThread(Δ) that places a request for a 'strobe' to the watchdog onto the DogQueue 593 (viaWatch_Maintain(Δ)). It then sleeps for 1,000 seconds and loops again.

StatQueueThread(Δ) calls DynQueueThread(Δ) that performs the actual output to the watchdog hardware, "\wdog". It reads a command request from the DogQueue queue 593 and calls either Watch_Enable_DO(Δ), Watch_Disable_DO(Δ), Watch_Maintain_DO(Δ) or Watch_Reboot_DO (Δ) to perform the requested command using the Windows DeviceIoControl(Δ) function.

The QueueSorted class coordinates activity in the Main-Queue 564. For example, it is sometimes necessary to schedule tasks to occur in the future (such as shutdown due to loss of power). To do this, QueueSorted provides the following functions. The QueueSorted(Δ) constructor creates its own queue and launches a thread, StatPutQueueThread(Δ) to monitor the queue periodically. The PutSorted(Δ) function allows users to add elements to the queue along with a timestamp indicating the time at which this element should be dealt with. The PutSorted(Δ) function puts them on the queue sorted by the timestamp so that they are dealt with in the proper order.

StatPutQueueThread(Δ) calls DynPutQueueThread(Δ) which loops forever, trying to process the elements on its queue. If the current time is less than or equal to the time of the element's timestamp, the element is moved to the MainQueue for processing by Sysmon::MainQueueProcessing(Δ). Although it is scheduled, it is only placed at the end of MainQueue 564, not at the front. Therefore, it does not supercede any existing MainQueue elements.

CAPI Library

Figure 16:
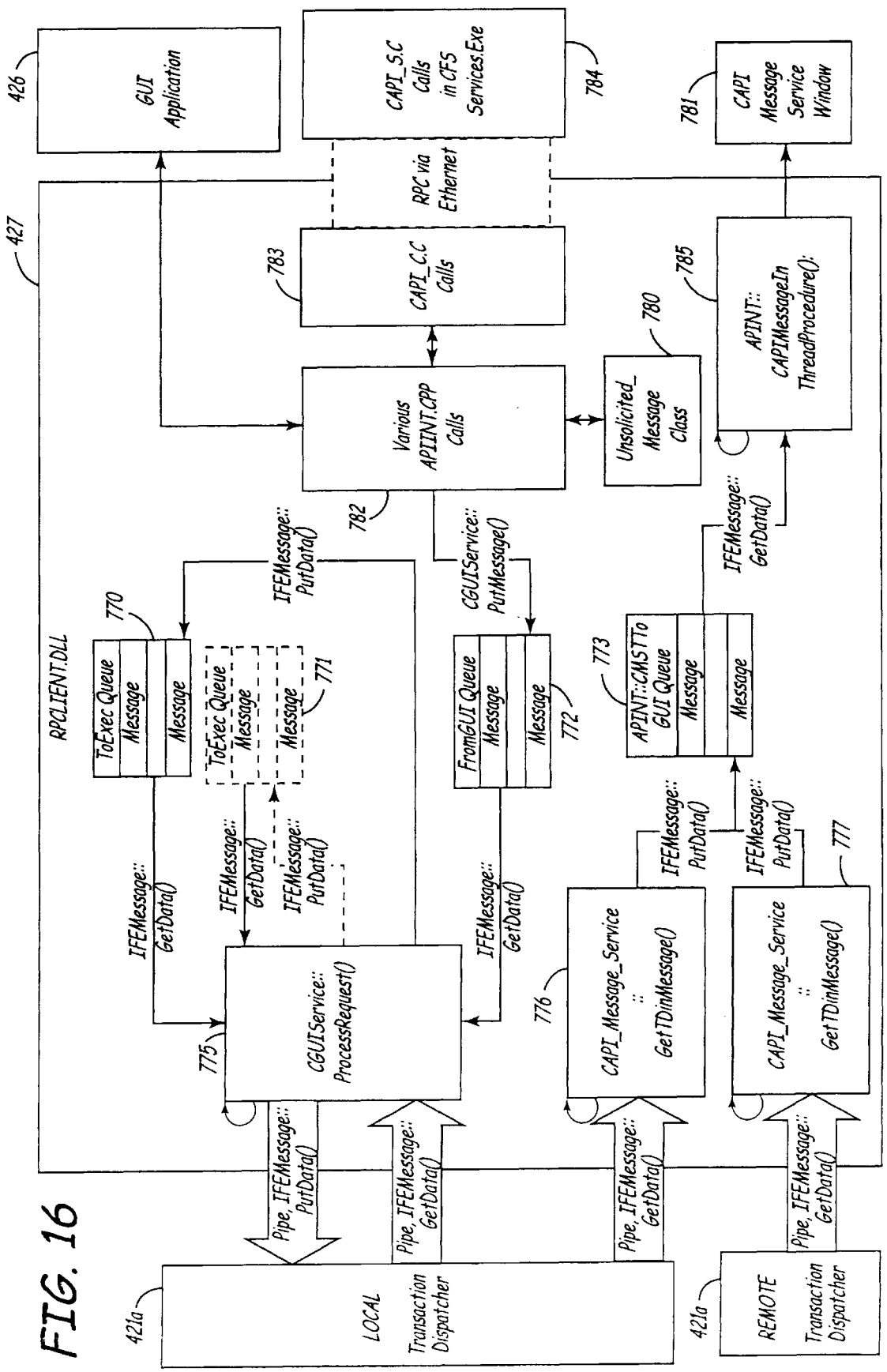
FIG. 16 illustrates primary access terminal RPC client-.DLL function and data paths.

The CAPI (RPC Client) library 427, or RPCLIENT.DLL 427, provides a means of communication between the graphical user interface 426 and the rest of the system 100 through the primary access terminal NAU 409. The RPC (remote procedure calls) client library 427 is shown in FIG. 16. The RPC client library 427, or RPCLIENT.DLL 427, comprises a ToExec Queue 770, a FromExec Queue 771, a FromGUI Queue 772, and an APIINT::CMSToGui Queue 773. The ToExec Queue 770 and a FromExec Queue 771 are coupled to transmit and receive CGUIService::ProcessRequest(Δ) threads 775. The FromGUI queue 772 is coupled to transmit various API-INT.CCP calls 782 to the CGUIService::ProcessRequest(Δ) threads 775. The APIINT.CCP calls 782 are derived from CAPI_C.C Calls 783 that are routed by way of the Ethernet network 228 from CAPI_S.C calls 784 in the Services.exe program 477 running in the cabin file server 268. The CGUIService::ProcessRequest(Δ) threads 775 route messages to and from a local transaction dispatcher 421a. The APIINT::CMSToGui Queue 773 receives messages from the local transaction dispatcher 421a and from a remote transaction dispatcher 421b. Messages sent from the transaction dispatchers 421a, 421b, are forwarded to an APIINT::CAPIMessageInThreadProcedure(Δ): 785 that routes the messages to the CAPI Message Service Window 781.

The PAT GUI 426 cannot be communicated to via named pipes because it is a Windows application and must therefore communicate using standard Windows messages. The CAPI message handler is a set of routines within the CAPI library 427 that provides a bridge between the IFE messages and the GUI Windows application. Instead of communicating via named pipes directly with the GUI, unsolicited messages 780 utilize named pipes into a message service window 781. In order for the GUI 426 to be able to receive them, it must have already opened or started a window capable of receiving this type of message in the background using the appropriate CAPI library calls.

Any Windows user interface that needs to communicate with the transaction dispatcher(s) 421 of the primary access terminal 225 and/or cabin file server 268, or that needs to access the CAPI calls in the SERVICE.EXE program of the cabin file server 268 needs to link in and use the RPCLIENT.DLL library 427 that contains the following files:

| | |
|---|---|
| APIINT.CPP | Dllmain( ) and Visual Basic Application Interface Routines |
| CAPI_C.C | The CAPI's RPC Client Support Routines |
| HOOKSDLL.C | 'Canned' Dynamic Link Library 'glue' from Microsoft |
| CGUSRVCE.CPP | Core Gui (CGUIService) Class (connects to TD) |
| CPMSSGSR.CPP | CAPI_Message_Service Class |
| UNSLCTDM.CPP | Unsolicited_Message Class |

APIINT.CPP is the application interface's interface and is the interface between the graphical user interface 426 (GUI or Main Application) and the rest of the system 100. In order to connect to the rest of the system 100, InitializeInterfaceVB(Δ) must be called to establish communications with the transaction dispatcher(s) 421 and start CAPI_Message_Service::GetTDInMessage(Δ) threads, which receive all unsolicited messages from the transaction dispatcher(s) 421.

A call to StartMessageServiceVB(Δ) launches an I/O thread, CAPIMessageInThreadProcedure(Δ) to continuously read and process unsolicited messages obtained from the CMSToGui Queue, supported by the CAPI_Message_Service class object.

Cabin File Server

The cabin file server executive extension is discussed with reference to FIG. 10. The cabin file server 268 and the primary access terminal 225 have many similar functions such as message processors 404 and 452, transaction dispatchers 421 and 473, system monitors 412 and 454, and ARCNET drivers 412 and 450. The discussion of these functions in conjunction with the primary access terminal 225 presented above also applies to the cabin file server 268 with differences as noted.

The cabin file server executive extension set of routines together with the common executive software forms the generic application for the cabin file server 268. The common executive software includes the following components: backbone NAU 463, seat NAU 465, VCP NAU 462, test port NAU 461, high-speed download driver 449, services 477 including cabin services 478–482, 487–491 and sales services 483–486, CAPI calls 476, and the database 493, as shown in FIG. 10. The function and data paths of many of the NAUs 461–465 have a structure substantially identical to the primary access terminal 225 structure shown and described with reference to FIG. 13 regarding the basic network addressable units function and data paths. The changes generally relate to the structure of the state machine objects 510 that are used in the respective NAUs 461–465.

Backbone NAU

Figure 17:
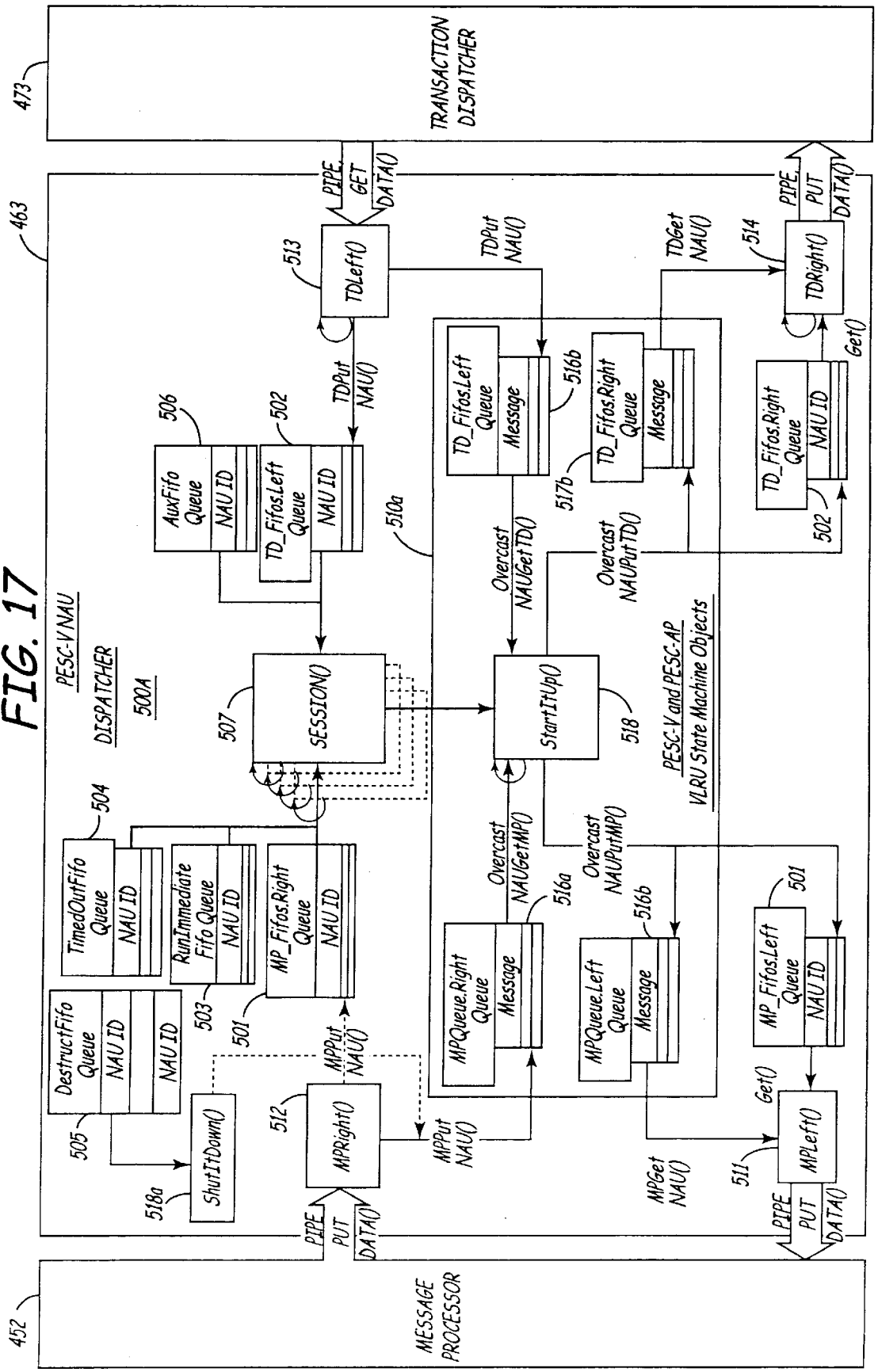
FIG. 17 illustrates backbone network addressable unit function and data paths.

The detailed design of the cabin file server executive extension will now be discussed. The BACKBONE.EXE routine contains the backbone NAU program 463. FIG. 17 illustrates the backbone NAU program 463 function and data paths. The backbone NAU 463 is responsible for receiving and processing messages that originate from the audio-video units 231, area distribution boxes 217, passenger entertainment system controllers PESC-A 224a and the PESC-V 224b, and any other communications backbone line replaceable unit. The structure of the backbone NAU 463 is substantially the same as the network addressable unit 409 function in the primary access terminal 225 and data paths discussed with reference to FIG. 13. The backbone NAU 463 comprises a PESC-V NAU dispatcher 500a and PESC-V and PESC-AP VLRU state machine objects 510a shown in FIG. 34. The backbone NAU program 463 includes the following primary components:

| | |
|---|---|
| BACKBONE.CPP | The Main( ) Program |
| PSCPDSPT.CPP | The NAU Dispatcher for the PESC-A |
| PSCVDSPT.CPP | The NAU Dispatcher for the PESC-V |
| PSCPVLRU.CPP | The VLRU Class for the PESC-A |
| PSCWLRU.CPP | The VLRU Class for the PESC-V |

The Main(Δ) program is a standard NAU starter that registers the backbone NAU 463 with the system monitor 454 using a SysMonInterfaceClass::Register(Δ) routine. The Main(Δ) program launches a PescV_Dispatch object to open up PESC-V VLRU communications between the message processor 452 and the transaction dispatcher 473, and a PescAp_Dispatch object as well to launch the PESC-A 224a. It calls PescV_Dispatch::startItUp(Δ) to initialize both of the VLRUs. The Main(Δ) program launches 14 Session(Δ) 507 threads, although only three are actually in use. It sends a SubProcessStart command to the VLRUs that causes the first Session(Δ) 507 threads in to connect to each VLRU permanently. Only the PescV_Dispatch object maintains a set of MPRight(Δ) 512, MPLeft(Δ) 511, TDRight(Δ) 514 and TDLeft(Δ) 513 threads. Finally, the Main(Δ) program sleeps forever until interrupted. It does not call shutItDown(Δ) 518a to close all the VLRUs down and exit gracefully. Instead, it simply deletes the PescV_Dispatch object and dies.

The VLRUs in this NAU contain their own set of NAUPutTD(Δ), NAUPutMP(Δ), NAUGetTD(Δ) and NAUGetMP(Δ) routines because they use I/O routines from the PESCA_Message class and PESCV_Message class instead of the IFE_Message class.

The PescAp_VLRU object attaches directly to the first Session(Δ) 507 possible via its StartItUp(Δ) 518 function. Then, it continuously loops waiting for data to appear in its message processor and transaction dispatcher input queues. The PescAp_VLRU object processes the following commands:

FlightInfoRequest IFE function from the PESC-A 224a. This VLRU creates its own IFE message to the IFE control service asking for flight information.

FlightInfoUpdate IFE function from the IFE control service, after the PESC-A 224a issues it a FlightInfoRequest. This VLRU creates its own IFE message to forward this to the PESC-A 224a via the message processor 452.

PES_CONTROL command from the PESC-A 224a. This VLRU examines the state of the WeightOnWheels Using PESCA_Message::IsGearCompressed(Δ). If the state of the wheels has changed, it forwards this new information to the database using NotifyNewFlightState(Δ), and to the CAPI message service via its own NAUPutTD(Δ). All other messages are ignored.

The PescV_VLRU object attaches directly to the first Session(Δ) 507 possible via its StartItUp(Δ) function. Then, it continuously loops waiting for data to appear in its message processor and transaction dispatcher input queues. It processes the VideoControl command from IFE control services by formatting and forwarding to PESC-V 224b. Any other message from PESC-V 224b is routed directly to the IFE control services.

Seat NAU

Figure 18:
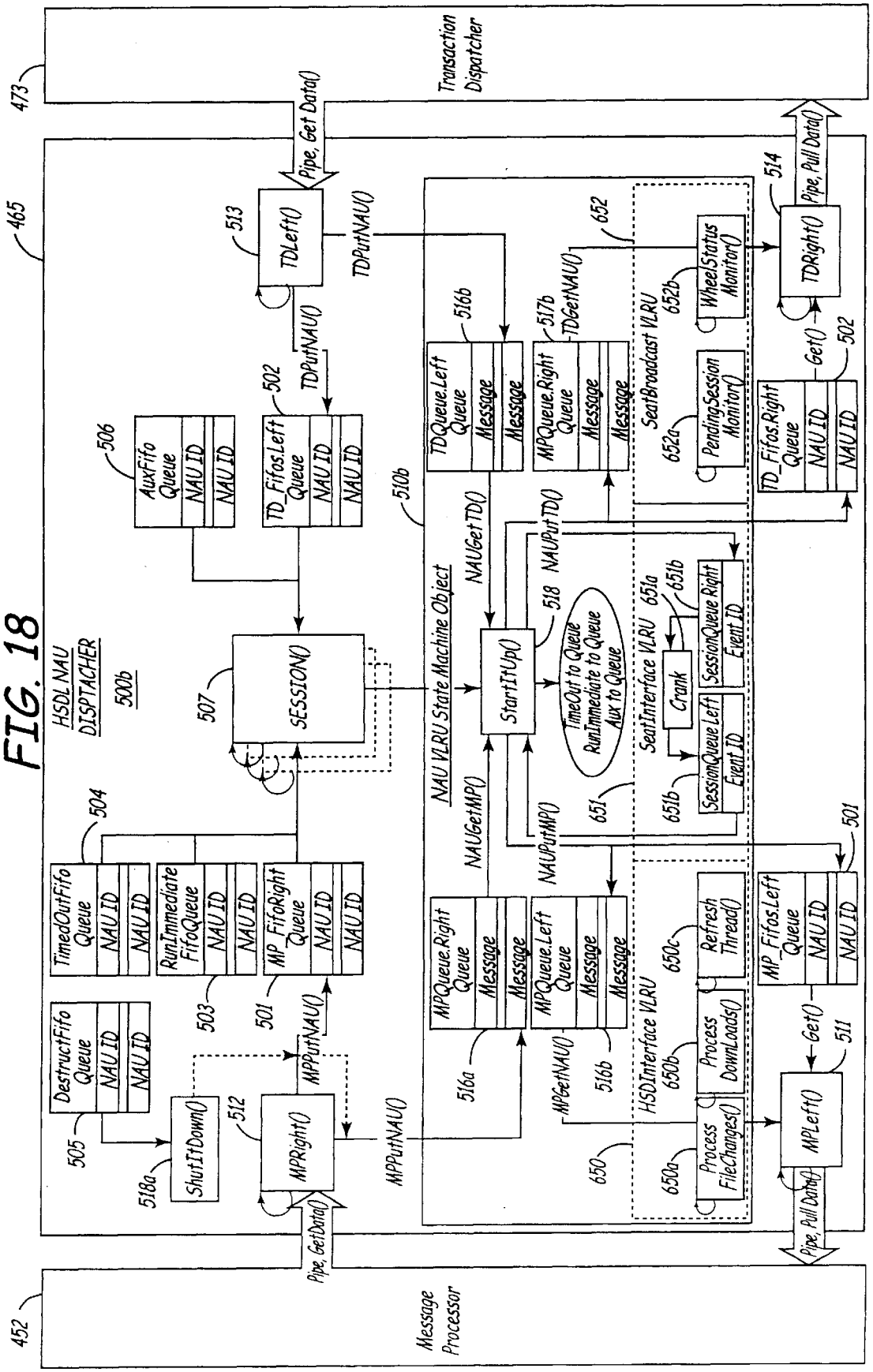
FIG. 18 illustrates seat network addressable unit function and data paths.

The seat NAU program 465 function and data paths are depicted in FIG. 18. The seat NAU 465 controls communication with the seats 123 in the aircraft 111. The seat NAU 465 maintains three kinds of VLRUs: one that controls high speed download of games and programs to the seats 123; one for each seat 123 to communicate during the flight for sales and other requests, and one that periodically broadcasts status messages to the seats 123.

The structure of the seat NAU 465 is substantially the same as the network addressable units function and data paths discussed with reference to FIG. 13. The seat NAU 465 includes VLRU state machine objects 510b comprising an HSDLInterface VLRU 650, a SeatInterface VLRU 651, and a SeatBroadcast VLRU 652. The HSDLInterface VLRU 650 comprises a ProcessFileChanges(Δ) 650a, ProcessDownloads(Δ) 650b, and a RefreshThread(Δ) 650c. The SeatInterface VLRU 651 comprises a Crank(Δ) 651a, a SessionQueueLeft 651b, and a SessionQueueRight 651c. The SeatBroadcast VLRU 652 comprises a PendingSessionMonitor(Δ) 652a and a WheelStatusMonitor (Δ) 652b.

SEAT.EXE contains the seat NAU program 465 that includes the following primary components:

```
NAUMAIN.CPP   The Main() Program
HSDLDSPT.CPP  The High Speed Download NAU Dispatcher
STDSPTCH.CPP  The Seat NAU Dispatcher
STNTRFCE.CPP  The Seat VLRU Class
SESSION.CPP   The Service Session Class
STBRDCST.CPP  The Seat Broadcast VLRU Class
HSDLNTRF.CPP  The HSDL VLRU Class
DWNLDFLN.CPP  For HSDL, the DownLoadFileInfo Class
FILEMAP.CPP   For HSDL, The FileMap Class
```

A VLRU session is characterized by the NAU::Session(Δ) 507 threads, one for each VLRU that may be active concurrently. A service session is characterized by the session class that controls a stream of communications between a single seat and a service (such as a sales service). This stream may include several messages sent back and forth before a service session is complete.

The Main(Δ) program is a standard NAU starter. Main(Δ) registers this program with the system monitor 454 using the SysMonInterfaceClass::Register(Δ) routine. The Main(Δ) program creates a HSDLDispatch object to open communications between the message processor 452 and the transaction dispatcher 473 and create the high-speed download VLRU 650. Then the Main(Δ) program creates the SeatDispatch object to create all the SeatInterface VLRUs 651 and the SeatBroadcaster VLRU 652. The Main(Δ) program launches 14 Session(Δ) 507 threads that are shared by all the VLRUs. A typical number of sessions is 14 including ten seats' service sessions, plus HSDL, plus broadcast, plus two more to control seats that are waiting for a service session to free up (pending seats). The main program calls NAUDispatch::startItUp(Δ) to initialize the VLRUs with a SubProcessStart command. The HSDLDispatch file defines a MPRightHook(Δ) function to be called within the NAUDispatch::MPRight(Δ) thread prior to processing the incoming message from the message processor 452. It uses this hook function to intercept the high speed download request messages and route them to the HSDL VLRU 650 instead of to the seat VLRU 651, where its LRU address would normally send it. This reduces traffic to the ten Sessions(Δ) 507 reserved for the seats. Finally, Main(Δ) sleeps forever until interrupted. It does not call shutItDown (Δ) to close all the VLRUs down and exit gracefully. Instead, it simply deletes the NAU dispatch and dies.

The SeatInterface VLRU 651 is responsible for processing requests from the seats such as ordering a movie or a game. It routes these requests to the applicable service via the transaction dispatcher 473. One VLRU for each seat in the system exists, however, only ten VLRUs at a time may actively be engaged in a communication session between seat and service.

Each SeatInterface VLRU 651 has a session object that it uses as its state machine. Its StartItUp(Δ) 518 function loops continuously as long as it is actively engaged within a session (that is, the session state is not idle), looking for one of the following events: data from the message processor 452, data from the transaction dispatcher 473, a NAU TIMEOUT, a NAU RUN IMMEDIATE, a NAU AUX, a SessionQueue.Right 651c or SessionQueue.Left 651b events. It passes any transaction dispatcher messages on to the seat display unit 122a provided they do not affect the state of the VLRU. StartItUp($\Delta$) 518 then calls Session::Crank($\Delta$) 651a to process one event from the SessionQueue.Right queue 651c. Once it has been processed, StartItUp($\Delta$) 518 forwards any message that may be waiting in SessionQueue.Left 651b (sending it out to the message processor 452 or transaction dispatcher 473), then determines what to do with the input event that got it going (from the message processor 452, transaction dispatcher 473, timeout etc.). Usually, StartItUp($\Delta$) 518 simply puts the input event in SessionQueue.Right 651c, which re-triggers StartItUp($\Delta$) 518 to again call Session::Crank($\Delta$) 651a until all events and/or messages are processed. Once the processing is complete for this VLRU's Session, StartItUp($\Delta$) 518 exits, to give the Session($\Delta$) thread 507 to another seat. It uses MessageToEvent($\Delta$) to convert a Seat_Message into its corresponding event value, and it uses EventToMessage($\Delta$) to develop an appropriate outgoing message based on the current VLRU event. StartItUp($\Delta$) 518 also processes the following control messages:

| Seat | Seat NAU | Sales Service |
|---|---|---|
| Session Control - OPEN> | | |
| | <Session Status - Pending | |
| Session Control - SDU Pending> | | |
| | <Session Status - Opened | |
| Transaction Command - Order> | | |
| | Transaction Command - Order> | |
| | | <Transaction Status - Ordered |
| | <Transaction Status - Paid | |
| Transaction Command - Order> | | |
| | Transaction Command - Order> | |
| | | <Transaction Status - Ordered |
| | <Transaction Status - Paid | |
| Session Control - Close> | | |
| | <Session Status - Closed | |

| IFE Message | Action |
|---|---|
| StartStatisticsCapture | Sent by the SeatBroadcast thread when WeightOnWheels is detected, uses timedCallback::queue() to set a timer to a random value to cause the Statistics request to go to the seat after the timeout. This prevents all seats from processing the request at the same time (as it would from a broadcast), to keep the traffic on the network less congested. |
| SubProcessReinit | Re-Initializes tables via Initialize(). |
| SubProcessStart | Starts the State Machine for this VLRU, putting it into the Start state. |
| SubProcessStop | Exits. |

At a minimum, a seat transaction requires sending a message to a service 477 and receiving an answer back. However, if it is a complex transaction (for example, a multiple-product merchandise order), several messages are routed before the entire transaction is complete. Because 500 seats 123 may be all communicating at the same time, the basic design of communications flow from the seat 123 to the services 477 and back can get highly fragmented when these complex transactions are involved. To minimize this fragmentation (and thus create the appearance of faster response at the seats), a service session protocol has been developed.

Supported by the session class and the SDU interface, the service session protocol requires a seat 123 to open a session (or tap dibs) with the seat NAU 465 before a transaction can take place. Only ten sessions 507 are supported simultaneously (controlled in the session constructor by hSessionSemaphore), so if they are all busy, a pending message is returned to the seat 123 to tell it to wait, and the seat's ID is kept on the SeatInterface::PendingSeats queue. Once a great 123 has a session 507 assigned to it, it can communicate freely with the service 477 via the NAU 465 until it closes or releases the session 507. The following table illustrates a sample session communication flow.

Each SeatInterface VLRU 651 has a session class, called the Session to support seat communications flow that uses an EventStateTable that keeps track of the action to perform for any given event and/or state. Each action is maintained as a separate function whose name begins "Ac" (e.g., AcTerminateSelf($\Delta$)). These Action functions are all static BOOL functions that need the current session and event pointers passed to them to operate. They are called by the function Crank($\Delta$) 651a after it looks them up in the EventStateTable.

A state table called Action in the software contains the relationship between the states, events, actions and changed or new states. Using information from this table, a seat's Session moves from one state to another. Not all possible from-state/event trigger combinations are represented in the Action table. Many do-nothing or illogical combinations default. For that reason, the Action table is used to fill in a larger, more comprehensive table called the EventStateTable. This two-dimensional table uses the values of from-state and event trigger as indexes and defaults the illogical values to either do nothing or to terminate. A typical session flow (with no errors) to place an order would start and end in the SessionInit state as shown below:

| From-State (St...) | Event Trigger (Ev...) | Action Function (Ac...) | To-State (St...) |
|---|---|---|---|
| Start | Start | SessionInit | SessionInit |
| SessionInit | SDUOpen | SessionTryToOpen | Pending |
| Pending | SelfSessionAvailable | SessionAvailable | Opened |
| Opened | SDUOrder | SDUOrder | OrderPending |
| OrderPending | ServiceOrdered | ServiceOrdered | Ordered |
| Ordered | SDUPayment | SDUPayment | PaidPending |
| PaidPending | ServicePaid | ServicePaid | Opened |
| Opened | SDUClose | SessionClose | Closed |
| Closed | SelfClosed | SessionNormalTerminate | Terminated |
| Terminating | SelfTerminated | Terminated | Terminated |
| Terminated | SelfReinitialize | SessionInit | SessionInit |

Each session 507 has a SessionQueue queue pair that is used to store the events to perform for this session's state machine. The SessionQueue's right queue 651c stores incoming message/event pointers for Session::Crank($\Delta$) 651a to process, while its left queue 651b stores outgoing event/message pointers for SeatInterface::StartItUp($\Delta$) 518 to forward to either the message processor 452 or the transaction dispatcher 473 or timeouts as appropriate.

The SeatBroadcast VLRU 652 is a child of the SeatInterface class so that it can help monitor the seat communication traffic for the other SeatInterface objects. It is responsible for sending messages to more than one seat or more than one SeatInterface VLRU 652. Only one message is actually sent in a broadcast to the seats with the destination set to "AllSeats". It uses the CalledTimeOut utilities to create a TimeOut Thread called SeatBroadcastTimeout($\Delta$) to force periodic, unsolicited broadcasts. It also launches the PendingSessionMonitor($\Delta$) 652a and WheelStatusMonitor ($\Delta$) 652b threads.

The SeatBroadcast VLRU StartItUp($\Delta$) 518 function loops forever, retaining possession of one of the Session($\Delta$) 507 threads. It continuously monitors messages and processes the following events or messages:

available for processing. Then it puts this seat ID onto the AuxFifo queue to be taken by the next available Session($\Delta$) thread 507.

The WheelStatusMonitor($\Delta$) 652b is a high priority thread that waits for a signal from the PESC-A VLRU in the backbone NAU, which pulses the weight on wheels or the weight off wheels events when their status changes. This monitor forwards this event information to the StartItUp($\Delta$) 518 to process when it next loops.

The HSDLInterface VLRU 650 is a standard NAU child dedicated to servicing all download requests for games or application programs by the seats. Its constructor connects to the driver, "HSDL1" to transmit data to the seats via the digitized video multiplexer system. The constructor also prefills a CRC table used for deriving the CRC values during downloads. It creates a Mutex to control access to the HSDL directory to ensure that the routines in COPYDNL.CPP and SDU_BLDR.CPP don't interfere with the download process by modifying the files in the download directory at the wrong time.

The StartItUp($\Delta$) 518 routine launches the following threads in the HSDLInterface VLRU. The ProcessFileChanges($\Delta$) thread 650a reacts to changes in the

| Message or Event | Action |
|---|---|
| CPMS Message | Tells all SDU-SI boards the current status of the HSDL Queue. Retriggers the HSDLInterface::ProcessDownLoadQ() event. |
| MovieTimes Message | Tells the MP what the Movie Run Times are |
| NAU_TIMEOUT Event | Triggers every tenth of a second using the timedCallback::queue() function. When received, this broadcasts a "Session Complete" message to all seats if a Service Session has just completed, so they can retry communications, if needed. |
| ProcessReinit Message | Tells all VLRUs to "SubProcessReinit". |
| SeatTransfer Message | Uses ProcessSeatTransfer() to parse and forward this message to the two SeatInterface VLRUs that are involved in the transfer. |
| SubProcessStart Message | Tells all VLRUs to "SubProcessReinit". |
| SubProcessStop Message | Stops the Timeout thread and ends the program. |
| Weight_On_Wheels Event | Tells all VLRUs to Start Statistics Capture, now that the aircraft has landed (ending flight). |

The PendingSessionMonitor($\Delta$) 652a has nothing to do with seat broadcasting. It is a supplement to the normal SeatInterface processing. This monitor continuously waits for a seat 123 to be put onto the static SeatInterface::PendingSeats queue (by any of the other SeatInterface::StartItUp ($\Delta$) threads), and then waits until one of the seat sessions is NT Registry as well as changes in the Download Files Directory. It then calls ProcessEntireDirectory($\Delta$) to red the directory that contains the files that can be downloaded, creating a DownLoadFileInfo object for each, and placing all download files in the ConvertQ for RefreshThread($\Delta$) to handle. This thread places all programs and database files ahead of games in the ConvertQ so that the Seats can be ready for use as soon as possible. The RefreshThread(Δ) 650b looks for files in the ConvertQ queue to prepare for later downloading. It calls DownLoadFileInfo::Refresh(Δ) to block the data and add checksums and CRCs for Seat verification. It also saves the identity of the requesting seat for communication during the actual download. The ProcessDownLoads(Δ) 650c thread is launched at a low priority, so that the others can prepare all the files beforehand. It calls ProcessDownloadQ(Δ) to use SeatInterface::GetDownLoadInstruction(Δ) to handle this file properly. It calls DownLoadFileInfo::Download(Δ) for each file in the DownLoadQ to actually send them to the output driver. During the download, it redirects message handling away from the seat's SEB and toward its SDU I/F board because the seat display unit 133 can't receive messages without its application running, which is true whenever it is receiving a download. Then StartItUp(Δ) calls ProcessIOQueue(Δ) to continuously sample the message processor and transaction dispatcher input queues. It processes the following message processor messages:

| IFE Message | Action |
| --- | --- |
| HighSpeedDownload | Puts the download request onto the DownLoadQ. It moves a request to the top of the queue if the reguest is for a program (high priority). |
| SubProcessStart | Simply recognizes this command, no further processing. |
| SubProcessStop | Flushes its MP and TD Input queues and tells the DestructFifo queue (one of the few VLRUs to use this) that it can be shut down. |

VCP NAU

Figure 19:
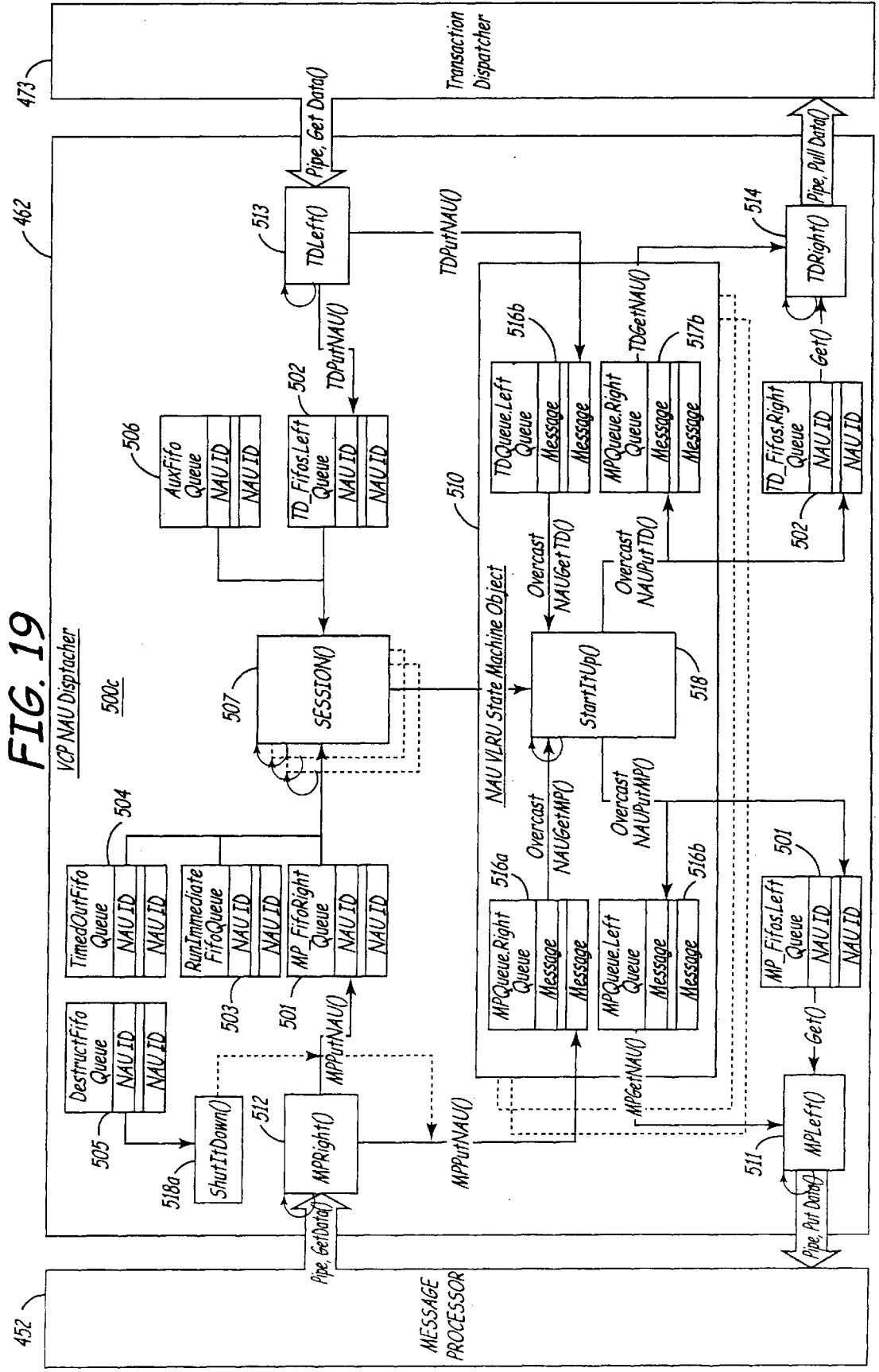
FIG. 19 illustrates VCP network addressable unit function and data paths.

The VCP NAU controls communications with the video players and other video sources. It maintains one VLRU for each video source, and constantly polls the players for their status. The VCP network addressable unit program 462 function and data paths are shown in FIG. 19. The structure of the VCP NAU 462 is substantially the same as the network addressable unit's function and data paths discussed with reference to FIG. 13. The VCP NAU 462 comprises a VCP NAU dispatcher 500c and a NAU VLRU state machine object 510c as shown in FIG. 19.

VCP.EXE contains the VCP NAU program. This program includes the following primary components:

| | |
| --- | --- |
| VNUMAIN.CPP | The Main() Program |
| VCPDSPTCH.CPP | The NAU Dispatcher |
| VCPNTRFC.CPP | The VCP VLRU Interface Class |
| VCPSTSVL.CPP | The VCP Status VLRU Class |

Main(Δ) issues a call to GetLruInfo(Δ) to read the database 493 for all the VCP names (e.g., "VCP01"). It then launches a VCPDispatch object to open communications between the message processor 452 and the transaction dispatcher 473. It calls VCPDispatch::startItUp(Δ) 518 to initialize the VLRUs, one for each video cassette players 227 plus one for periodic statusing of all video cassette players 227. It also launches the Session(Δ) 507 threads. Main(Δ) then calls ConsoleCmd(Δ) to process all console characters that may be in the input buffer. If "S" is encountered, at STOP command is issued to VCP01. If "P" is encountered, a PLAY command is issued to VCP01. This is for testing purposes only. Finally, Main(Δ) sleeps forever until interrupted. It calls shutItDown(Δ) to close all the VLRUs down and exit gracefully.

A VCP VLRU is created for each video cassette player 227 in the database 493 using the VCPInterface Class. This class is derived from the generic NAU class, however, due to the communications protocol employed by the players, many of the generic functions are overcast or not used at all.

The VCPInterface(Δ) constructor creates two unique controllers: Static hIOSemaphore and bHasSemaphore. These are used to enforce single-threaded communications between a video cassette player 227 and the transaction dispatcher 473. Using these controllers, only one VLRU can be processing communications at a time. hIOSemaphore is a handle that acts as 'dibs': when this handle is owned by a thread, that thread can process communications. bHasSemaphore is a local flag that tells the thread whether it currently is the owner of the semaphore.

VCPInterface::StartItUp(Δ) 518 is called immediately for each Session(Δ) 507 to process a 'dummy' message from the message process 452 for each of the video cassette players 227. This 'dummy' message is invoked at their creation to glue each video cassette player 227 to its own session. This function then loops forever to continuously process messages. If this session does not have dibs, the basic loop waits for input from the transaction dispatcher 473 and waits for the hIOSemaphore. Then it flushes all possible input from the message processor 452. It retains ownership of the IO handle, and loops again. If this session already has dibs (from the previous paragraph), the basic loop waits for input from the message processor 452. Once received, it processes it and sends an acknowledgement back to the video cassette player 227 via the message processor 452. It then releases dibs for use by the other VLRUs.

A single VLRU of class VCPSts_VLRU is created to periodically poll the players for their status. Two lists of information are used to organize this: MessageMap, that contains a list of each video cassette player 227 and its network address; PendingStatus, that contains a list of video cassette players 227 that have just completed a communications event. MessageMap is maintained via AddVLRU(Δ) as each VCP VLRU is created by the dispatcher. PendingStatus is maintained by XmitResponse(Δ) each time the VCP VLRu completes a communications event.

VCPSts_VLRU contains a timeout function that is invoked approximately 10 times per second. The StartItUp (Δ) 518 function is immediately invoked and tied permanently to a Session(Δ) 507 thread. It then loops forever waiting for a timeout to occur and the hIOSemaphore to be available. Once both events have occurred, it examines the contents of the PendingStatus string list and prompts the topmost video cassette player 227 on this list for its status. If none are on this list, it prompts the next video cassette player 227 in the MessageMap list. This is performed via SendStatus(Δ). These status responses are formatted and forwarded to the Video Control Service via the transaction dispatcher 473. The I/O semaphore is released and the process cycle repeats.

HSDL Driver

In order to efficiently load programs, data and video games in the seats 123, the high-speed download driver 449 in FIG. 10 provides the ability to convert this information into a synchronous data link control (SDLC) data stream. This data stream is forwarded to the video modulator (VMOD) 212b to broadcast to all seats 123 via the RF distribution system. Any seat 123 that requires the download can then tune to the download channel and retrieve the information. HSDL.SYS is the high speed down load driver, written in C as a standard Windows NT driver.

Services

The application functions are divided into services 477 that are responsible for carrying out the requests that come from the various devices (seats 123, PAT GUI 426, etc.). Requests come in two forms: IFE_Messages from the transaction dispatcher 473 and CAPI calls from the GUI 426. Service functions are the primary functions that interact with the database 493 during runtime. Each service 477 is connected to the transaction dispatcher 473 via its own named pipes, and as needed, it connects to the SQL server 492 for database access.

SERVICE.EXE (shown in FIG. 10) is organized into four basic components: main, CAPI calls 476, cabin services 478–482, 487–490 and sales services 483–486. The cabin services 478–482, 487–490 and sales services 483–486 are sets of service classes whose objects each connect to the transaction dispatcher 473 via named pipes (pipe processor 474). The cabin services and sales services also each have a thread and subroutines to process all IFE messages received and they all have sets of functions that are used by CAPI-.CPP routines of the same name. SERVICE.EXE is comprised of the following source files:

| SRVCPRCS.CPP | The Main Program and Service Class |
| --- | --- |
| CAPI_S.C | The RPC Server Functions (See CAPI_C for its client companion functions) |
| CAPI.CPP | The actual CAPI Application Functions, called by CAPI_S.C APIINT.CPP, and the Services. |
| CBNSRVCC.CPP | The CabinService Base Class |
| CRDTCRDP.CPP | The CreditCardProcessor Class |
| DTYFRSRV.CPP | The DutyFreeService Class |
| GMSRVCCL.CPP | The GamesService Class |
| IFCNTRLS.CPP | The IFEControlService Class |
| MVCYCLCL.CPP | The MovieCycle Class |
| MVSRVCCL.CPP | The MovieService Class |
| OFFLOADR.CPP | Database Offloader Functions |
| PCKGSRVC.CPP | The PackageService Class |
| PLYRCNFG.CPP | The PlayerConfiguration Class |
| SET.CPP | The Set Class (to support the_Set table) |
| SLSSRVCE.CPP | The SalesService Base Class |
| VCPMSSGE.CPP | The VCP_Message Class (see MESSAGES.LIB for details) |
| VDNNNCMN.CPP | The VideoAnnouncement Class |
| VDSRVCCL.CPP | The VideoService Class |

Figure 20:
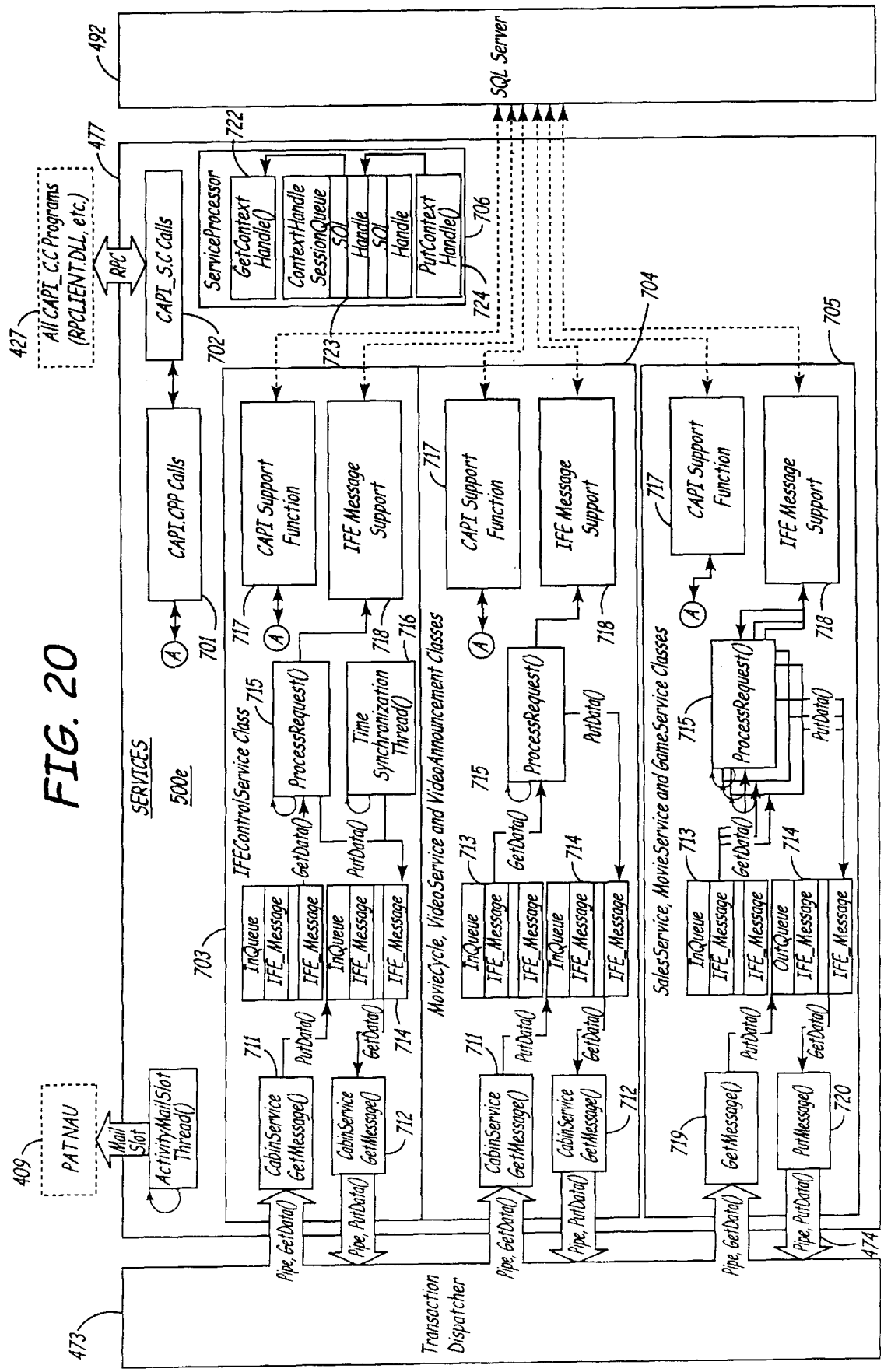
FIG. 20 illustrates the services function and data paths.

The services NAU program 477 function and data paths are shown in FIG. 20. Located in SRVCPRCS.CPP file, the main(Δ) program is responsible for launching each of the services. Once launched, they are each connected to the named pipes 474 that communicate with the transaction dispatcher 473.

The services include CAPI.CPP calls 701 that access CAPI_S.C. calls 702 that access CAPI_C.C programs 427. The services include an IFEControlService Class 703, MovieCycle, VideoService and VideoAnnouncement classes 704, and SalesService, MovieService and GameService classes 705. The Services NAU program 477 includes a ServiceProcessor 706 that employs a GetContextHandle (Δ) 722 a ContextHandleSessionQueue 723, and a PutContextHandle(Δ) 724.

The IFEControlService class 703 employs a CabinService::Get Message(Δ) thread 711 and a CabinService::Put Message(Δ) thread 712 that are coupled to the transaction dispatcher 473 by way of name pipes 474. The CabinService::Get Message(Δ) thread 711 is routed to an InQueue 713 to a ProcessRequest(Δ) 715 which accesses IFE message support functions 718. The ProcessRequest(Δ) 715 is coupled by way of an OutQueue 714 to a CabinService::Put Message(Δ) thread 712 which is coupled to the transaction dispatcher 473 by way of the name pipe 474. A TimeSynchronizationThread(Δ) 716 is also routed through the OutQueue 714 and CabinService::Put Message(Δ) thread 712. CAPI support functions 171 are routed to the CAPI.CPP calls 701 and to the SQL server 492. The IFE message support functions 718 access the SQL server 492.

The MovieCycle, VideoService and VideoAnnouncement Classes 704 employs a CabinService::Get Message(Δ) thread 711 and a CabinService::Put Message(Δ) thread 712 that are coupled to the transaction dispatcher 473 by way of name pipes 474. The CabinService::Get Message(Δ) thread 711 is routed to an InQueue 713 to a Process Request(*) 715 which accesses IFE message support functions 718. The ProcessRequest(Δ) 715 is coupled by way of an OutQueue 714 to a CabinService::Put Message(Δ) thread 712 which is coupled to the transaction dispatcher 473 by way of the name pipe 474. CAPI support functions 717 are routed to the CAPI.CPP calls 701 and to the SQL server 492. The IFE message support functions 718 access the SQL server 492.

The SalesService, MovieService and GameService Classes 705 employs GetMessage(Δ) and PutMessage(Δ) threads 719, 720 that interface to the transaction dispatcher 473 by way of name pipes 474. The GetMessage(Δ) thread 719 is routed by way of an InQueue 713 to a ProcessRequest (Δ) 715 which accesses IFE message support functions 718. ProcessRequest(Δ) 715 are routed by way of an OutQueue 714 to the PutMessage(Δ) thread 720 which is coupled to the transaction dispatcher 473 by way of the name pipe 474. CAPI support function 717 are routed to the CAPI.CPP calls 701 and to the SQL server 492. The IFE message support functions 718 access the SQL server 492.

The main(Δ) program establishes a logon to the SQL Server 492 for database access using the standard SQL library commands in NTWDBLIB.LIB library. The main(Δ) program establishes ten SQL sessions such as context handles to be used by the services to talk to the database 493. The main(Δ) program establishes multiple handles to the database 493 for all the services and CAPI functions to use, then starts pipe threads and process threads for each service to run independently.

The main(Δ) program establishes itself as an RPC server to communicate with the PAT GUI 426 and any other RPC clients with the NT RPC utilities. Any program that has CAPI_C.C linked into it is an RPC client in the system 100. The main(Δ) program registers itself with the system monitor 454 for subsequent shutdown support with SystemMonitor::Register(Δ). The main(Δ) program issues a call to ServiceProcessor:: StartActivityMailSlotThread(Δ) to hook up to the primary access terminal NAU's GUI monitor process, periodically sending it a message to let it know that Service 477 is alive and well. Finally, the main(Δ) program waits forever listening to the RPC server that it set up (via RpcServerListen(Δ)) until system monitor's Shutdown(Δ) kills the process.

The ServiceProcessor 706 class is used by main(Δ) and the services to control the access to the database 493 using the finite number of context handles available. This program has more service SQL functions than context handles. It is conceivable that as many as 25 SQL requests may be present at one time (ten games, ten movies, one CAPI, one IFE Control, one Movie Cycle, one Video Service and one Video Announcement). Therefore, this code provides for optimum processing efficiency by queueing up the available context handles and issuing them on a first-come first served basis. The ServiceProcessor class functions are described in the table below.

| ServiceProcessor Public Functions | Purpose |
| --- | --- |
| CONTEXTHANDLESTRUCT * GetContextHandle() | Returns the handle to the next available context structure for access to the database. |
| int GetContextHandleCount() | Returns the number of available Context Handles. |
| HANDLE GetContextHandleSemaphore() | Returns the semaphore for the context handle Queue. |
| DWORD GetLastError( PCONTEXT_HANDLE_TYPE phContext) | Retrieves the error code associated with the specified context handle (phContext) that was most recently set by the SetLastError() member function. |
| Void PutContextDB(int dContextLocation, DBPROCESS*pDBProc) | Adds the DPROCESS handle to the context handle structure. |
| Void PutContextHandle(CONTEXTHANDLESTRUCT* pContextHandle) | Replaces the context structure into the context structure queue. Service Classes use this one. |
| void PutContextHandle( int dContextLocation) | Adds the context structure to the context structure queue. The main() program uses this one to initialize the queue. |
| void SetLastError( PCONTEXT_HANDLE_TYPE phContext, DWORD dwErrorCode) | Associates the error code in dwErrorCord with the context handle pointer (phContext) storing them in the LastErrorMap structure. Values are retrieved from the structure via the GetLastError() member. This makes the errors available to all RPC Clients outside the Services. |
| bool StartActivityMailSlotThread() | Starts the Mail Slot Thread used for transmitting an "I'm alive" signal to the PAT NAU GuiMonitor. Returns FALSE if fails to start the thread. |

The Service Class

Based on the DBAccess class, the service class is a template for all the services 477 to follow for proper operation. Therefore, all its functions are virtual and are defined in its children classes as shown below.

| Service Class Virtual Functions | Purpose |
| --- | --- |
| virtual bool ConnectTo TD() | Abstract definition to interface supports Service-to-TD named pipe connections. |
| virtual void GenerateReport( ReportType nReport) | Abstract definition to define the interface to launch a report. |
| virtual void GetMessage() | Abstract definition to receive data into the Service. |
| virtual PolicyType GetPolicy() | Abstract definition to retrieve the access policy for the Service. |
| virtual bool IsAvailable() | Abstract definition that defines an interface to evaluate whether a Service is available and ready to process requests or commands. |
| virtual void MakeAvailable( SERVICESTATE ServiceAction) | Abstract definition that defines an interface to make a Service available. |

-continued

| Service Class Virtual Functions | Purpose |
| --- | --- |
| virtual void ProcessRequest() | Abstract definition for an interface that handles IFE_Messages for the Service. In addition to specific messages designed for each Service, all ProcessRequest() functions should handle the SubProcessStart, SubProcessStop and SubProcessReinit messages to get themselves going and synchronized as needed by the rest of the system. |
| virtual void PutMessage() | Abstract definition to send data out of the Service to TD and beyond. |

Cabin Services

Cabin services control all the functions of in-flight service except those in which individual passengers 117 are involved. Cabin services are divided into the following services: the IFE control service 703 and the movie cycle service, video service and video announcement service 704. In addition to its overcast versions of the service class functions, CabinServiceClass includes:

| CabinServiceClass Public Functions | Purpose |
| --- | --- |
| TIME GetRemainingFlightTime (PCONTEXT_HANDLE_TYPE phContext) | Retrieves the remaining flight time using the CalcRemainingFlightTime stored procedure. |
| bool RegisterPipe (HANDLE hPipeHandle) | Registers this named pipe with the Transaction Dispatcher to make I/O possible. |
| bool SetStatus (STATUS_TYPE nStatusType, char *pszData) | Transfers the data contained in pszData into the status message field identified by nStatusType. |
| bool StartPipeThreads (ServiceProcessor *pServiceProcessor) | Called by main() to get a pair of named pipes to TD for this Service. |
| bool StartProcessThreads (ServiceProcessor *pServiceProcessor) | Called by main() to get the child's ProcessRequest() loop going by invoking ProcessRequestInterface(). |
| static UINT GetMessageThreadInterface (LPVOID lpParam) | Shared by all the CabinServiceClass children, this launches the child's GetMessage() function to handle its input from TD. |
| static UINT ProcessRequestInterface (LPVOID lpParam) | Shared by all the CabinServiceClass children, this launches the local ProcessRequest() function that loops forever handling the messages that it receives. |
| static UINT PutMessageThreadInterface (LPVOID lpParam) | Shared by all the CabinServiceClass children, this launches the child's PutMessage() function to handle its output to TD. |
| void Wait( DWORD dwSeconds | Initiates a delay for the number of seconds specified by the input parameter dwSeconds. |

IFEControlService

The IFEControlService class 703 is derived from the CabinService class and contains several additional sets of functions that are used sporadically throughout the flight including:

| Function Set | Tables Used |
| --- | --- |
| IFE State Changes Flight Duration Mgmt | Aircraft, Order_ |
| Statistics | Member, PassengerMap, PassengerStatistics, Set_ |

-continued

| Function Set | Tables Used |
| --- | --- |
| Surveys | SurveyAnswer |
| Seat Transfers | |
| Database Backup | All Database Tables |

CAPI support 717 for the IFEControlService 703 includes the following public functions accessed by CAPI.CPP calls 701 (having the same name):

In addition to the standard messages, this class handles the Statistics, Survey, SeatFault, FlightInfoRequest and DatabaseBackup messages listed in the table below.

| IFEControlService Class Public Functions | Purpose |
| --- | --- |
| bool CommandSeat (PCONTEXT_HANDLE_TYPE phContext, SEAT_COMMAND nCommand, PGENERIC_TEXT pszSeatName) | Formats an IFE Message as specified by nCommand and transmits the message to the seat specified by pszSeatName. |
| bool SeatTransferInit (PGENERIC_TEXT pszSeat1, PGENERIC_TEXT pszSeat2) | Due to a CAPI call, Formats and sends an IFE_Message to the Seat NAU, which is where the actual transfer takes place. The data in the message reflects the two seats that are to be transferred. |
| void SendStatusMessage (PCONTEXT_HANDLE_TYPE phContext) | Formats and transmits an unsolicited Status Window Message to the GUI. |
| bool SetIFEState (PCONTEXT_HANDLE_TYPE phContext, IFESTATE IFEStateValue) | Calls the local SetState() to update the system state information. IFE State is a term that describes whether the IFE System is IDLE, STARTED, PAUSED, and more. This allows CAPI to alter these states to either free up services or disable them as appropriate for the current runtime state of the system. For example, when the system is IDLE or PAUSED, movies cannot be viewed which affects the Movie Cycle Service as well as the Movie Rental Service. |
| void SetRemainingFlightDuration (PCONTEXT_HANDLE_TYPE phContext) | Called to refresh the value contained in the tmRemainingFlightDuration that is defined statically in the CabinService class. This function is called periodically from the IFEControlService::TimeSynchronizationThread() thread to update the value as the flight progresses, and directly from the CAPI when a change to the flight duration occurs. |

In addition to the CAPI support functions 717, IFE message support service 718 also handles incombing IFE Messages using its overcast ProcessRequest(Δ) thread 715.

| IFE Message | Function Called | Purpose | Tables Affected |
| --- | --- | --- | --- |
| DatabaseBackup | ProcessDatabaseBackup() | Generates a backup of the entire CFS database to recover after a possible CFS hard disk failure | All database tables |
| FlightInfoRequest | ProcessFlightInfo() | Gathers flight information from the CFS database and uses the information to populate an IFE_Message. The IFE_Message is then returned to the reguesting program | Aircraft FlightV |
| SeatFault | ProcessSeatFault() | Updates the database, clearing or setting a fault indication for the seat or range of seats in the IFE message | PassengerMap |
| Statistics | ProcessStatistics() | Stores statistical information from the seats to the database and prepares them for output to a text file. | Member Set_ PassengerMap PassengerStatistics |

-continued

| IFE Message | Function Called | Purpose | Tables Affected |
|---|---|---|---|
| | | Statistics include information such as how many hours of which movie was viewed which games were played and more. | |
| SubProcessStart | InitService() | Establish IFE State and tell it to all affected programs via IFE Messages. Calls StartTimeSynchronizationThread() to launch TimeSynchronizationThread() | Aircraft |
| Survey | ProcessSurvey() | Stores the answers given by passengers to survey questions available through the IFE system. These answers are stored in the database, as well as prepared for output to a text file | Survey SurveyAnswer SurveyAnswerKey SurveyQuestion |

The TimeSynchronizationThread(Δ) thread 716 in the IFEControlService class 703 is responsible for managing flight duration information, which changes all the time. It uses SetRemainingFlightDuration(Δ) to update values, and calls AutoEndRevenue(Δ) to send a Stop Revenue Unsolicited Message to the GUI 426 once there is no time for further revenue purchases.

The PlayerConfiguration class supports any service that uses video players, such as the Movie Cycle, VideoAnnouncement and VideoServices 704. The PlayerConfiguration class contains all pertinent information necessary to describe information specific to a movie cycle or video announcement. The PlayerConfiguration class also contains the methods needed to issue all appropriate messages to start a specific movie cycle or video announcement.

Throughout the in-flight operation, one or more movies continuously play, all starting together as a set, providing maximum viewing possibilities for the passengers 117. This is known as movie cycling. The movie cycle service 479 controls the synchronization of these cycles. Derived from the CabinService class, MovieCycleClass is responsible for keeping track of the remaining time of the flight, as well as the longest movie duration. It starts a cycle, stops a cycle, pauses a cycle, and recovers a cycle. The following database tables are used to support the MovieCycle Class: Member, MovieCycle, Set_, VideoMedium, VideoPlayer, VideoSegment, and VideoUse.

The following table shows the CAPISupport functions 717 that are used by CAPI.CPP calls 701:

| MovieCycle Class Public Functions | Purpose |
|---|---|
| bool AddPlayerToMovieCycle (PCONTEXT_HANDLE_TYPE phContext, PGENERIC_TEXT MovieCycleName, PGENERIC_TEXT PlayerName) | Adds a player to a movie cycle. |
| bool ChangeMovieCycleIntermissionTime (PCONTEXTLHANDLE_TYPE phContext, PGENERIC_TEXT MovieCycleName, TIME Intermission) | Modifies the movie cycle intermission time. |
| bool ChangeMovieCycleStartTime (PCONTEXT_HANDLE_TYPE phContext, PGENERIC_TEXT MovieCycleName, TIME StartDelay) | Update the start delay time for the PlayerConfiguration object specified by MovieCycleName. Updates the start delay locally: The value is written to the database as part of the StartMovieCycle processing. |
| APIResult GetFirstMovieCycleTime (PCONTEXT_HANDLE_TYPE phContext; PGENERIC_TEXT pszMovieCycleName, TIME *tmMinUntilStart) | Calculates the number of minutes until each of the remaining movie cycles starts. Returns the first start time in tmMinUntilStart. The return value is APIOK if there are 2 or more entries in the list and APIEndOfList if there is only 1 entry in the list. |
| bool GetMovieConfigurationState (PCONTEXT_HANDLE_TYPE phContext, PGENERIC_TEXT pszMovieCycleName) | Returns TRUE if the movie cycle specified by pszMovieCycleName is running. |

-continued

| MovieCycle Class Public Functions | Purpose |
| --- | --- |
| bool GetMovieCycleDuration (PCONTEXT_HANDLE_TYPE phContext, PGENERIC_TEXT pszMovieCycleName, TIME *tmDuration) | Returns the duration, in minutes, of the Movie Cycle specified by pszMovieCycleName. A return value of TRUE indicates that the specified movie cycle was found and the time is valid. |
| APIResult GetNextMovieCycleTime (PCONTEXT HANDLE_TYPE phContext, TIME *tmMinUntilStart) | After GetFirstMovieCycleTime() has been called to calculate movie cycle times and return the first one, this can be called iteratively to retrieve the remaining movie cycle start times. Returns APIEndOfList for the last entry in the list. Returns APIOK for all other entries. |
| bool RemovePlayerFromMovieCycle (PCONTEXT_HANDLE_TYPE phContext, PGENERIC_TEXT MovieCycleName, PGENERIC_TEXT PlayerName) | Removes the PlayerName player from the movie cycle MovieCycleName. |
| bool ReplaceMovieCyclePlayer (PCONTEXT_HANDLE_TYPE phContext, PGENERIC_TEXT pszMovieCycleName, PGENERIC_TEXT pszPlayerToRemove, PGENERIC_TEXT pszPlayerToAdd) | Swaps players (usually because of a hardware failure, and movies must be moved to new devices). |
| bool SetMovieCycleUpdateRate (PCONTEXT_HANDLE_TYPE phContext, long 1Seconds) | Sets the movie cycle update rate. The movie cycle update rate is the rate at which the system transmits movie cycle update information to the seats in seconds. |
| bool StartMovieCycle (PCONTEXT_HANDLE_TYPE phContext, PGENERIC_TEXT MovieCycleName, TIME tmStartTime) | Starts the specified MovieCycleName at the given tmStartTime. |
| bool StopMovieCycle (PCONTEXT_HANDLE_TYPE phContext, PGENERIC_TEXT MovieCycleName) | Stops the specified Movie Cycle. |
| void UpdateSystemState (PCONTEXT_HANDLE_TYPE phContext) | Notifies MovieCycleService that a change to the system state has occurred. The Service retrieves the system state from the database and updates the state of the active cycle(s) accordingly |

The IFE message support service 718 handles incoming IFE messages using its overcast ProcessRequest(Δ) thread 715. In addition to the standard IFE messages, this class handles the following messages: MovieTimes and MovieCycle.

| IFE Message | Function Called | Purpose |
| --- | --- | --- |
| MovieCycle | StopMovieCycle() or StartMovieCycle() | Starts or Stops the movie cycle as needed. |
| MovieTimes | UpdateMovieTimes() | Updates the duration of the movies that are playing or scheduled to play. |
| SubProcessStart | InitService() | Creates a PlayerConfiguration object, determines what the players are doing using UpdateSystemState() |

SalesServices

SalesServices, part of 705 in FIG. 20, control all the functions of in-flight service in which goods or entertainment are made available to passengers 117. Sales services 482–486 are divided into the following services: GamesService 482, MovieSaleService 483, CatalogService 484, DutyFreeService 486, and DrinkService 485.

The design structure of the sales service classes are similar to the cabin service classes, except that sales services 482–486 launch many more ProcessRequest(Δ) 715 threads to be able to service as many passengers 117 as possible. This is not necessary for the cabin services because they do not service individual passengers 117; they service the system as a whole. In addition to its overcast versions of the service class virtual functions, SalesService class includes its own virtual definitions within its children classes. This keeps the CAPI consistent in its calls. The SalesService functions are listed below.

| SalesService Virtual Function | Purpose |
|---|---|
| Virtual bool CancelOrder (ID OrderID) | Abstract to cancel an open order. |
| Virtual ID CreateOrder (unsigned char *ProductCode, long Quantity, LRU_NAME Seat, unsigned char *EmployeeNumber, long lProductMap, MONEY AmountDue) | Abstract to Create an order. |
| Virtual bool DeliverOrder (ID OrderID, GENERIC_TEXT EmployeeNumber) | Abstract to schedule an Order for Delivery. |
| Virtual bool PayForOrder (ID OrderID, MONEY AmountCash, MONEY AmountCredit, GENERIC_TEXT CurrencyCode, GENERIC_TEXT EmployeeNumber, GENERIC_TEXT AccountNumber, GENERIC_TEXT ExpirationDate, GENERIC_TEXT CardName, CREDITCARDS CardType) | Abstract to record the payment for an order. |
| Virtual bool RefundOrder (ID OrderID, GENERIC_TEXT EmployeeNumber, bool RevokeProduct) | Abstract to Refund an order. |
| Virtual bool StartPipeThreads( ) | Abstract to start the I/O with Transaction Dispatcher. |
| Virtual bool StartUpProcessThreads( ) | Abstract to start ProcessRequest( ) threads. |

SalesService also provides several 'generic' sales functions, as shown in the sub-sections that follow.

In the sales services 482–486, all CAPI calls cause an update message to be built and sent to the applicable seat 123, so that it knows the status of its sales. The following functions are called by CAPI support function 717.

| SalesServiceClass Public Functions | Purpose |
|---|---|
| bool BackOrderOut(CONTEXTHANDLESTRUCT *pContextHandle, ID OrderID) | Removes the any OrderId records from the database. |
| bool CloseSalesStore(ID StoreID) | Sets the status of the store to Closed. |
| SERVICESTATUSTYPE IsValidCreditCard(char *CardNumber, char *ExpirationDate, double CreditAmount, CONTEXTHANDLESTRUCT ContextHandle) | Verifies the type of card, expiration date and checksum according to the policy of this card type. |
| bool OpenSalesStore(ID StoreID) | Sets the status of the store to Open. |

The following functions are provided to support the IFE messages support service 718 for all sales:

| IFE Message | SalesService Function | Purpose |
|---|---|---|
| BackOut | bool BackOrderOut( CONTEXTHANDLESTRUCT *pContextHandle, ID OrderID) | Removes the order from the database. This is usually due to an error during processing, rather than a customer request. |
| Cancel | bool PrepareCancel( CONTEXTHANDLESTRUCT *pContextHandle, Seat_Message *pSeatMessage) | Cancels an open order upon customer request. |
| CompleteUpdate | void ProcessUpdateRequest( Seat_Message *pMsg, IfeIdType nProcessID, Queue *pTransmitQueue) | Collects revenue and movie or game lock information for a specified seat and returns the data to the SeatNAU. |
| Delivery | bool PrepareDelivery( CONTEXTHANDLESTRUCT *pContextHandle, Seat_Message *pSeatMessage) | Prepares an order for delivery. |
| IncrementalUpdate | void ProcessUpdateRequest( ) | See CompleteUpdate message above. |
| Payment | bool PreparePayment( CONTEXTHANDLESTRUCT *pContextHandle, Seat_Message *pSeatMessage, ID *OrderID) | Applies the provided payment information to the specified order. |
| Refund | bool PrepareRefund( CONTEXTHANDLESTRUCT *pContextHandle, Seat_Message *pSeatMessage | Processes a refund request to return payment(s) to a customer and update inventory (if needed). |

Movie viewing is a highly variable feature of the system. At the discretion of the airline, and subject to change from time to time, different video offerings are free to certain classes of passengers 117, while others are chargeable. The movies sales service 483 controls this feature. The following database 493 tables support the feature: Policy, Price, VideoMedium, VideoSegment, and VideoUse. Derived from SalesService class, the MovieServiceClass, part of 705 in FIG. 20, provides the functions needed to process the sales of movies onboard. Like CabinService class, it provides its own ProcessRequest(Δ) 715, Get Message (Δ) 719, PutMessage (Δ)720, etc. functions. The following overcast functions are called by their corresponding CAPI calls: CancelOrder(Δ), CreateOrder(Δ), DeliverOrder(Δ), PayForOrder(Δ), and RefundOrder(Δ). In addition to the CAPI support functions 717, this service also handles incoming IFE messages using its overcast ProcessRequest (Δ) thread 715.

Video games are available for passengers to enjoy. To play them, a request must be made and often a payment is required. The games rental service control this capability. The following database 493 tables support the feature: GameDetail, Policy, and Price. Derived from SalesService class, the GameServiceClass, part of 705 in FIG. 20, provides the functions needed to process the sales of games onboard. Like CabinService class, it provides its own ProcessRequest(Δ) 715, GetMessage(Δ) 719, PutMessage (Δ) 720, etc. functions. The following overcast functions are called by their corresponding CAPI calls; CancelOrder(Δ), CreateOrder(Δ), DeliverOrder(Δ), PayForOrder(Δ), and RefundOrder(Δ). In addition to the CAPI support functions 717, the games rental service also handles incoming IFE Message using its overcast ProcessRequest(Δ) thread 715.

Package entertainment is a hybrid of games and movies sales and is maintained within the MovieSales class. It involves a one-time purchase to all entertainment services onboard. The package entertainment functions may be used to control this capability, but currently the SEAT NAU and CAPI.CPP calls route package products to either the game service or the movie service, based on the product code that is used. The PackageDetail table in the database 493 is used to identify the components of a package.

Purchasing goods through an electronic catalog is an enhancement provided by the system 100. All functions that control it are kept in the catalog service. The following database tables support the feature: Address, Order, and Shipping Rate.

Ordering drinks through the in-flight entertainment system 100 is provided. All functions that control it are kept in the drinks service. The Product table in the database 493 supports this feature.

Purchasing onboard duty-free goods through the in-fight entertainment system 100 is provided. All functions that control it are kept in the duty free service. The following database 493 tables support the feature: Cart, CartInventory, Commitment, and InventoryLog.

All the application-level database functions are directly accessible via calls to the CAPI functions. These calls are available directly, or via the RPC server. Thus, any service as well as any RPC client can access the CAPI calls.

CAPI.CPP 701 contains the actual commands that interface to the database 493 and perform the application duties (such as CreateOrder(Δ), GetOrder(Δ), etc.). CAPI_S.C 702 is the RPC server whose functions are made available to RPC clients (via CAPI_C.C). The server functions use the CAPI.CPP calls to perform application duties. They are used together to make up this set of routines. In addition, the PAT GUI 426 can also access CAPI.CPP via APIINT.CPP an CAPI_S.C in the RPCCLNT.DLL.

Database Schema

The cabin file server database 493 stores information utilized by both the cabin file server applications and the PAT GUI 426. The cabin file server database 493 stores information about the other line replaceable units in the IFE system 100, the products and services available to the passengers 117, revenue due to the sales of products and services, system usage due to the flight attendants and passengers 117, surveys offered to passengers 117, the state of the cabin file server application, video announcements, and global attributes of the IFE system 100. The structure (i.e., tables, views, triggers, relationships, etc.) of the cabin file server database 493 is maintained using a Microsoft Access® Relationships tool. Several of the tables in the database 493 are mentioned above in conjunction with the services that access them. Additional tables are described below.

The cabin file server database 493 provides storage for line replaceable unit information. This enables the cabin file server application to communicate with and/or control these other devices. The two data files that are generated by the aircraft configuration tool provide some line replaceable unit information. Line replaceable unit information is stored in the database 493 in the following tables: LRU, Member, PA_Volume, PassengerMap, Set_, and Video Player.

All purchased goods and services, purchase summary information, complimentary service assignments, and movie lockout information is stored on a per passenger basis. This information may be swapped from one seat 123 to another seat to accommodate the occasion when a passenger 117 must be moved during a flight. Each passenger 117 is represented in a PassengerMap table by a single record in the database. This record contains pertinent information on a passenger seat number, SeatNumber, and a passenger identifier, PassengerID. When a passenger 117 changes seats, the SeatNumber fields of the two records involved are swapped. Thus, all the information associated with the passenger 117 is not with the seat 123, but with their PassengerID.

The viewing of any movie and/or the playing of any game can be locked out at any seat, usually at the request of a parent to prevent a child from seeing a certain movie or excessive game play. Each passenger 117 is represented in the PassengerMap table by a single record. This record contains information on passenger seat number (SeatNumber), MovieLockoutMap, and GameLockout Map. The MovieLockoutMap and GameLockMap fields are bit map fields whose bits correspond to individual movie and game titles, respectively. A movie or game is locked out when its corresponding bit in this field is set to one.

The cabin file server database 493 provides storage for product and service information (e.g., movie titles, viewing times, movie audio languages, game titles, audio entertainment titles, audio channels, etc.). This information is sent by the cabin file server application to the seat display unit 133 for each flight. This enables up-to-date information to be presented to the passengers 117 so they can know which products and services are available to them and at what cost on a per flight basis. Product and Service information is stored in the following tables: AudioDetail, Cart, CartInventory, GameDetail, IFE_Service, InventoryLog, MovieCycle, MovieCycleDetail, PackageDetail, Price, Product, ProductEffectivity, Route, ShippingRate, Store, VideoMedium, VideoPlayer, VideoSegment, and VideoUse.

Video game information is maintained in the GameDetail table one record per Title/Effectivity Date combination. In the table Title is the Game Title that is displayed on the seat display unit 133. EffectivityDate is the date on or after which this game information is effective. RouteType is the flight route type during which this game is available. ProductCode corresponds to a product code in the Price table for price lookups.

Prices are controlled via fields in the Price table, one per ProductCode/RouteType combination. The fields include FreeMap that identifies which zones (identification in a bitmap) offer this product free of charge and pricing information by zone in the aircraft by flight route such as Pricing1 for zone 1.

Video game information is maintained in the Video Medium table, one record per video program, and one record per MediaTitle. In the table MediaTable is the Game Title that is displayed on the seat display unit 133 and Product-Code corresponds to a product code in the Price table for price lookups.

The IFE system 100 can inhibit the selectability of the video programs based on the date stored in the Effectivity-Date of the Video Segment table. Movie titles are associated with a specific flight route through the RouteType field of the VideoUse table.

The database tables used in movie cycle are the following: Member, MovieCycle, Set_, VideoMedium, VideoPlayer, VideoSegment, and VideoUse. Video sources as video cassette player 227 or video reproducers (VR) 227 are assigned to a movie cycle through the Member and Set_tables. Each VCP or VR 227 is stored in the Member field of the Member table. Each movie cycle is stored in the SetName field of the Set_table. A movie cycle type is a predefined grouping of video reproducers 227 and movie titles. Movie titles are assigned to video reproducers 227 through the VideoMedium and VideoUse tables. The database 493 can store up to eight different movie cycle types. Information about each movie cycle type is stored in the MovieCycle table. A movie cycle can include from one to fifteen video reproducers 227 (i.e., one to fifteen records of the Member table can be associated with a single movie cycle in the Set_table).

The start time for a movie cycle is stored in the RelativeStartTime field of the MovieCycle table. It is stored in minutes relative to the time since movie cycle initiation at the primary access terminal 225. A between-cycle intermission time is stored in the IntermissionLength field of the MovieCycle table. It is stored in minutes and must exceed the time required to prepare the video reproducer 227 containing the longest playing tape for the next cycle (e.g., tape rewind).

The end time of a movie cycle is the time in which the final viewing of a particular movie cycle ends. The number of viewings that can be scheduled for each movie cycle depends upon the length of a single viewing of the movie cycle and the flight duration. The length of a single viewing of the specific movie cycle can be calculated by adding the IntermissionLength field of the MovieCycle table to the SegmentRunTime field of the VideoSegment table for the movie with the longest run time in the specific movie cycle. The expected flight duration is stored in the FlightDuration field of the Flight table.

The number of minutes before the start of each cycle can be calculated using the RelativeStartTime field of the MovieCycle table, the calculated length of the single viewing of the movie cycle, and the IntermissionLength field of the MovieCycle table. The number of minutes before intermission for the current cycle is stored in the RemainingViewingTime of the MovieCycle table.

The number of minutes until the next viewing of a specific movie cycle is stored in the NextViewingTime of the MovieCycle table. The number of minutes remaining on the current viewing of the specific movie cycle is stored in the RemainingViewingTime of the MovieCycle table. The number of minutes elapsed into the current viewing of the specific movie cycle is stored in the ElapsedViewingTime of the MovieCycle table.

Audio programming (entertainment) can be distributed on a maximum of 83 mono audio channels, controlled by the AudioDetail table, one record per program. The title of each audio program is stored in the AudioTitle field. The channel of each Audio program is stored in the AudioChannel field.

The VideoMedium table stores up to four different languages for a particular video tape (e.g., movies). These languages are displayed on the display screen 122 for passenger selection. The languages are stored in the LanguageCode1, LanguageCode2, LanguageCode3, and LanguageCode4 fields of the VideoMedium table. Each video tape must have one language designated as the default primary language (i.e., LanguageCode1 must not be empty) but it can have up to three other languages. The relationship of the output configuration of the video players and available language configuration is stored in the VideoPlayer table.

Information about the state of a particular video reproducer 227 is stored in the State field of the VideoPlayer table. This information includes whether or not the video reproducer 227 is operational, whether or not the video reproducer 227 contains a tape, etc. In order to "preview" the output of a particular video player on the primary access terminal screen, both primary access terminal tuners (audio and video) must be tuned to the proper channels. Video channel information for each video reproducer 227 is stored in the VideoRF_Channel field. Audio time-slot information is stored in the various time slot fields (i.e., LeftTimeSlot1, RightTimeSlot1, LeftTimeSlot2, etc.).

a video reproducer 227 can be reassigned for use during a video announcement. The MediaType field in the VideoMedium table distinguishes a video announcement from a movie. The VideoUse table tracks which movie or video announcement is assigned to which video reproducer 227. When a video reproducer 227 is assigned, the PlayerName field, in the VideoUse table is modified. The playing status of each video reproducer 227 is stored in the State field of the VideoPlayer table.

The cabin file server database 493 provides storage for revenue information (e.g., credit card data, cash collection data, etc.) concerning the sales of products (e.g., duty free) and services (e.g., movies and games). When a passenger 117 uses a credit card to pay for movies or games, this information must be stored in the database so that it can be transferred to the credit card company. Likewise, when a passenger 117 uses cash to pay for movies or games, this information must be stored in the database 493 so that the IFE system 100 has a record of how much cash should be collected by the flight attendant. Revenue information is stored in the following tables: Address, BadCreditCards, Commitment, CreditCard, Currency_, Exchange, Flight, Order_, OrderHistory, PassengerMap, PAT_History, Policy, Price, Product, ProductEffectivity, ShippingRate, and ValidCardData.

The purpose of transcription processing is to maintain a record of monetary transactions for service and products. When a flight attendant is involved with an order placed by a passenger 117 (e.g., order refunded, order placed at the PAT, etc.), then the flight attendant ID is stored in the FlightAttendant field of the Order_table.

Information about each product and service is stored in the Product table. Information about each package of goods or services is stored in the PackageDetail table. The pricing information for each product, service, and package is stored in the Price table. Prices can be altered according to the policy stored in the PolicyDescription field of the Policy table. For example, the policy may specify different service price data for movies and games offered in each seat class zone (e.g., first class) in the aircraft 111.

Services and products may be paid by cash, credit card, or a combination of the two. Cash and credit card payments are respectively stored in the CashTotal and CreditTotal fields of the Order_table. Orders are comprised of sets of products or services of the same type. If the passenger 117 uses a credit card, the credit card information (e.g., passenger name, account number, etc.) is stored in the CreditCard table.

Cash transactions may be represented in put to 30 different currency types. Information about each currency type is stored in the Currency_table. Each aircraft 111 has associated with it a base currency that is stored in the BaseCurrencyCode field of the Aircraft table.

Passengers 117 may pay for products and services using any single card from the credit card types accepted by the airline. Information about each valid credit card type is stored in the ValidCardData table. The credit card payment made on a given order is stored in the CreditTotal field of the Order_table. The payment is recorded in the base currency type as specified in the BaseCurrencyCode field of the Aircraft table.

Credit card numbers are validated against the standard number format and range for that particular credit card type. This standard number format is stored in the ValidationPattern field of the ValidCardData table. In addition, credit card transactions are validated against the credit limit specified by the passenger 117 for that particular credit cart type. This credit limit is stored in the CreditLimit field of the ValidCardData table. In addition, each credit card is compared against the credit card numbers in the BadCreditCards table. This table may contain up to 10,000 records, for example.

All transactions (i.e., service orders, product orders) processed by the system are stored in the Order_table. The state of an order (open, paid, canceled, refunded) is stored in the State field of the Order_table. For refunded orders, a duplicate order record is created with the AmountDue field, the CashTotal field, the CreditTotal field, and the Quantity field all set to negative amounts. Orders that are placed at the primary access terminal 225 also have a corresponding entry in the PAT_History table. A new record is generated for the OrderHistory table for each change to the State field or the Delivered field. The following information is maintained for each order:

| Table | Field | Description |
|---|---|---|
| PassengerMap | SeatNumber | seat number |
| Product | ProductDescription | service or product ordered |
| Order_ | Quantity | quantity of service or product ordered |
| CreditCard | all fields | credit card information for credit card orders |
| Price | UnitPrice | unit cost of service or product ordered |
| Order_ | AmountDue | total cost of service or product ordered |

Prior to shutdown of the IFE system 100, a message is displayed on the primary access terminal 225 if the database 493 contains any open transactions from the current flight. The number of open orders for the current flight is always displayed in the status window on the primary access terminal 225. This is calculated by counting each order in the Order_table (for the current flight) whose associated State field is set to "Open".

A running tabulation of all expenses incurred for each passenger during the current flight can be displayed on the seat display unit 133 or seat display 122. Each order is associated with a specific passenger 117 via the PassengerID field of the Order_table. The total cost of each order is stored in the AmountDue field of the Order_table. Total expenses incurred for a particular passenger 117 is the sum of the total cost of each order placed by the specific passenger 117.

The following subsections describe selected database interactions that occur when the corresponding functions in the SalesServiceClass classes are executed.

Upon cancellation of any cash passenger product and/or service order that has not been paid, the State field of the Order_table is changed from "Open" to "Cancelled". If the service (i.e., video game or movie) is revoked from the passenger 117, then the ProductRevoked field in the Order_table is set to TRUE.

A list of orders can be generated for which cash collection is to be made in-flight. Information related to each order is stored in a PassengerMap table where SeatNumber is stored, a Product table where ProductDescription is stored, and an Order_table where AmountDue is stored.

Orders can be listed by service type and/or by general service zone. The service type of an order (i.e., game, movie, and package) is stored in the ServiceType field of the Product table. The general service zone of the passenger 117 that placed the order is stored in the SetName field of the Set_table. A list of orders can be generated for which delivery is to be made in-flight. In formation related to each order is as indicated above. Orders can be listed by service type and/or by general service zone.

Complimentary service for movies, games, and/or entertainment packages may be offered to individual passengers or to the entire aircraft 111. For individual passengers, an order is placed in the Order_table for each passenger 117 receiving a service that is complimentary, the PayCurrencyCode field is set to "Free" and the State field is set to "Paid". The order is then associated with the record in the PassengerMap table where the SeatNumber corresponds to the specific passenger 117.

To provide complimentary service for the entire aircraft 111, all entertainment (movies, games, and packages) must be complimentary. A single order is placed in the Order_Tables: The PayCurrencyCode Field is set to "Free" and the State field is set to "Paid". The order is then associated with the record in the PassengerMap table where the SeatNumber field is set to "Allseats". The FreeServiceMode field of the Aircraft table is set to TRUE.

SDU_BLDR.EXE, the seat display unit database builder, is used to develop a download file to be downloaded to all seats 117. The download file is comprised of product and entertainment information that is subject to change based on the contents of the cabin file server database 493. When flight information is entered by the flight attendants at the primary access terminal 225, the SDU_BLDR on the cabin file server 268 is initiated. The GUI 426 calls SDU Builder via the CAPI to extract the information from the cabin file server database 493 that is pertinent to the current flight. This information is used to create the download file (sdu_data.dn1) that is sent to each seat on the aircraft 111. The purpose of sdu_data.dn1 is to provide current information (i.e., entertainment, pricing, etc.) from the database 493 to the passenger seats 123. The creation of the download file triggers the Seat NAU 465 to notify each seat that a new download file exists. Each seat then requests the file and applies the portion of the download file that is applicable to their programming (i.e., first class seats don't read the information in the download file applicable to coach seats 123).

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A method of controlling a passenger entertainment system that includes a cabin file server having a plurality of interfaces to communications devices and passenger-controlled components of the passenger entertainment system, comprising the steps of:
   transmitting a passenger transaction from a passenger-controlled component to the cabin file server in one of a plurality of message formats;
   translating the passenger transaction in the one of the plurality of message formats into a request in a common message format in the cabin file server;
   generating a database query in response to the request in the common message format in the cabin file server;
   accessing a database containing data regarding resources of the passenger entertainment system with a database server;
   generating a response to the database query with the data from the database; and
   dispatching appropriate resources defined in the response to the database query to service the passenger transaction.

2. The method of claim 1 wherein the step of transmitting a passenger transaction from a passenger-controlled component to the cabin file server in one of a plurality of formats comprises transmitting the passenger transaction to a message processor in the cabin file server.

3. The method of claim 2 wherein the step of translating the passenger transaction in the one of the plurality of message formats into a request in the common message format in the cabin file server comprises:
   decoding the passenger transaction message format in the message processor; and
   generating the request in the common message format in the message processor.

4. The method of claim 3 wherein the step of generating a database query in response to the request in the common message format comprises:
   routing the request in the common message format from the message processor to a network addressable unit in the cabin file server;
   processing the request in the network addressable unit;
   transmitting the request from the network addressable unit to a transaction dispatcher in the cabin file server;
   routing the request through the transaction dispatcher to a services function in the cabin file server; and
   generating the database query in response to the request in the services function.

5. The method of claim 1 wherein the step of transmitting the passenger transaction in one or a plurality of message formats further comprises transmitting the passenger transaction to an input/output handler and a device driver in the cabin file server that supports the one message format.

6. The method of claim 3 wherein the step of generating a request in the common message format comprises generating a request in an IFE message format in the message processor in response to the passenger transaction.

7. A method of controlling a passenger entertainment system that includes a cabin file server having a plurality of interfaces to communications devices of the passenger entertainment system, comprising the steps of:
   transmitting an operator control request from a graphical user interface to a cabin applications program interface library in a primary access terminal;
   converting the operator control request to a control request IFE message in the cabin applications program interface library;
   transmitting the control request IFE message to the cabin file server;
   generating a database query in response to the operator control request in the cabin file server;
   accessing a database containing data regarding resources of the passenger entertainment system with a database server;
   generating a response to the database query with the data from the database; and
   dispatching appropriate resources defined in the response to the database query to service the operator control request.

8. The method of claim 7 further comprising sending the control request IFE message from the cabin applications program interface library to a services function in the cabin file server over an Ethernet network.

9. The method of claim 7 wherein the step of generating the database query in response to the operator control request comprises the steps of:
   generating a cabin applications program interface call in the services function in response to the operator control request; and
   generating the database query in the services function in response to the cabin applications program interface call.

10. A passenger entertainment system, including a cabin file server for controlling one or more aspects of the passenger entertainment system said cabin file server comprising:
    a message processor for receiving a passenger transaction transmitted by a passenger in a message format from a plurality of message formats by way of a system interface and for decoding the passenger transaction in the message format to generate a request in a common message format;
    a transaction dispatcher for routing the request generated by the message processor;
    a database server coupled to a database comprising data for responding to passenger transactions, said data includes information relating to products and services offered by the system and information relating to communications devices that deliver the products and services;
    a service function coupled to receive the request from the transaction dispatcher and communicate database queries to the database server in response to the request to generate an appropriate response thereto; and
    a predefined set of resources, selected ones of which are dispatched to service the passenger transaction in accordance with the response to the database query.

11. The system as recited in claim 10 wherein the system interface includes an input/output handler and a device driver that support network transmissions.

12. The system as recited in claim 10, including a plurality of network addressable units coupled between the message processor and transaction dispatcher that route requests and dispatch resources.

13. The system as recited in claim 12, further comprising pipe processors coupled between the message processor, the transcription dispatcher and the network addressable units for routing requests and dispatching resources.

14. The system as recited in claim 10, wherein the database server comprises a standard query language (SQL) database server and the database comprises a relational database.

15. The system of claim 10 further including a primary access terminal connected to the cabin file server and for an operator to configure and control the system, and primary access terminal further comprising:

a graphical user interface for use by the operator to configure and control the system; and a cabin applications interface library for receiving operator control requests from the graphical user interface and converting the request to a control request IFE message.

16. The system of claim 15 wherein the cabin file server services function receives the control request IFE message over an Ethernet network and generates a database query in response to the control request IFE message.

17. The system of claim 16 wherein the database server receives the database query and accesses the database.

18. The system of claim 17 wherein the database provides a response to the database query to service the operator control request.

* * * * *